(12) United States Patent
Manabe et al.

(10) Patent No.: US 7,390,538 B2
(45) Date of Patent: Jun. 24, 2008

(54) LIQUID-CRYSTAL MEDIUM CONTAINING MONOFLUOROTERPHENYL COMPOUNDS

(75) Inventors: Atsutaka Manabe, Bensheim (DE); Erdal Durmaz, Albig (DE); Eike Poetsch, Muehltal (DE); Volker Reiffenrath, Rossdorf (DE); Michael Heckmeier, Hemsbach (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/564,276

(22) PCT Filed: Jun. 23, 2004

(86) PCT No.: PCT/EP2004/006777

§ 371 (c)(1),
(2), (4) Date: Jul. 12, 2006

(87) PCT Pub. No.: WO2005/007775

PCT Pub. Date: Jan. 27, 2005

(65) Prior Publication Data

US 2007/0001149 A1   Jan. 4, 2007

(30) Foreign Application Priority Data

Jul. 11, 2003   (DE) ............................... 103 31 490

(51) Int. Cl.
*C09K 19/12*   (2006.01)
*C09K 19/30*   (2006.01)

(52) U.S. Cl. ................. 428/1.1; 252/299.63; 252/299.66

(58) Field of Classification Search .................. 428/1.1; 252/299.66, 299.63
See application file for complete search history.

(56) References Cited

U.S. PATENT DOCUMENTS

| | | | |
|---|---|---|---|
| 4,594,465 A | 6/1986 | Kam Ming Chan et al. | |
| 5,358,663 A | 10/1994 | Gray et al. | |
| 5,384,071 A | 1/1995 | Gray et al. | |
| 5,800,737 A | 9/1998 | Kam Ming Chan et al. | |
| 6,083,423 A | 7/2000 | Rieger et al. | |
| 6,180,026 B1 * | 1/2001 | Rieger et al. | 252/299.63 |
| 2006/0061699 A1 * | 3/2006 | Kirsch et al. | 349/24 |

FOREIGN PATENT DOCUMENTS

| | | |
|---|---|---|
| EP | 0132377 | 1/1985 |
| GB | 2198743 | 6/1988 |
| GB | 2200912 | 8/1988 |
| GB | 2367058 | 3/2002 |
| JP | 04279695 | 10/1992 |
| WO | WO 8707890 | 12/1987 |
| WO | WO 8903821 | 5/1989 |
| WO | WO 9115555 | 10/1991 |
| WO | WO 9533802 | 12/1995 |

OTHER PUBLICATIONS

L.K.M. Chan; "Synthesis and Liquid Crystal Behavior of Further 4,4"—Disubstituted 2' Fluoro-1,1':4',1" —Terphenyls" XP000005279; Mol. Cryst. Liq. Cryst., 1988, vol. 158B, pp. 209-240.

G.W. Gray ; "The Synthesis of Several Lateral Difluoro-substituted 4,4"—Dialkyl- and 4, 4"—Alkoxyalkyl- Terphenyls and a Rationalisation of the Effect of Such Substitution on Mesophse Type and Transition Temperatures" XP000236763; Mol. Cryst. Liq. Cryst., 1991, vol. 204, pp. 43-64.

L.K.M. Chan; "Reentrant Nematic and Injected Smectic Behavior in Binary Mixtures Including Those of Terminally Non-Polar Compounds" XP009038155; Mol. Cryst. Liq. Cryst., 1987, vol. 150B, pp. 335-359.

L.K.M. Chan; "Synthesis and Evaluation of Some 4,4"—Disubstituted Lateral Fluoro-1,1':4',1"—Terphenyls" XP009038157; Mol. Cryst. Liq. Cryst., 1985, vol. 123, pp. 185-204.

Patent Abstracts of Japan Bd. 017, Nr. 079 (C-1027), 17. Feb. 6, 1993 (1993-02-017).

Hird M et al: "The synthesis transition temperatures of some lateral cyano-substituted 1,1'1:4, 1"-terphenyls Molecular Crystals and Liquid Crystals, Bd. 206, 1991, 205-221, XP000236824.

(Continued)

*Primary Examiner*—Shean C Wu
(74) *Attorney, Agent, or Firm*—Miller, White, Zelano, Branigan, P.C.

(57) ABSTRACT

The present invention relates to a liquid-crystalline medium based on a mixture of polar compounds of positive or negative dielectric anisotropy which is characterised in that it comprises one or more compounds of the general formula I

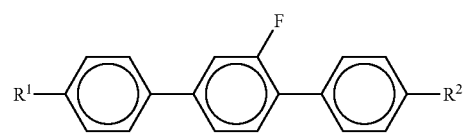

in which
$R^1$ and $R^2$ are each, independently of one another, identically or differently, H, an alkyl radical having from 1 to 12 carbon atoms which is unsubstituted, monosubstituted by CN or $CF_3$ or at least monosubstituted by halogen, where, in addition, one or more $CH_2$ groups in these radicals may each, independently of one another, be replaced by —O—, —S—,

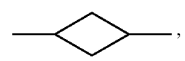

—CH=CH—, —C≡C—, —CO—, —CO—O—, —O—CO— or —O—CO—O— in such a way that O atoms are not linked directly to one another,
to the use thereof for electro-optical purposes, and to electro-optical display devices which contain this medium.

11 Claims, No Drawings

OTHER PUBLICATIONS

Xu, J. et al: "Liquid crystal system as molecular machinery: investigation of dynamic impedance matching between molecular core and terminal groups using rotor-bearing model" Japanese journal of applied physics, Bd. 39, Nr. 4A, Part 1, 2000, 1801-1807, XP001014936.

Reiffenrath, V. et al: "Synthesis and properties of liquid crystalline materials with high optical anisotropy" SPIE Liquid Crystal Display and Applications, Bd. 1257, 1990, 84-94, XP009038208.

* cited by examiner

LIQUID-CRYSTAL MEDIUM CONTAINING MONOFLUOROTERPHENYL COMPOUNDS

The present invention relates to a liquid-crystalline medium, to the use thereof for electro-optical purposes, and to electro-optical display devices which contain this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (super-birefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Further-more, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Non-linear elements which can be used for individual switching of the individual pixels are, for example, active elements (i.e. transistors). The term "active matrix" is then used, where a distinction is made between two types:

1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are back-lit.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) and for high-information displays for computer applications (for example laptops) and in automobile and aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to achieve acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The known MLC displays do not meet these requirements.

There thus continues to be a great demand for MLC displays having very high specific resistance at the same time as a large working-temperature range, short response times even at low temperatures and low threshold voltage which do not have the said disadvantages, or only do so to a reduced extent.

In addition to liquid-crystal displays which use backlighting, i.e. are operated transmissively and if desired transflectively, reflective liquid-crystal displays are also particularly interesting. These reflective liquid-crystal displays use the ambient light for information display. They thus consume significantly less energy than back-lit liquid-crystal displays having a corresponding size and resolution. Since the TN effect is characterised by very good contrast, reflective displays of this type can even be read well in bright ambient conditions. This is already known of simple reflective TN displays, as used, for example, in watches and pocket calculators. However, the principle can also be applied to high-quality, higher-resolution active matrix-addressed displays, such as, for example, TFT displays. Here, as already in the transmissive TFT-TN displays which are generally conventional, the use of liquid crystals of low birefringence ($\Delta n$) is necessary in order to achieve low optical retardation ($d \cdot \Delta n$). This low optical retardation results in usually acceptable low viewing-angle dependence of the contrast (cf. German Patent 30 22 818). In reflective displays, the use of liquid crystals of low birefringence is even more important than in trans-missive displays since the effective layer thickness through which the light passes is approximately twice as large in reflective displays as in trans-missive displays having the same layer thickness.

The advantages of reflective displays over transmissive displays, besides the lower power consumption (since backlighting is unnecessary), are the space saving, which results in a very small physical depth, and the reduction in problems due to temperature gradients caused by different degrees of heating by the backlighting.

In TN (Schadt-Helfrich) cells, media are desired which facilitate the following advantages in the cells:
  extended nematic phase range (in particular at low temperatures),
  the ability to switch at extremely low temperatures (outdoor use, auto-mobiles, avionics),
  elevated resistance against UV radiation (longer life),
  low rotational viscosities,
  low threshold (addressing) voltage and
  high birefringence for thinner layer thicknesses and thus shorter response times.

The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

In addition, the trend in monitor and TV applications is towards ever-shorter response times. The display manufacturers are reducing the response time through the use of displays of smaller layer thickness. At constant optical path length d·Δn, this requires liquid-crystal mixtures of greater Δn. In addition, the use of liquid-crystal mixtures of low rotational viscosity likewise results in a shortening of the response times.

The present invention thus had the object of providing media for MLC, TN or STN displays of this type, preferably for MLC and TN displays and particularly preferably for transmissive TN displays, which do not have the above-mentioned disadvantages or only do so to a reduced extent, and at the same time preferably have very low rotational viscosities $\gamma_1$ and relatively high optical anisotropy values Δn. The mixtures according to the invention should preferably find use in transmissive applications.

It has now been found that these objects can be achieved if the media according to the invention are used in displays.

The present invention thus relates to a liquid-crystalline medium based on a mixture of polar compounds of positive or negative dielectric anisotropy which is characterised in that it comprises one or more compounds of the general formula I

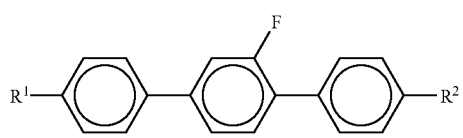

I in which
  $R^1$ and $R^2$ are each, independently of one another, identically or differently, H, an alkyl radical having from 1 to 12 carbon atoms which is unsubstituted, monosubstituted by CN or $CF_3$ or at least monosubstituted by halogen, where, in addition, one or more $CH_2$ groups in these radicals may each, independently of one another, be replaced by —O—, —S—,

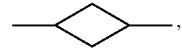

—CH═CH—, C≡C—, —CO—, —CO—O—, —O—CO— or —O—CO—O— in such a way that O atoms are not linked directly to one another.

The compounds of the formula I have a broad range of applications. These compounds can either serve as base materials of which liquid-crystalline media are predominantly composed, or they can be added to liquid-crystalline base materials from other classes of compound in order, for example, to modify the dielectric and/or optical anisotropy of a dielectric of this type and/or to optimise its threshold voltage and/or its viscosity.

In the pure state, the compounds of the formula I are colourless and form liquid-crystalline mesophases in a temperature range which is favourably located for electro-optical use. They are stable chemically, thermally and to light.

If $R^1$ and/or $R^2$ are an alkyl radical, this may be straight-chain or branched. It is preferably straight-chain, has 1, 2, 3, 4, 5, 6, 7, 8 or 9 carbon atoms and accordingly is preferably methyl, ethyl, propyl, butyl, pentyl, hexyl, heptyl, octyl or nonyl, furthermore decyl, undecyl or dodecyl. Groups having from 1 to 5 carbon atoms are particularly preferred.

If $R^1$ and/or $R^2$ are an alkoxy radical, this may be straight-chain or branched. It is preferably straight-chain, has 1, 2, 3, 4, 5, 6, 7, 8 or 9 carbon atoms and accordingly is preferably methoxy, ethoxy, propoxy, butoxy, pentoxy, hexoxy, heptoxy, octoxy or nonoxy, furthermore decoxy or undecoxy.

If $R^1$ and/or $R^2$ are an oxaalkyl radical, this may be straight-chain or branched. It is preferably straight-chain, has 1, 2, 3, 4, 5, 6, 7, 8 or 9 carbon atoms and accordingly is preferably 2-oxapropyl (=methoxy-methyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl.

If $R^1$ and/or $R^2$ are an alkyl radical in which one $CH_2$ group has been replaced by —CH═CH—, this may be straight-chain or branched. It is preferably straight-chain and has from 2 to 10 carbon atoms. Accordingly, it is particularly preferably vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, or dec-1-, -2-, -3-, -4-, -5-, -6-, -7-, -8- or -9-enyl.

If $R^1$ and/or $R^2$ are an alkyl radical in which one $CH_2$ group has been replaced by —O— and one has been replaced by —CO—, these are preferably adjacent. These thus contain an acyloxy group —CO—O— or an oxycarbonyl group —O—CO—. These are preferably straight-chain and have from 2 to 6 carbon atoms. Accordingly, they are particularly preferably acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonyl-methyl, ethoxycarbonylmethyl, propoxycarbonylmethyl, butoxycarbonyl-methyl, 2-(methoxycarbonyl)ethyl, 2-(ethoxycarbonyl)ethyl, 2-(propoxy-carbonyl)ethyl, 3-(methoxycarbonyl)propyl, 3-(ethoxycarbonyl)propyl or 4-(methoxycarbonyl)butyl.

If $R^1$ and/or $R^2$ are an alkyl radical in which one $CH_2$ group has been replaced by unsubstituted or substituted —CH=CH— and an adjacent $CH_2$ group has been replaced by —CO—, —CO—O— or —O—CO—, this may be straight-chain or branched. It is preferably straight-chain and has from 4 to 12 carbon atoms. Accordingly, it is particularly preferably acryloyloxymethyl, 2-acryloyloxyethyl, 3-acryloyloxypropyl, 4-acryloyloxybutyl, 5-acryloyloxy-pentyl, 6-acryloyloxyhexyl, 7-acryloyloxyheptyl, 8-acryloyloxyoctyl, 9-acryl-oyloxynonyl, 10-acryloyloxydecyl, methacryloyloxymethyl, 2-methacryloyl-oxyethyl, 3-methacryloyloxypropyl, 4-methacryloyloxybutyl, 5-methacryloyl-oxypentyl, 6-methacryloyloxyhexyl, 7-methacryloyloxyheptyl, 8-methacryl-oyloxyoctyl or 9-methacryloyloxynonyl.

If $R^1$ and/or $R^2$ are an alkyl or alkenyl radical which is monosubstituted by CN or $CF_3$, this radical is preferably straight-chain. The substitution by CN or $CF_3$ is possible in any desired position.

If $R^1$ and/or $R^2$ are an alkyl or alkenyl radical which is at least monosubstituted by halogen, this radical is preferably straight-chain and halogen is preferably F or Cl. In the case of polysubstitution, halogen is preferably F. The resultant radicals also include perfluorinated radicals. In the case of monosubstitution, the fluorine or chlorine substituent can be in any desired position, but preferably in the ω-position.

Compounds of the formula I which contain wing groups $R^1$ and/or $R^2$ which are suitable for polymerisation reactions are suitable for the preparation of liquid-crystalline polymers.

Compounds of the formula I containing branched wing groups $R^1$ and/or $R^2$ may occasionally be of importance owing to better solubility in the conventional liquid-crystalline base materials, but in particular as chiral dopants if they are optically active. Smectic compounds of this type are suitable as components of ferroelectric materials.

Compounds of the formula I having SA phases are suitable, for example, for thermally addressed displays.

Branched groups of this type preferably contain not more than one chain branch. Preferred branched radicals $R^1$ and/or $R^2$ are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propyl-pentyl, isopropoxy, 2-methylpropoxy, 2-methylbutoxy, 3-methylbutoxy, 2-methylpentoxy, 3-methylpentoxy, 2-ethylhexoxy, 1-methylhexoxy and 1-methylheptoxy.

If $R^1$ and/or $R^2$ are an alkyl radical in which two or more $CH_2$ groups have been replaced by —O— and/or —CO—O—, this may be straight-chain or branched. It is preferably branched and has from 3 to 12 carbon atoms. Accordingly, it is particularly preferably biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-bis-carboxynonyl, 10,10-biscarboxydecyl, bis(methoxycarbonyl)methyl, 2,2-bis-(methoxycarbonyl)ethyl, 3,3-bis(methoxycarbonyl)propyl, 4,4-bis(methoxy-carbonyl)butyl, 5,5-bis(methoxycarbonyl)pentyl, 6,6-bis(methoxy-carbonyl)hexyl, 7,7-bis(methoxycarbonyl)heptyl, 8,8-bis(methoxycarbonyl)-octyl, bis(ethoxycarbonyl)methyl, 2,2-bis(ethoxycarbonyl)ethyl, 3,3-bis-(ethoxycarbonyl)propyl, 4,4-bis(ethoxycarbonyl)butyl or 5,5-bis(ethoxy-carbonyl)pentyl.

$R^1$ and/or $R^2$ are preferably, independently of one another, identically or differently, H, a straight-chain alkyl radical having from 1 to 9 carbon atoms or a straight-chain alkenyl radical having from 2 to 9 carbon atoms.

The compounds of the formula I are consequently preferably selected from the group consisting of the compounds of the following sub-formulae Ia to Id, where sub-formula Ia is particularly preferred:

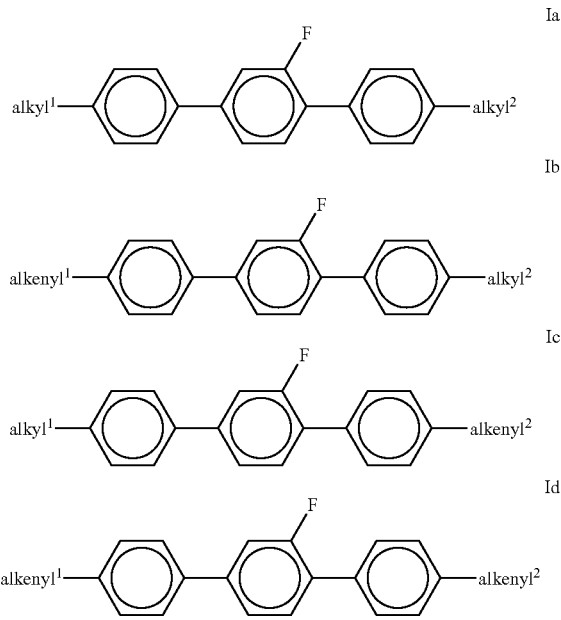

where, in the formulae Ia to Id, the term "alkyl$^1$" and "alkyl$^2$" in each case, independently of one another, identically or differently, denotes a hydrogen atom or an alkyl radical having from 1 to 9 carbon atoms, preferably a straight-chain alkyl radical having from 1 to 5 carbon atoms, and the term "alkenyl$^1$" and "alkenyl$^2$" in each case, independently of one another, identically or differently, denotes an alkenyl radical having from 2 to 9 carbon atoms, preferably a straight-chain alkenyl radical having from 2 to carbon atoms.

The compounds of the formula I are consequently particularly preferably selected from the group consisting of the compounds of the following sub-formulae I1 to I25:

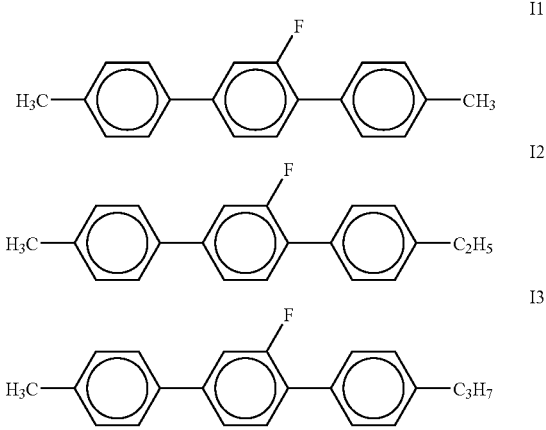

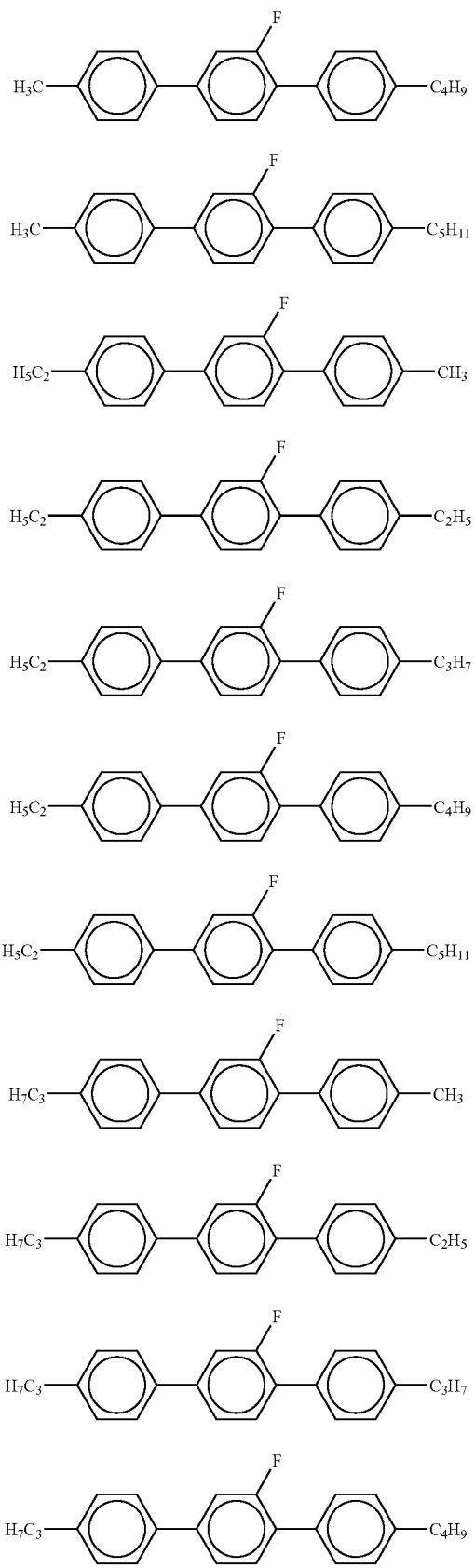
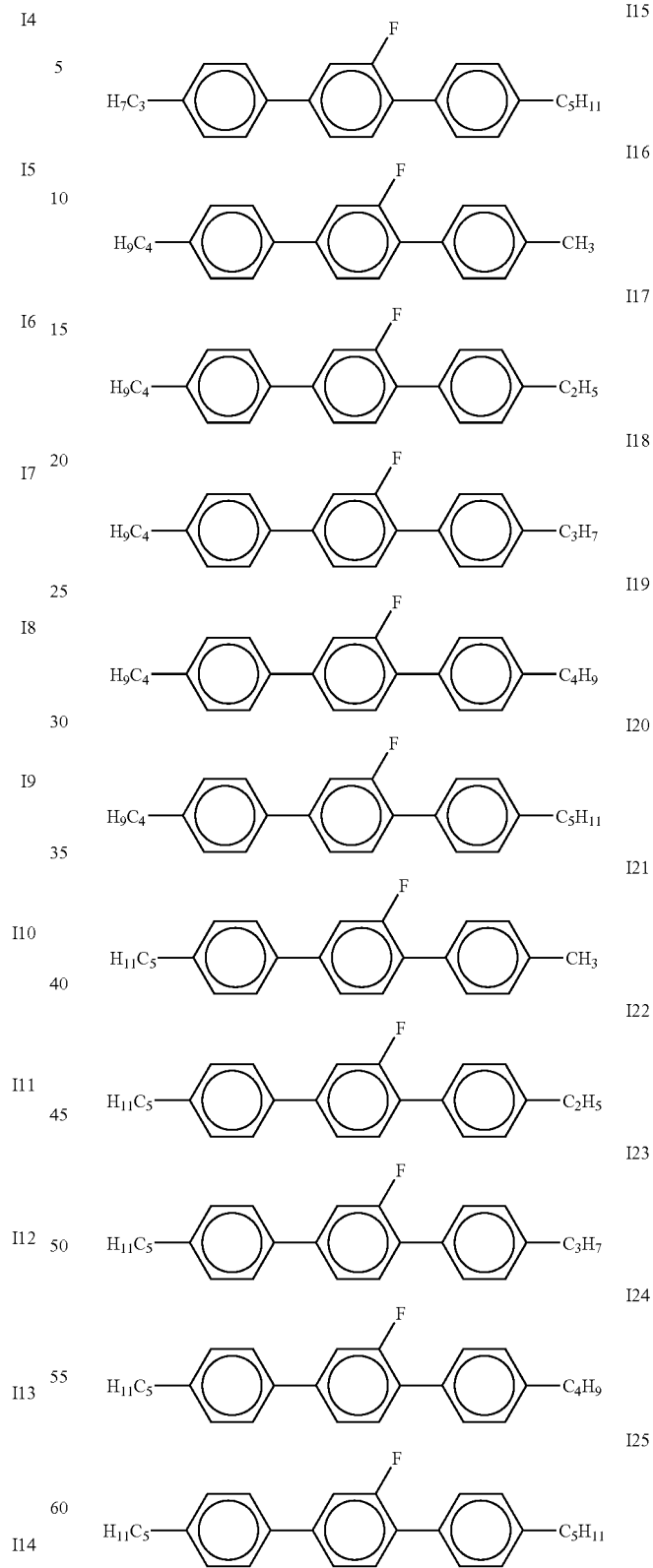
Particularly preferred compounds from the group consisting of the compounds of the sub-formulae I1 to I25 here are compounds in which the total number of carbon atoms in the two alkyl groups is in the range from 4 to 6. These are the compounds I3 to I15, I7 to I9, I11 to I13, I16, I17 and I21. Particular preference is given here to the sub-formulae I8, I9, I12 and I13.

The liquid-crystalline medium particularly preferably comprises one, two or three compounds of the formula I.

The proportion of compounds of the formula I in the mixture as a whole is from 1 to 60% by weight, preferably from 3 to 50% by weight and particularly preferably either from 3 to 12% by weight (embodiment A) or from 15 to 50% by weight (embodiment B).

The compounds of the formula I are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

The compounds of the formula I are preferably prepared as described in EP 0132 377 A2.

The present invention also relates to electro-optical display devices (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which contain the media according to the invention, and to the use of these media for electro-optical purposes. Besides reflective applications, the mixtures according to the invention are also suitable for IPS (in plane switching) applications and OCB (optically controlled birefringence) applications.

The liquid-crystal mixtures according to the invention enable a significant widening of the available parameter latitude.

The achievable combinations of rotational viscosity $\gamma_1$ and optical anisotropy $\Delta n$ are far superior to previous materials from the prior art.

The requirement for a high clearing point, nematic phase at low temperature, low rotational viscosity $\gamma_1$ and high $\Delta n$ has hitherto only been achieved to an inadequate extent. Although systems such as, for example, the mixture of Comparative Example 2, which is commercially available from Merck, have similar properties to the mixtures according to the invention, they have, however, significantly worse values for the rotational viscosity $\gamma_1$.

Other mixture systems, such as, for example, the mixture of Comparative Example 1, which is commercially available from Merck, have comparable rotational viscosities $\gamma_1$, but have significantly worse values for the optical anisotropy $\Delta n$.

The liquid-crystal mixtures according to the invention, while retaining the nematic phase down to –20° C., preferably down to –30° C. and particularly preferably down to –40° C., enable clearing points above 65° C., preferably above 70° C. and particularly preferably above 75° C., simultaneously dielectric anisotropy values $\Delta \varepsilon$ of $\geq 4$, preferably $\geq 4.5$, and a high value for the specific resistance to be achieved, enabling excellent STN and MLC displays to be obtained. In particular, the mixtures are characterised by low operating voltages. The TN thresholds are below 2.0 V, preferably below 1.9 V and particularly preferably below 1.8 V.

The liquid-crystal mixtures according to the invention have optical anisotropies $\Delta n$ which, in the case of embodiment A, are preferably $\leq 0.100$ and particularly preferably $\leq 0.095$. In the case of embodiment B, the optical anisotropies are preferably $\geq 0.160$, particularly preferably $\geq 0.180$ and in particular $\geq 0.200$.

It goes without saying that, through a suitable choice of the components of the mixtures according to the invention, it is also possible for higher clearing points to be achieved at higher threshold voltages or lower clearing points to be achieved at lower threshold voltages with retention of the other advantageous properties. At viscosities correspondingly increased only slightly, it is likewise possible to obtain mixtures having greater $\Delta \varepsilon$ and thus lower thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where particularly favourable electro-optical properties, such as, for example, high steepness of the characteristic line and low angle dependence of the contrast (German Patent 30 22 818), are achieved. In addition, significantly higher specific resistances can be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The rotational viscosity $\gamma_1$ of the mixtures according to the invention at 20° C. is preferably $\leq 180$ mPa·s, particularly preferably $\leq 160$ mPa·s. In a specific embodiment (embodiment A), the rotational viscosity $\gamma_1$ is particularly preferably $\leq 80$ mPa·s and in particular $\leq 70$ mPa·s. The ratio $\gamma_1$ to $(\Delta n)^2$ here is preferably $\leq 8000$, particularly preferably $\leq 7000$. In a specific embodiment (embodiment B), the ratio is particularly preferably $\leq 5000$ and in particular $\leq 4500$. The nematic phase range is preferably at least 90° C. and extends at least from –20° to +70° C.

Measurements of the capacity holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formula I exhibit a significantly smaller decrease in the HR with increasing temperature than analogous mixtures comprising cyanophenylcyclohexanes of the formula

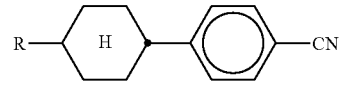

the formula

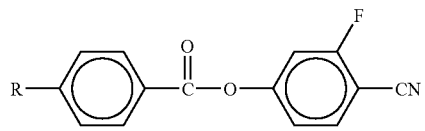

instead of the compounds of the formula I according to the invention.

The UV stability of the mixtures according to the invention is also considerably better, i.e. they exhibit a significantly smaller decrease in the HR on exposure to UV.

Besides at least one compound of the formula I, the medium according to the invention additionally comprises one or more compounds selected from the group consisting of compounds of the general formulae II to X:

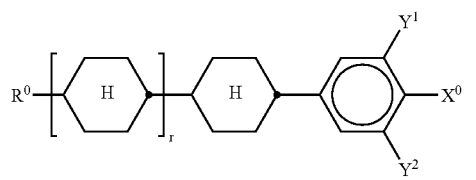
II

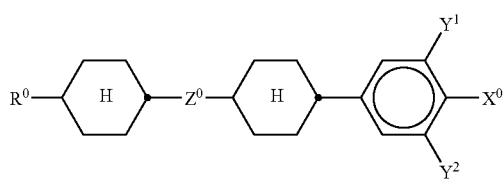
III

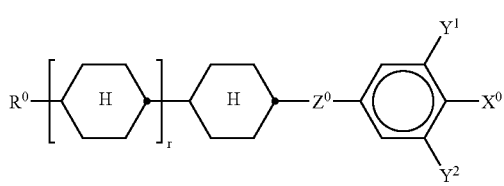
IV

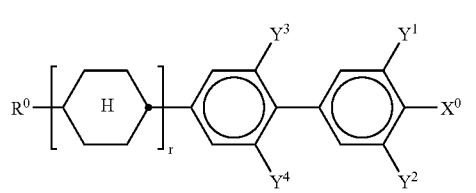
V

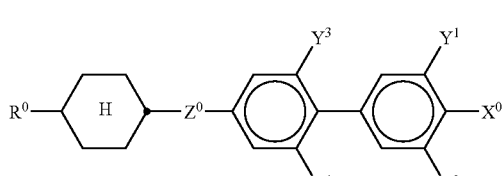
VI

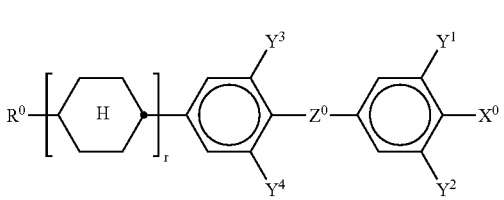
VII

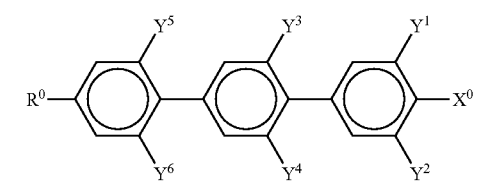
VIII

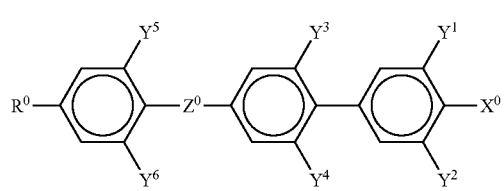
IX

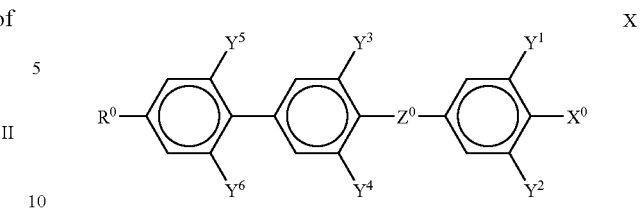
X in which the individual radicals have the following meanings:

| | |
|---|---|
| $R^0$: | n-alkyl, oxaalkyl, fluoroalkyl or alkenyl, each having up to 9 carbon atoms; |
| $X^0$: | F, Cl, halogenated alkyl or halogenated alkoxy having from 1 to 6 carbon atoms, or halogenated alkenyl having from 2 to 6 carbon atoms; |
| $Z^0$: | —$CF_2O$—, —$OCF_2$—, —$CH_2O$—, —$OCH_2$—, —CO—O—, —O—CO—, —CH=CH—, —$C_2H_4$—, —$C_2F_4$—, —$CH_2CF_2$—, —$CF_2CH_2$— or —$C_4H_8$—; |
| $Y^1, Y^2,$ $Y^3, Y^4,$ | each, independently of one another, H or F; |
| $Y^5$ and $Y^6$: | |
| r: | 0 or 1, preferably 1. |

The term "alkyl" covers straight-chain and branched alkyl groups having from 1 to 9 carbon atoms, preferably the straight-chain groups methyl, ethyl, propyl, butyl, pentyl, hexyl, heptyl, octyl and nonyl. Groups having from 1 to 5 carbon atoms are particularly preferred.

The term "alkenyl" covers straight-chain and branched alkenyl groups having from 2 to 9 carbon atoms, preferably the straight-chain groups having from 2 to 7 carbon atoms. Preferred alkenyl groups are $C_2$-$C_7$-1 E-alkenyl, $C_4$-$C_7$3E-alkenyl, $C_5$-$C_7$4-alkenyl, $C_6$-$C_7$5-alkenyl and $C_{7-6}$-alkenyl, in particular $C_2$-$C_7$-1 E-alkenyl, $C_4$-$C_7$3E-alkenyl and $C_5$-$C_7$4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are particularly preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. Preferably, n=1 and m=1 to 6.

In the formulae II to X,

 is preferably ,

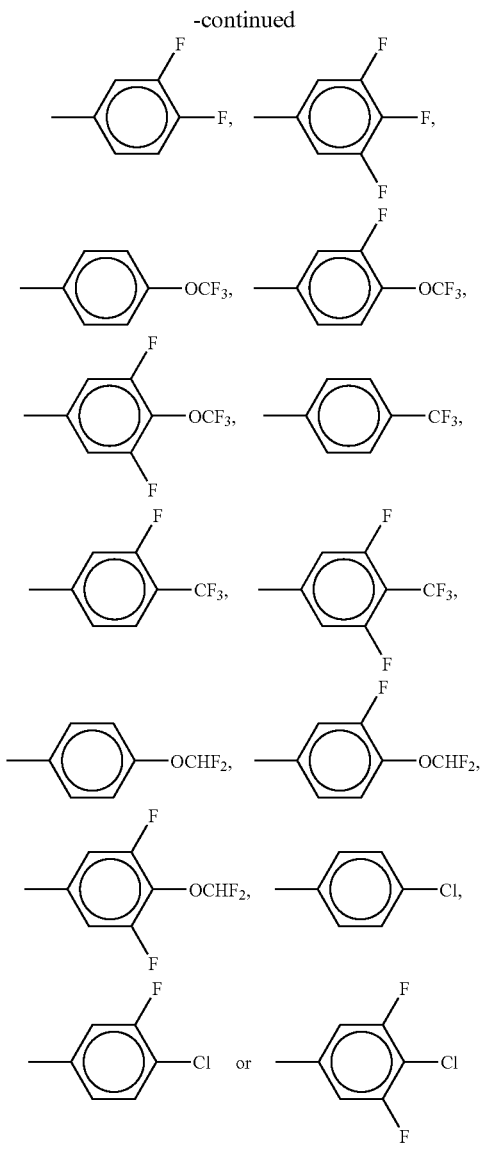

The compound of the formula II is preferably

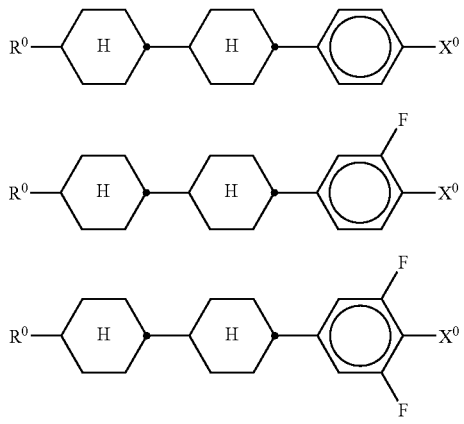

in which $R^0$ and $X^0$ can adopt the meanings indicated above. Preferably, however, $R^0$ is n-alkyl or alkenyl having up to 9 carbon atoms, particularly preferably n-alkyl having from 1 to 5 carbon atoms or alkenyl having from 2 to 5 carbon atoms, and $X^0$ is F, $OCF_3$, $CF_3$ or $OCHF_2$.

The compound of the formula III is preferably

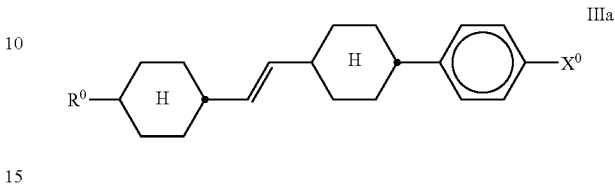

in which $R^0$ and $X^0$ can adopt the meanings indicated above. Preferably, however, $R^0$ is n-alkyl or alkenyl having up to 9 carbon atoms, particularly preferably n-alkyl having from 1 to 5 carbon atoms or alkenyl having from 2 to 5 carbon atoms, and $X^0$ is F, $OCF_3$, $CF_3$ or $OCHF_2$.

The compound of the formula IV is preferably

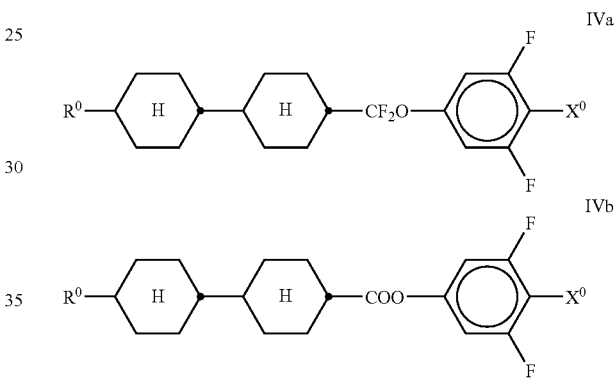

in which $R^0$ and $X^0$ can adopt the meanings indicated above. Preferably, however, $R^0$ is n-alkyl having up to 9 carbon atoms, particularly preferably n-alkyl having from 1 to 5 carbon atoms, and $X^0$ is F, $OCF_3$, $CF_3$ or $OCHF_2$, particularly preferably F.

The compound of the formula V is preferably

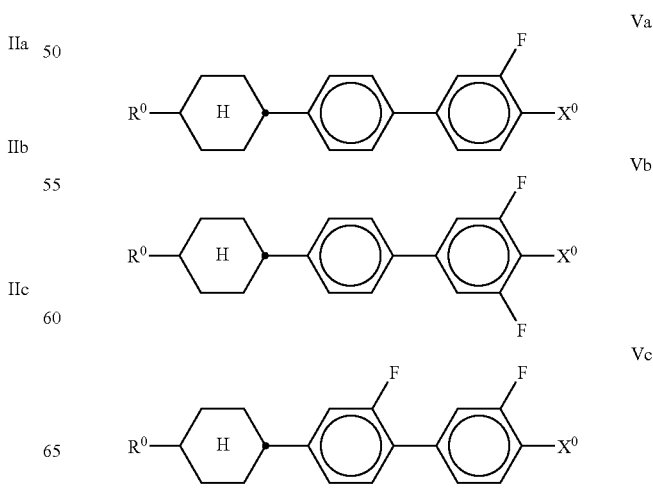

-continued

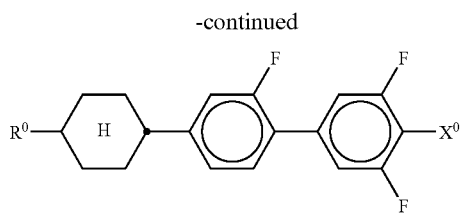
Vd

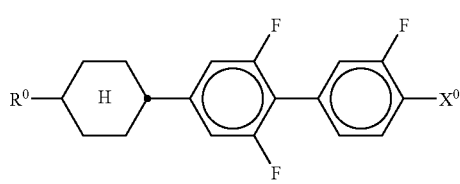
Ve

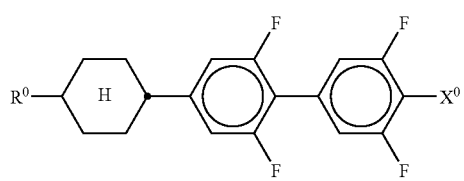
Vf in which $R^0$ and $X^0$ can adopt the meanings indicated above. Preferably, however, $R^0$ is n-alkyl having up to 9 carbon atoms, particularly preferably n-alkyl having from 1 to 5 carbon atoms, and $X^0$ is F, $OCF_3$, $CF_3$ or $OCHF_2$, particularly preferably F. Particular preference is given to the formula Vc.

The compound of the formula VII is preferably

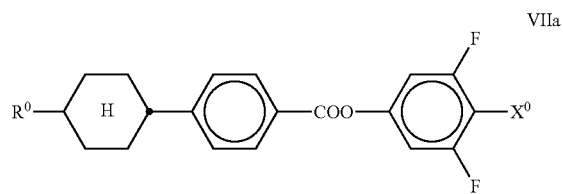
VIIa

VIIb

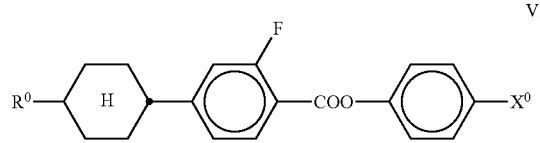

in which $R^0$ and $X^0$ can adopt the meanings indicated above. Preferably, however, $R^0$ is n-alkyl having up to 9 carbon atoms, particularly preferably n-alkyl having from 1 to 5 carbon atoms, and $X^0$ is F, $OCF_3$, $CF_3$ or $OCHF_2$.

The compound of the formula VIII is preferably

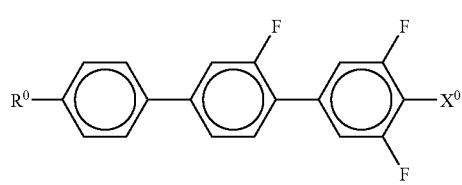
VIIIa

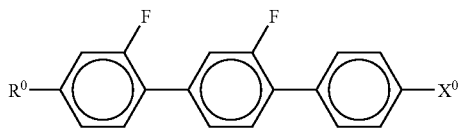
VIIIb in which $R^0$ and $X^0$ can adopt the meanings indicated above. Preferably, however, $R^0$ is n-alkyl having up to 9 carbon atoms, particularly preferably n-alkyl having from 1 to 5 carbon atoms, and $X^0$ is F, $OCF_3$, $CF_3$ or $OCHF_2$, particularly preferably F.

The compound of the formula X is preferably

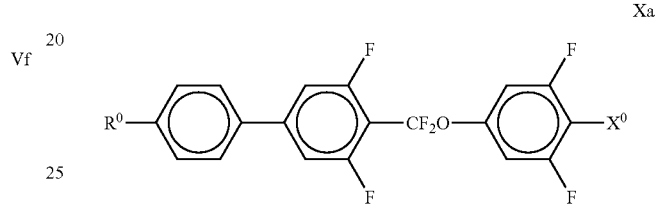
Xa in which $R^0$ and $X^0$ can adopt the meanings indicated above. Preferably, however, $R^0$ is n-alkyl having up to 9 carbon atoms, particularly preferably n-alkyl having from 1 to 5 carbon atoms, and $X^0$ is F, $OCF_3$, $CF_3$ or $OCHF_2$, particularly preferably F.

Particularly preferred embodiments are indicated below.

The medium comprises one or more compounds of the formulae II, III, IV, V, VI, VII, VIII, 1× and/or X, preferably one or more compounds of the formulae IIa, IIb, IIc, IIIa, IVa, IVb, Vc, VIIa, VIIb, VIIIa, VIIIb and/or Xa.

The proportion of compounds of the formulae II to X in the mixture as a whole is from 20 to 70% by weight, preferably from 30 to 60% by weight and particularly preferably from 35 to 55% by weight.

The proportion of compounds of the formulae I to X together in the mixture as a whole is at least 30% by weight, preferably at least 40% by weight and particularly preferably at least 50% by weight.

The medium essentially consists of compounds of the formulae I to X.

The I: (II+III+IV+V+VI+VII+VIII+IX+X) weight ratio is preferably in the range from 1:10 to 10:1.

The optimum mixing ratio of the compounds of the formulae I and II+III+IV+V+VI+VII+VII+IX+X depends substantially on the desired properties, on the choice of the components of the formulae I, II, III, IV, V, VI, VII, VII, IX and/or X and on the choice of any other components present. Suitable mixing ratios within the ranges indicated above can easily be determined from case to case.

Besides at least one compound of the formula I and at least one compound selected from the group consisting of compounds of the general formulae II to X, the medium according to the invention additionally comprises one or more compounds selected from the group consisting of compounds of the general formulae XI to XVII:

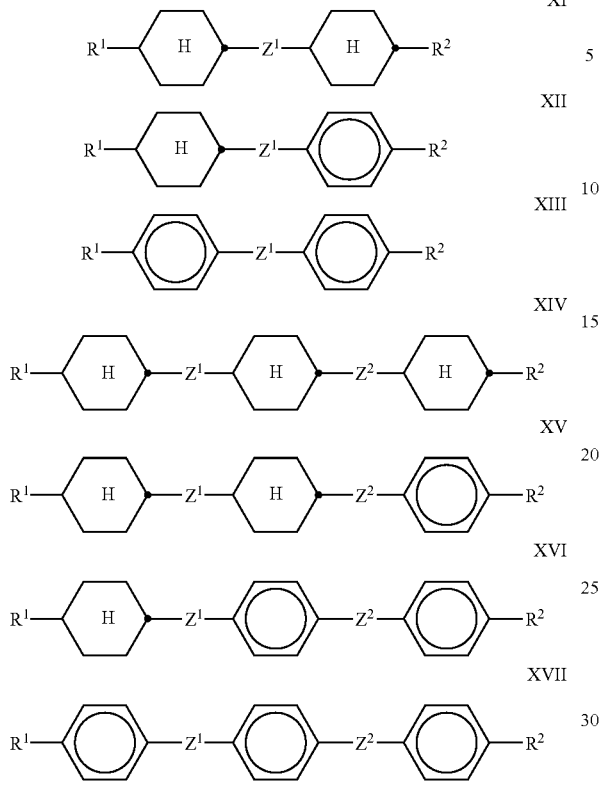

in which the individual radicals have the following meanings:

| | |
|---|---|
| $R^1$ and $R^2$: | independently of one another, identically or differently, n-alkyl, n-alkoxy or alkenyl, each having up to 9 carbon atoms; and |
| $Z^1$ and $Z^2$: | independently of one another, identically or differently, a single bond, —$CF_2O$—, —$OCF_2$—, —$CH_2O$—, —$OCH_2$—, —$CO$—$O$—, —$O$—$CO$—, —$CH=CH$—, —$C_2H_4$—, —$C_2F_4$—, —$CH_2CF_2$—, —$CF_2CH_2$— or —$C_4H_8$—, preferably each a single bond. |

The compound of the formula XI is preferably

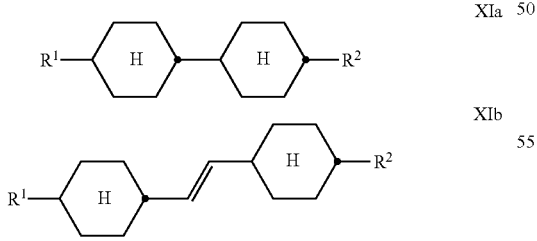

in which $R^1$ and $R^2$ can adopt the meanings indicated above. Preferably, however, $R^1$ is n-alkyl or alkenyl having up to 9 carbon atoms, particularly preferably n-alkyl having from 1 to 5 carbon atoms or alkenyl having from 2 to 5 carbon atoms, and $R^2$ is alkenyl having up to 9 carbon atoms, particularly preferably alkenyl having from 2 to 5 carbon atoms.

Particularly preferred compounds of the formula XIa are

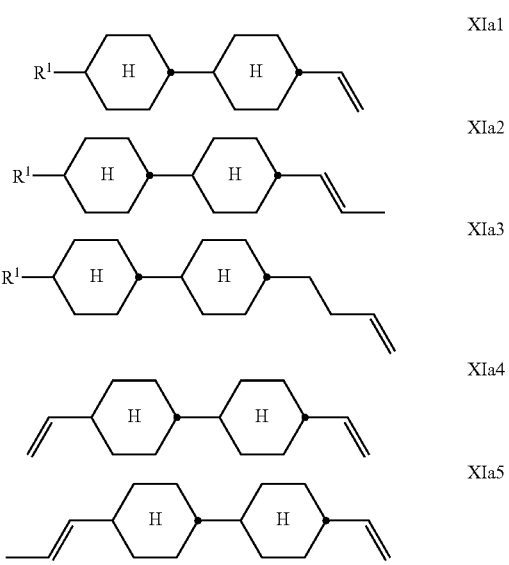

in which $R^1$ can adopt the meanings indicated above, but is preferably n-alkyl having from 1 to 5 carbon atoms.

The compounds of the formulae XIa1 and XIa2 are particularly preferred.

The compound of the formula XIII is preferably

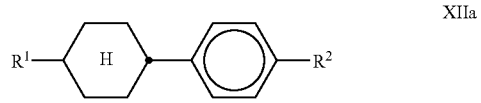

in which $R^1$ and $R^2$ can adopt the meanings indicated above. Preferably, however, $R^1$ is n-alkyl having up to 9 carbon atoms, particularly preferably n-alkyl having from 1 to 5 carbon atoms, and $R^2$ is alkoxy having up to 9 carbon atoms, particularly preferably alkoxy having from 1 to 5 carbon atoms.

The compound of the formula XIII is preferably

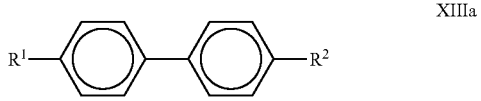

in which $R^1$ and $R^2$ can adopt the meanings indicated above. Preferably, however, $R^1$ is n-alkyl having up to 9 carbon atoms, particularly preferably n-alkyl having from 1 to 5 carbon atoms, and $R^2$ is alkenyl having up to 9 carbon atoms, particularly preferably alkenyl having from 2 to 5 carbon atoms.

The compound of the formula XV is preferably

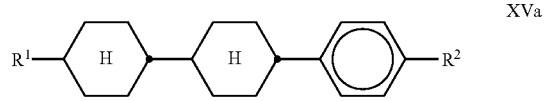

in which $R^1$ and $R^2$ can adopt the meanings indicated above. Preferably, however, $R^1$ is alkenyl having up to 9 carbon atoms, particularly preferably alkenyl having from 2 to 5 carbon atoms, and $R^2$ is n-alkyl having up to 9 carbon atoms, particularly preferably n-alkyl having from 1 to 5 carbon atoms.

Particularly preferred embodiments are indicated below.

The medium comprises one or more compounds of the formulae XI, XII, XIII, XIV, XV, XVI and/or XVII, preferably one or more compounds of the formulae XIa, XIb, XIIa, XIIIa and/or XVa.

The proportion of compounds of the formulae XI to XVII in the mixture as a whole is from 5 to 70% by weight, preferably from 10 to 60% by weight and particularly preferably either from 10 to 30% by weight (embodiment B) or from 35 to 55% by weight (embodiment A).

The proportion of compounds of the formulae I to XVII together in the mixture as a whole is at least 50% by weight, preferably at least 70% by weight and particularly preferably at least 90% by weight.

The medium essentially consists of compounds of the formulae I to XVII.

The total amount of compounds of the formulae I to XVII in the mixtures according to the invention is not crucial. The mixtures may therefore comprise one or more further components in order to optimise various properties. However, the observed effect on the rotational viscosity and the optical anisotropy is generally greater the higher the total concentration of compounds of the formulae I to XVII.

Furthermore, the medium according to the invention may additionally comprise one or more compounds selected from compounds of the general formula XVIII:

XVIII

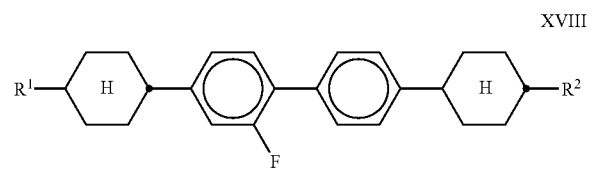

in which $R^1$ and $R^2$ can adopt the meanings indicated above. Preferably, however, $R^1$ and $R^2$ are n-alkyl having up to 9 carbon atoms, particularly preferably n-alkyl having from 1 to 5 carbon atoms.

The proportion of compounds of the formula XVIII in the mixture as a whole can be up to 10% by weight.

In addition, the medium according to the invention may additionally comprise one or more compounds selected from the group consisting of compounds of the general formulae XIX to XXVI:

XIX

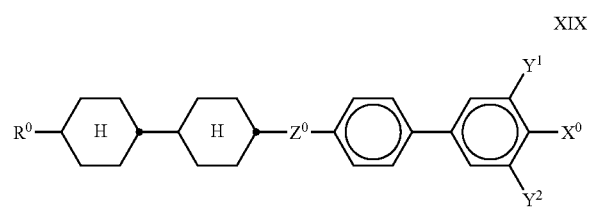

-continued

XX

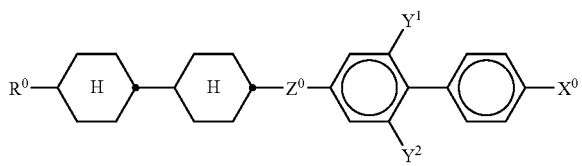

XXI

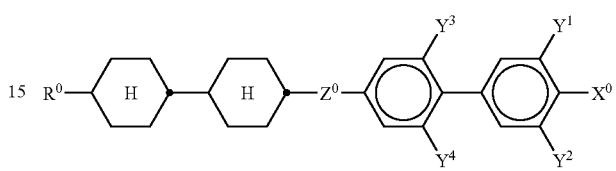

XXII

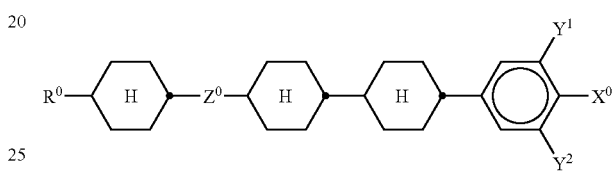

XXIII

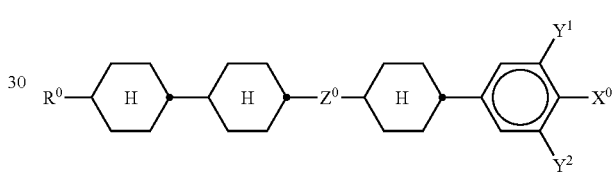

XXIV

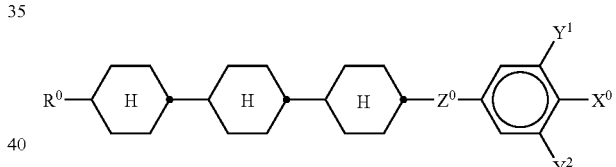

XXV

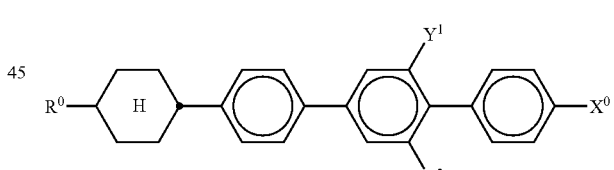

XXVI

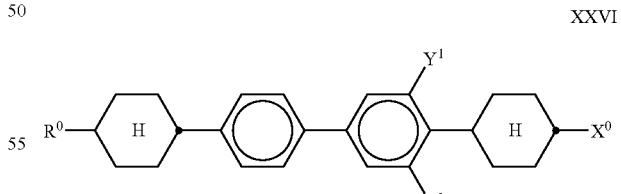

in which $R^0$, $X^0$, $Y^1$, $Y^2$, $Y^3$, $Y^4$ and $Z^0$ each, independently of one another, have one of the meanings indicated above. Preferably, $X^0$ is F, Cl, $CF_3$, $OCF_3$ or $OCHF_2$. $R^0$ is preferably alkyl, oxaalkyl, fluoroalkyl or alkenyl, each having up to 6 carbon atoms, and $Z^0$ is preferably a single bond or —$CH_2$—$CH_2$—. $Y^1$, $Y^2$, $Y^3$ and $Y^4$ are each, independently of one another, H or F.

The individual compounds of the formulae II to XXVI and their sub-formulae which can be used in the media according to the invention are either known or can be prepared analogously to known compounds.

It has been found that even a relatively small proportion of compounds of the formula I mixed with conventional liquid-crystal materials, but in particular with one or more compounds of the formulae II, III, IV, V, VI, VII, VII, IX and/or X, results in a significant reduction in the rotational viscosity γ, and in higher values for the optical anisotropy Δn, enabling shorter response times of the displays to be achieved, with broad nematic phases having low smectic-nematic transition temperatures being observed at the same time, causing an improvement in the storage stability. The compounds of the formulae I to X are colourless, stable and readily miscible with one another and with other liquid-crystal materials. The mixtures according to the invention are furthermore distinguished by very high clearing points.

The construction of the MLC display according to the invention from polarisers, electrode base plates and electrodes having a surface treatment corresponds to the conventional design for displays of this type. The term conventional design here is broadly drawn and also covers all derivatives and modifications of the MLC display, in particular also matrix display elements based on poly-Si TFT or MIM.

An essential difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in lesser amount is dissolved in the components making up the principal constituent, preferably at elevated temperature. It is also possible to mix solutions of the components in an organic solvent, for example in acetone, chloroform or methanol, and to remove the solvent again, for example by distillation, after mixing.

The dielectrics may also comprise further additives known to the person skilled in the art and described in the literature. For example, from 0 to 15% of pleochroic dyes and/or chiral dopants may be added.

In the present application and in the following examples, the structures of the liquid-crystal compounds are indicated by means of acronyms, with the transformation into chemical formulae taking place in accordance with Tables A and B below. All radicals $C_nH_{2n+1}$ and $C_mH_{2m+1}$ are straight-chain alkyl radicals having n and m carbon atoms respectively; n and m are preferably 0, 1, 2, 3, 4, 5, 6 or 7. The coding in Table B is self-evident. In Table A, only the acronym for the parent structure is indicated. In individual cases, the acronym for the parent structure is followed, separated by a dash, by a code for the substituents $R^1$, $R^2$, $L^1$ and $L^2$.

| Code for $R^1$, $R^2, L^1, L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO•m | $OC_nH_{2n+1}$ | $C_mH_{2m+1}$ | H | H |
| n | $C_nH_{2n+1}$ | CN | H | H |
| nN•F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF•F | $C_nH_{2n+1}$ | F | H | F |

-continued

| Code for $R^1$, $R^2, L^1, L^2$ | $R^1$ | $R^2$ | $L^1$ | $L^2$ |
|---|---|---|---|---|
| nF•F•F | $C_nH_{2n+1}$ | F | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | $COOC_mH_{2m+1}$ | H | H |
| nOCCF$_2$•F•F | $C_nH_{2n+1}$ | OCH$_2$CHF$_2$ | F | F |
| V-n | CH$_2$=CH | $C_nH_{2n+1}$ | H | H |

Preferred mixture components of the mixture concept according to the invention are shown in Tables A and B:

TABLE A

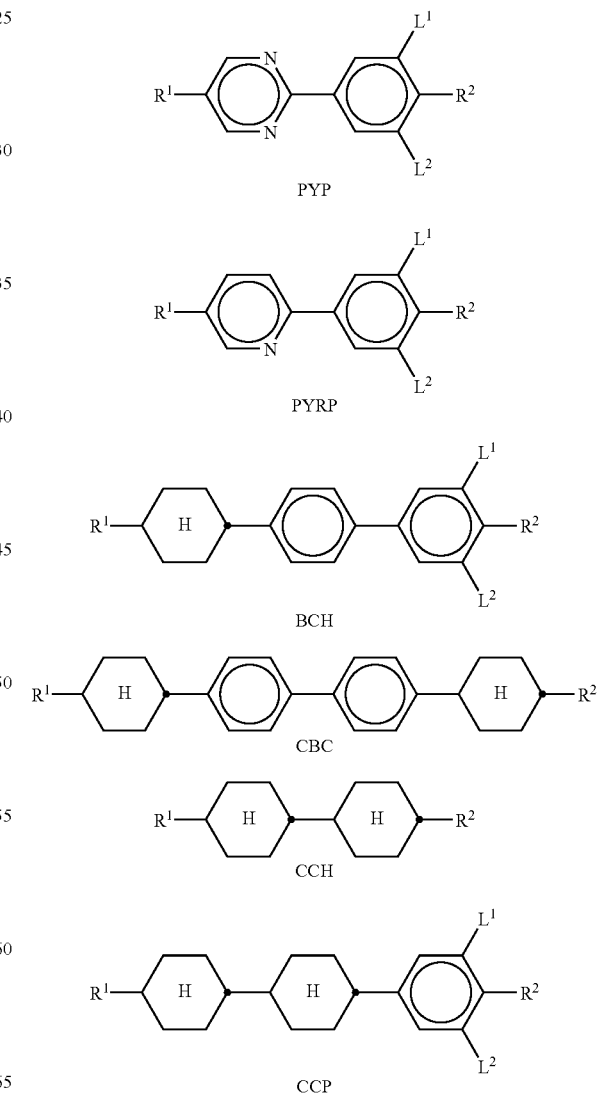

PYP

PYRP

BCH

CBC

CCH

CCP

TABLE A-continued
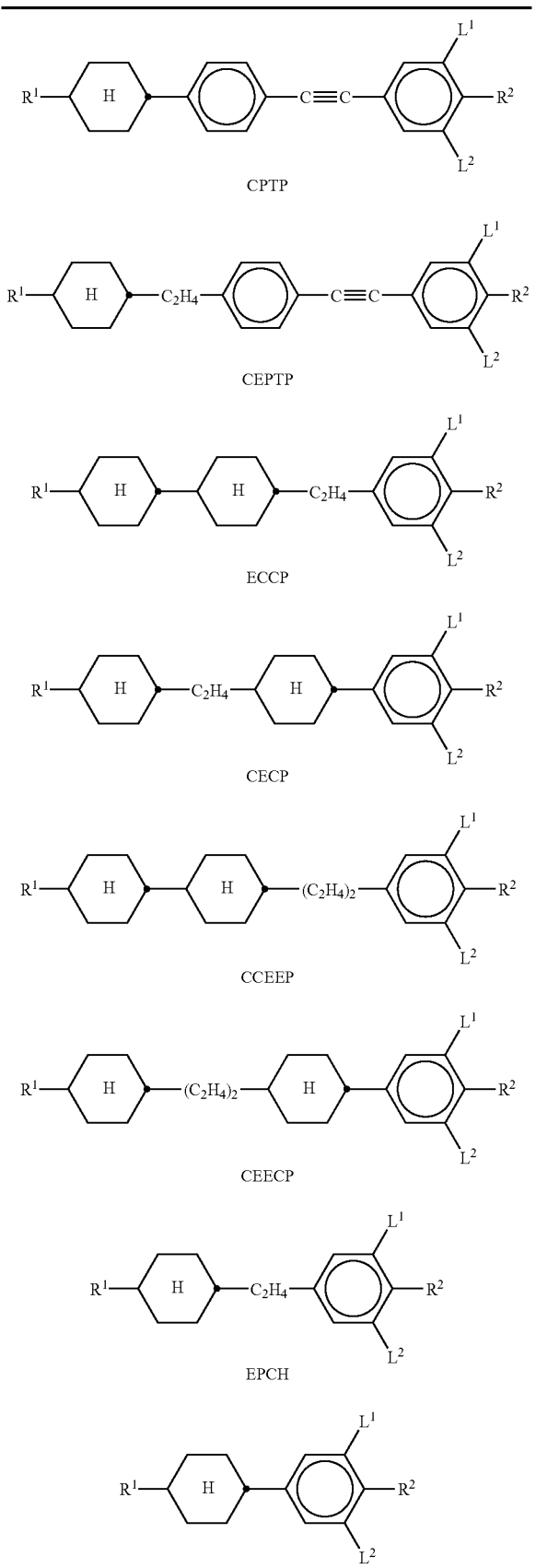
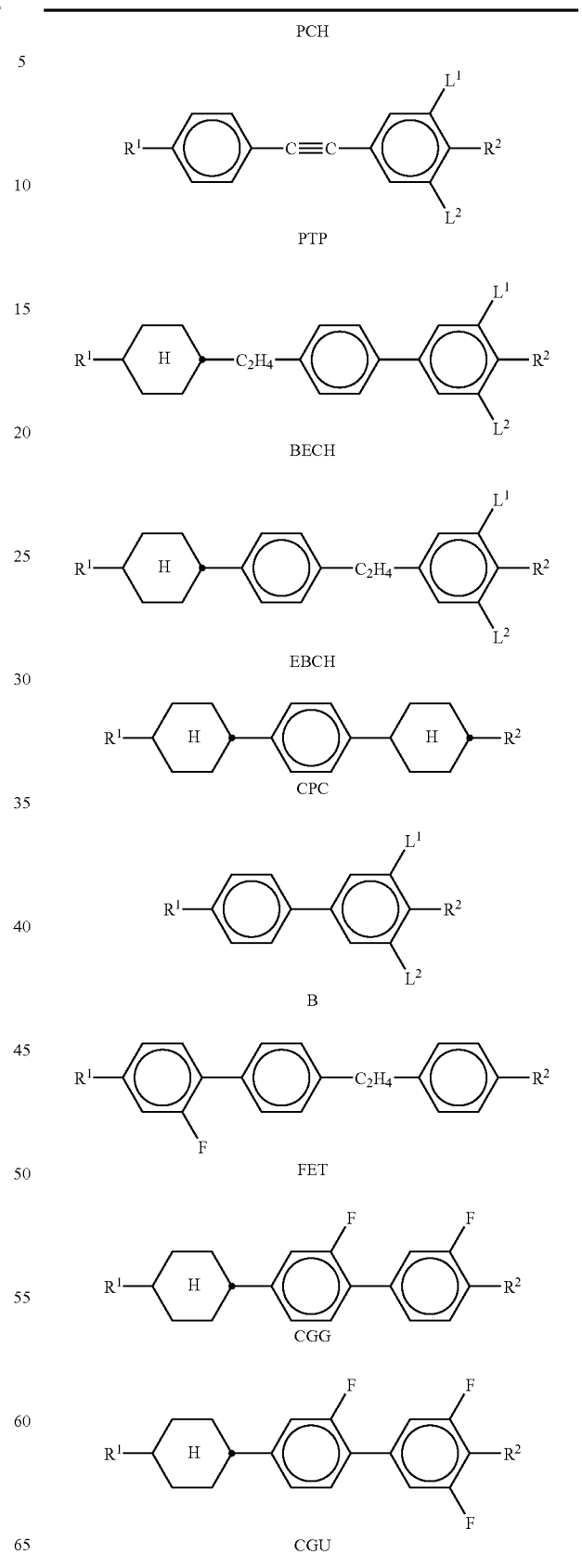

TABLE A-continued
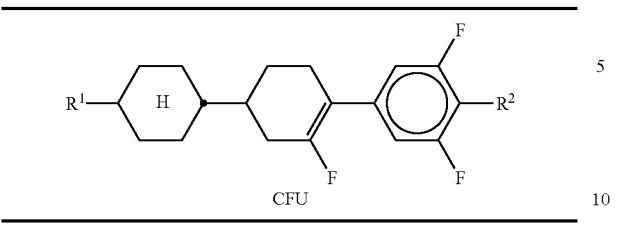
CFU
TABLE B
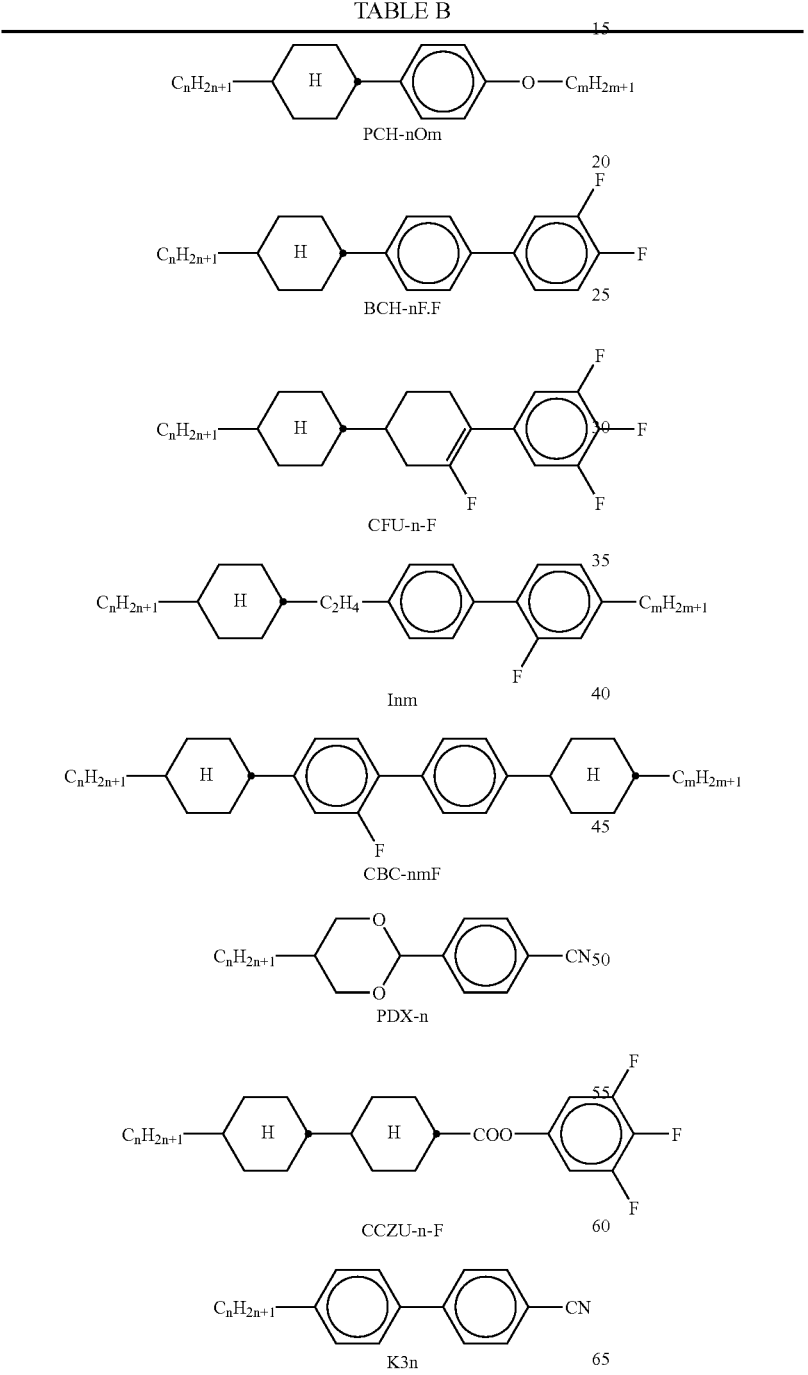

TABLE B-continued
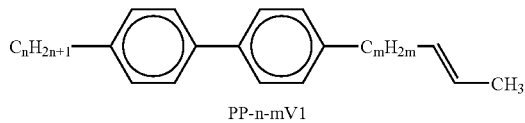
PP-n-mV1
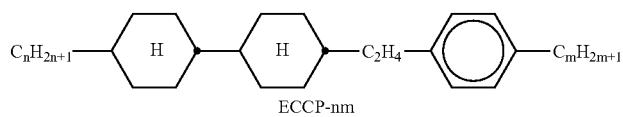
ECCP-nm
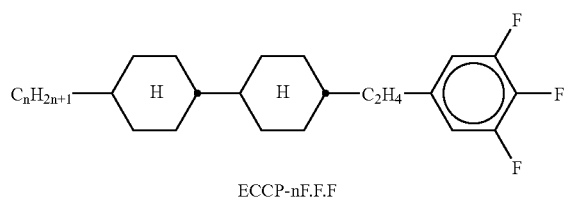
ECCP-nF.F.F
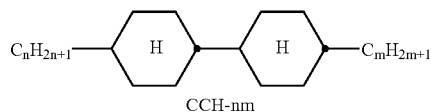
CCH-nm
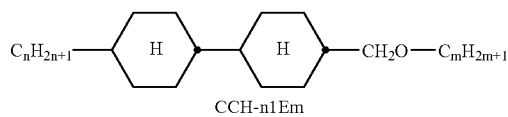
CCH-n1Em
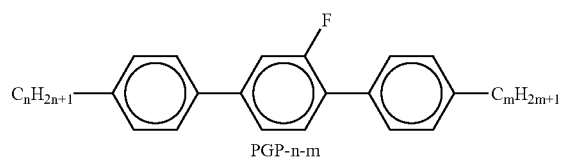
PGP-n-m
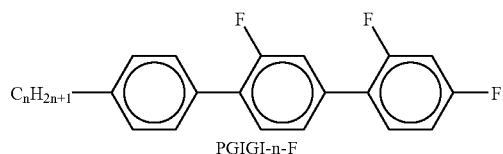
PGIGI-n-F
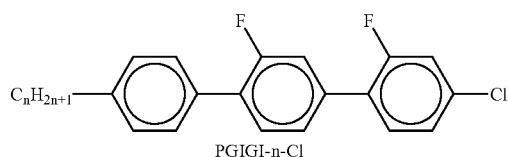
PGIGI-n-Cl
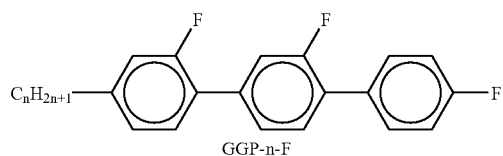
GGP-n-F
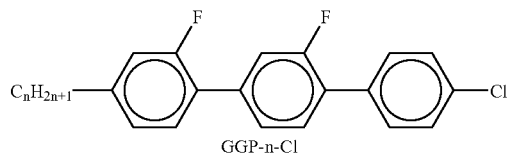
GGP-n-Cl TABLE B-continued
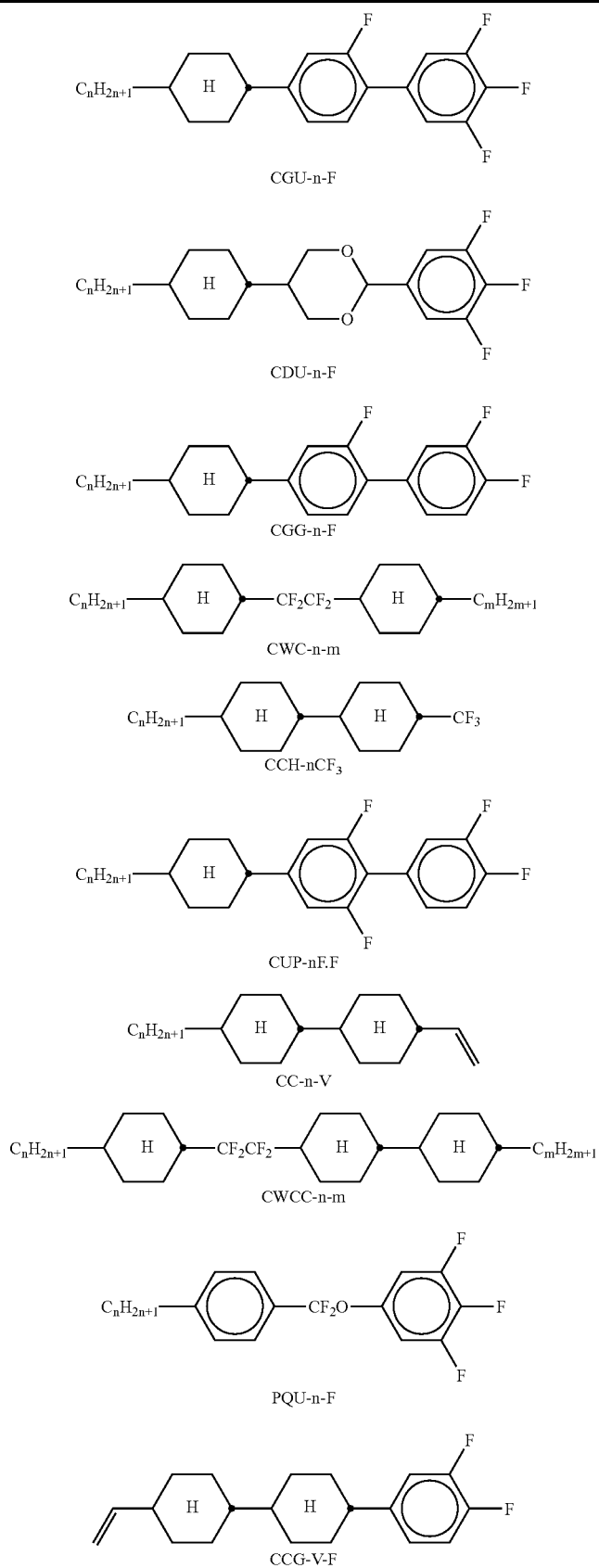

TABLE B-continued
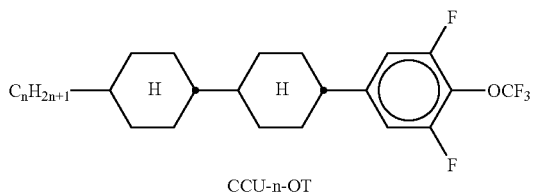
CCU-n-OT
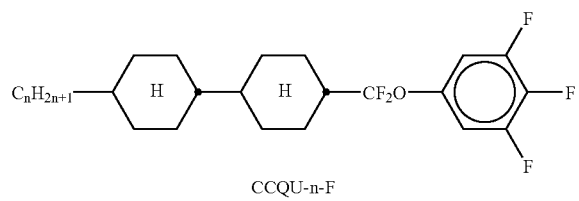
CCQU-n-F
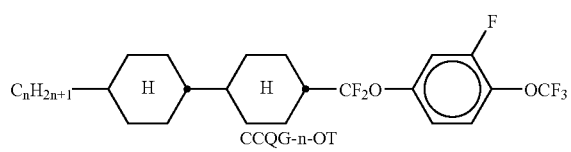
CCQG-n-OT
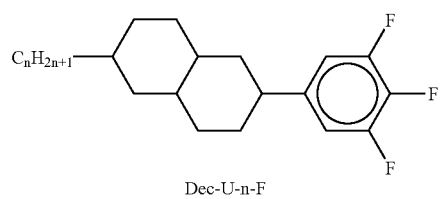
Dec-U-n-F
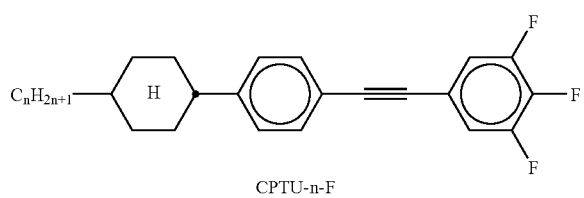
CPTU-n-F
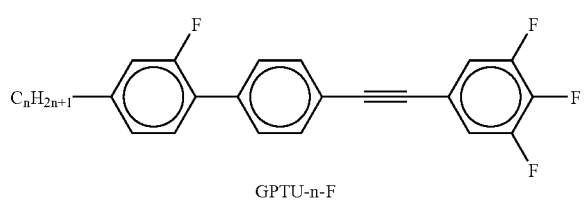
GPTU-n-F
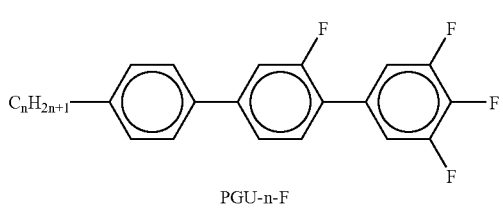
PGU-n-F
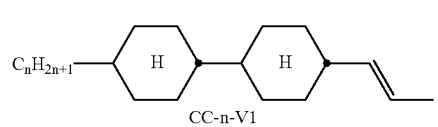
CC-n-V1
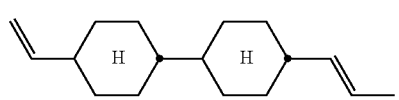

TABLE B-continued
CC-V-V1
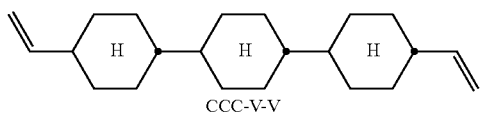
CCC-V-V
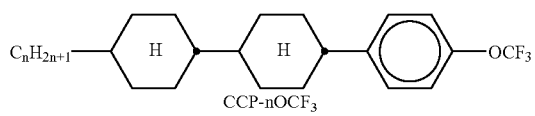
CCP-nOCF$_3$
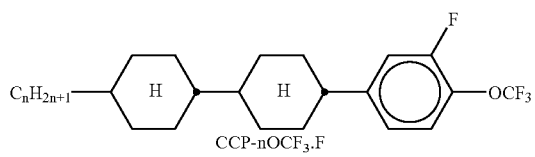
CCP-nOCF$_3$.F
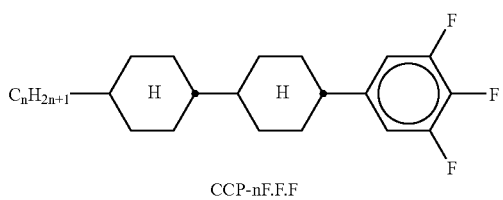
CCP-nF.F.F
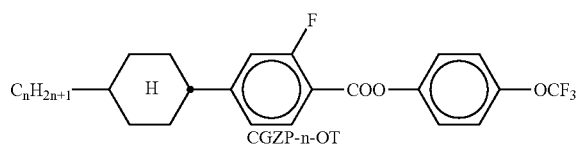
CGZP-n-OT
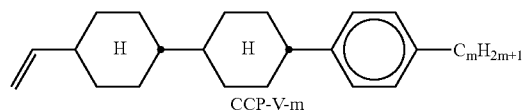
CCP-V-m
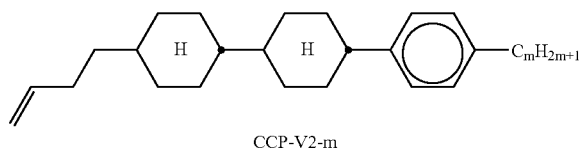
CCP-V2-m
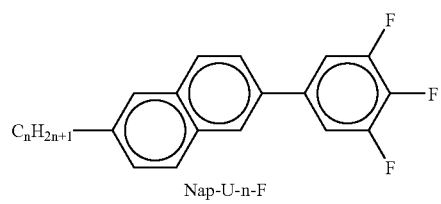
Nap-U-n-F
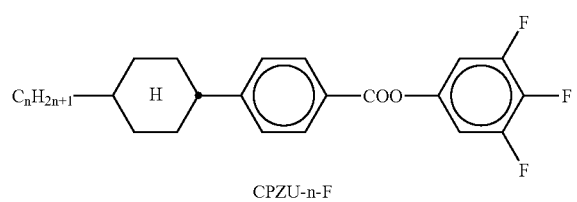
CPZU-n-F
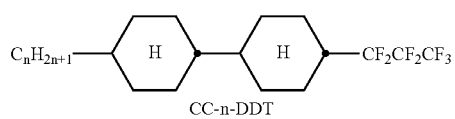
CC-n-DDT TABLE B-continued
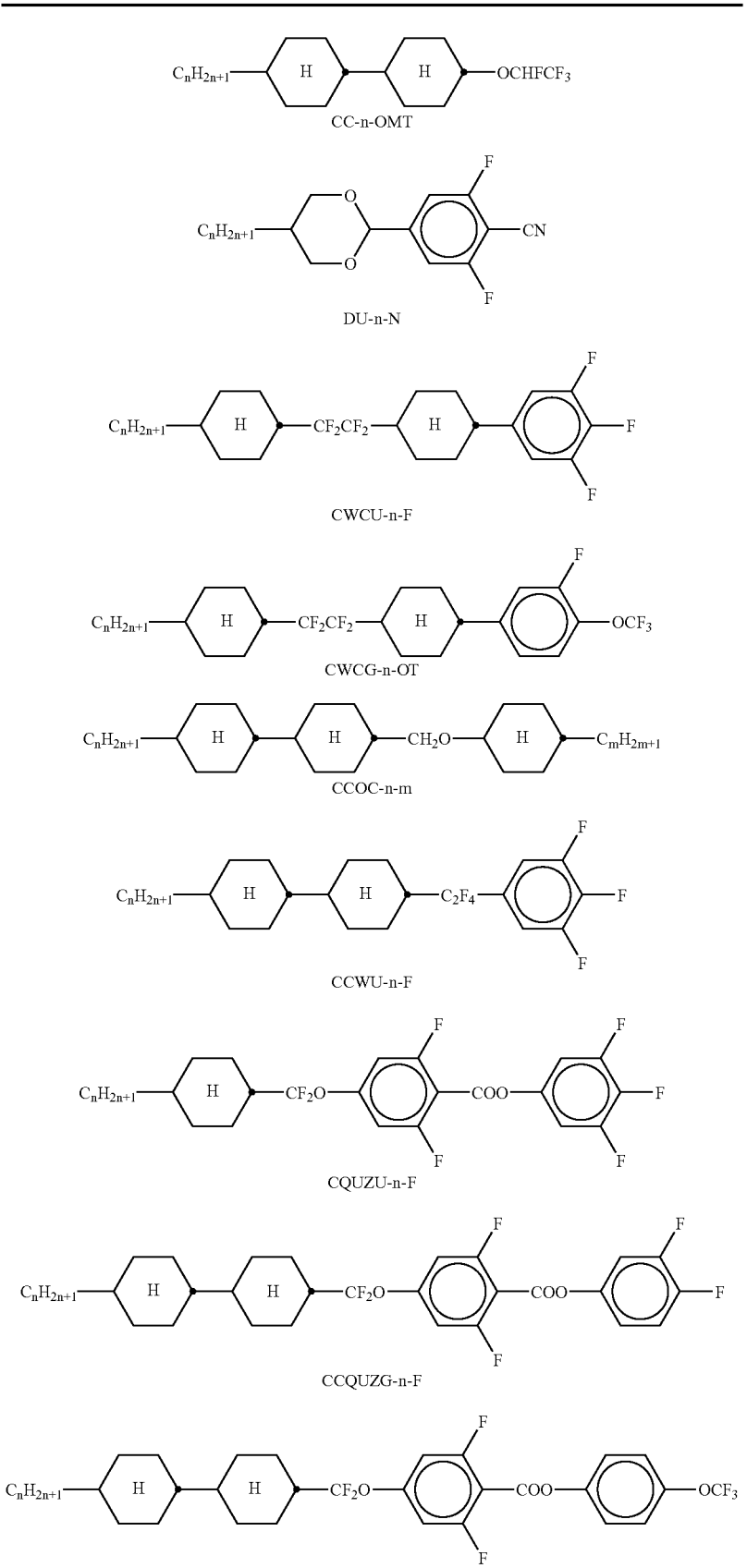

TABLE B-continued
CCQUZP-n-OT
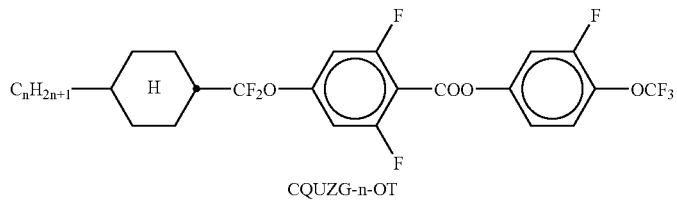
CQUZG-n-OT
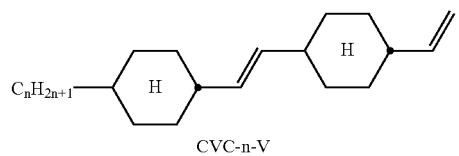
CVC-n-V
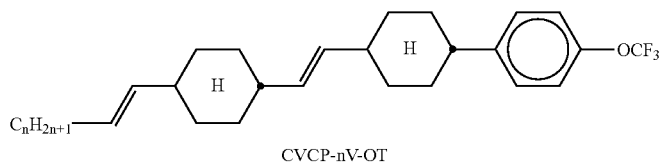
CVCP-nV-OT
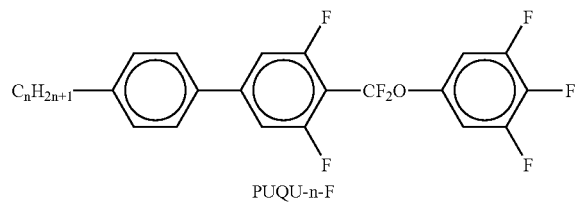
PUQU-n-F
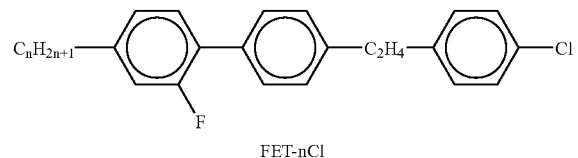
FET-nCl
TABLE C
Table C shows possible dopants which are preferably added to the mixtures according to the invention.
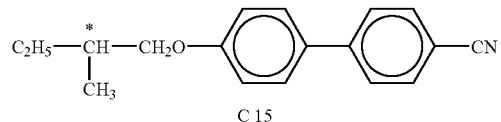
C 15
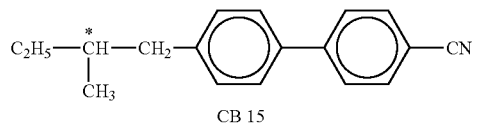
CB 15
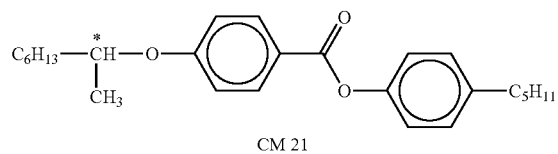
CM 21

TABLE C-continued
Table C shows possible dopants which are preferably added to the mixtures according to the invention.
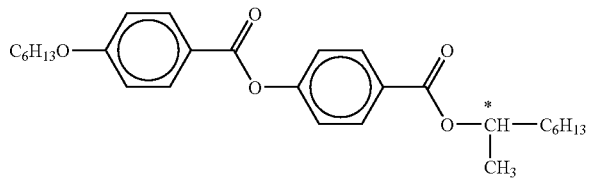
R/S-811
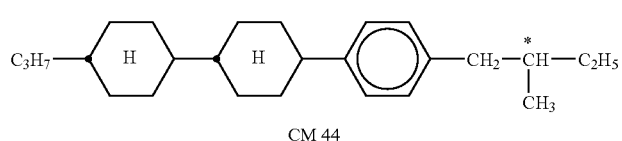
CM 44
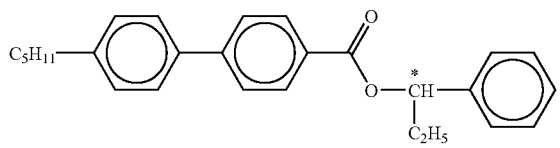
CM 45
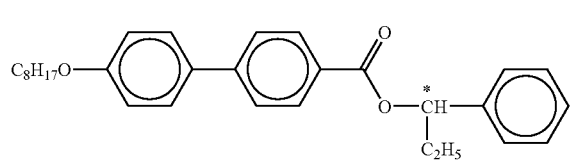
CM 47
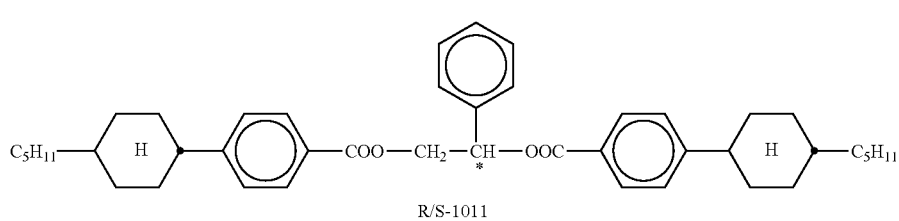
R/S-1011
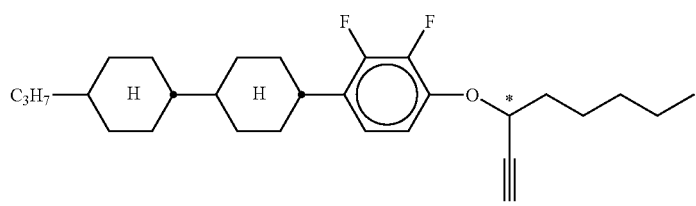
R/S-3011
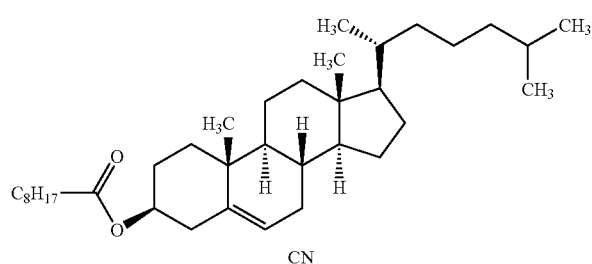
CN

TABLE C-continued
Table C shows possible dopants which are preferably added to the mixtures according to the invention.
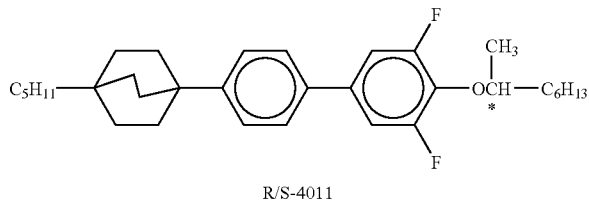
R/S-4011
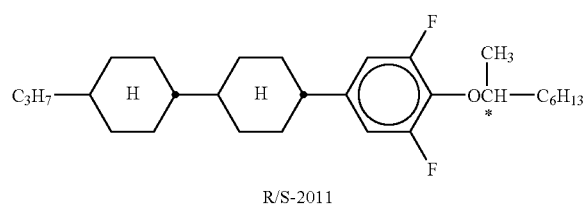
R/S-2011
TABLE D
Stabilisers which can be added, for example, to the mixtures according to the invention are mentioned below.
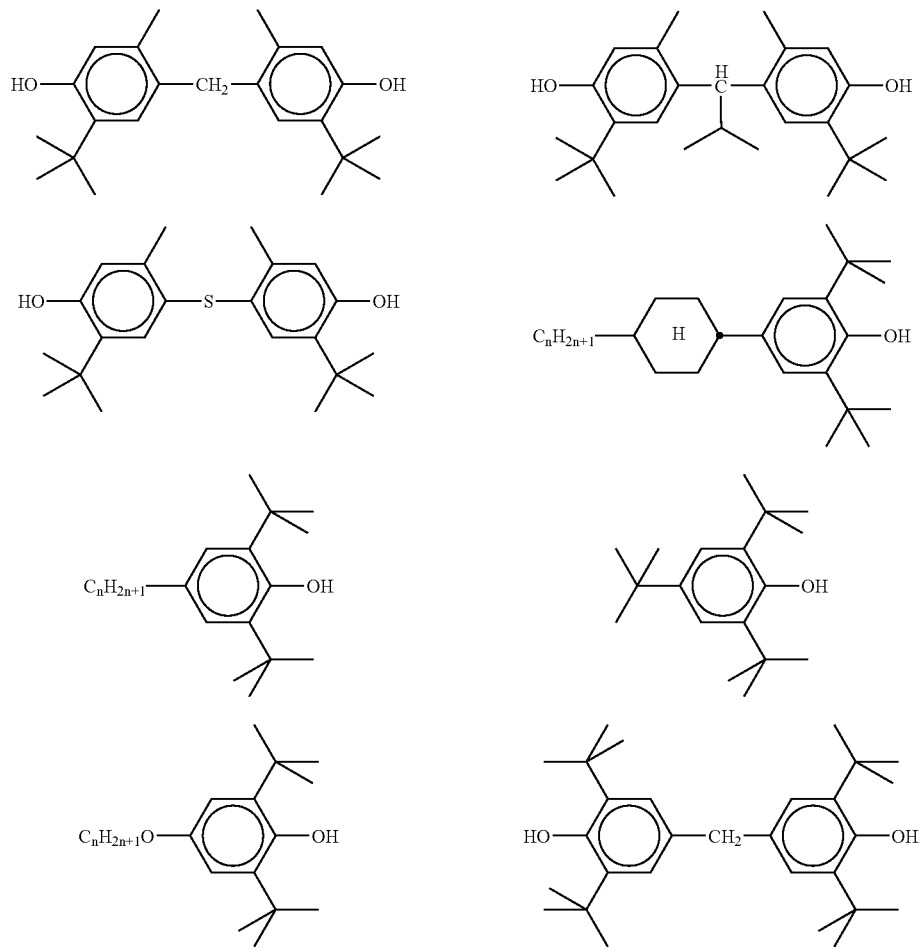

/ TABLE D-continued
Stabilisers which can be added, for example, to the mixtures according to the invention are mentioned below.
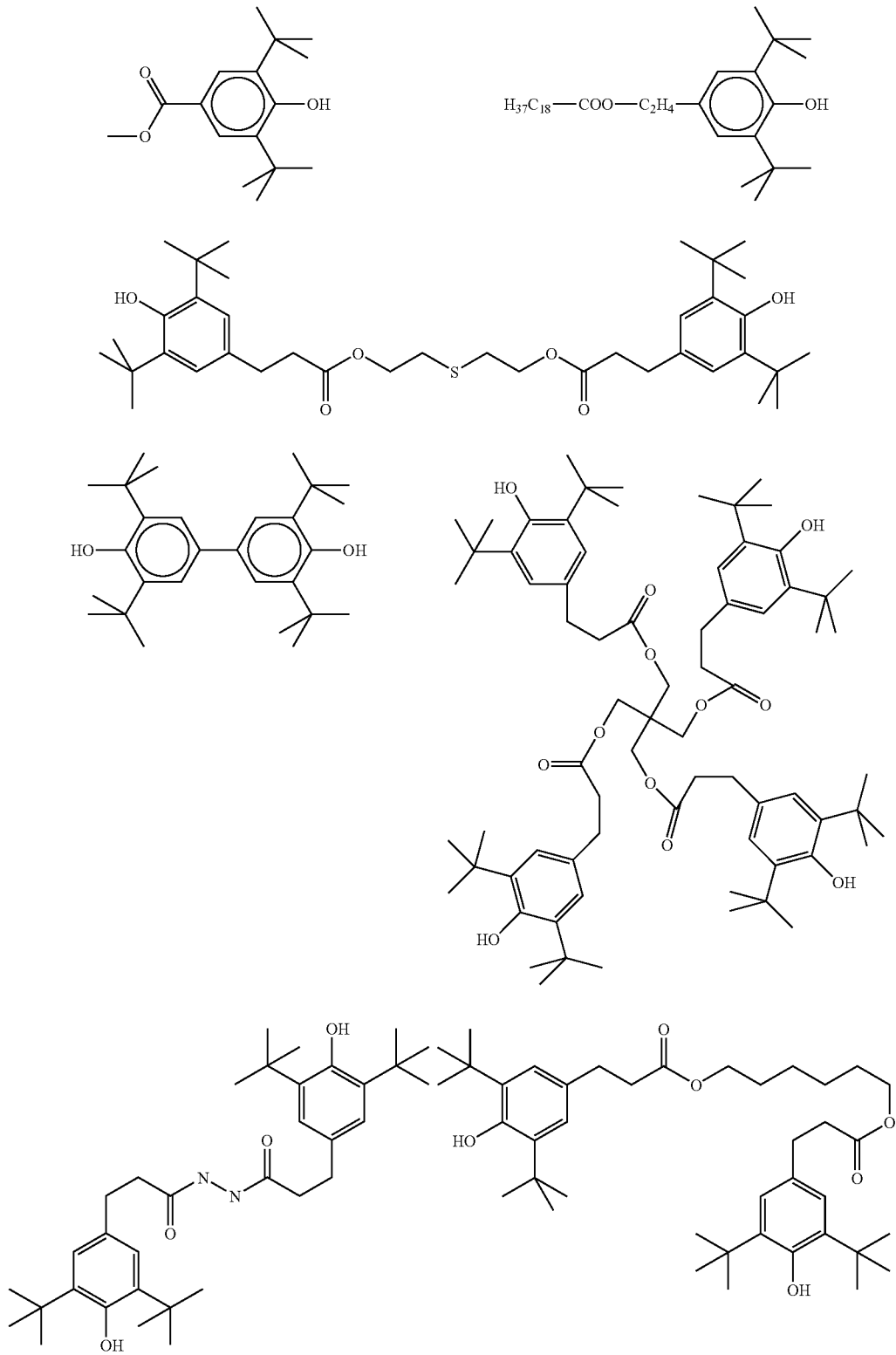

TABLE D-continued
Stabilisers which can be added, for example, to the mixtures according to the invention are mentioned below.
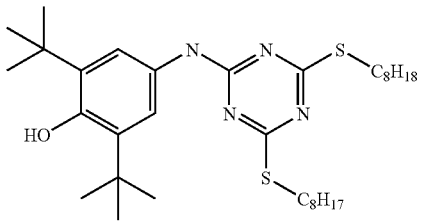
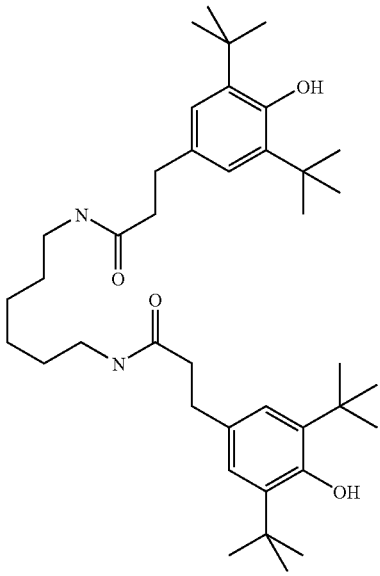
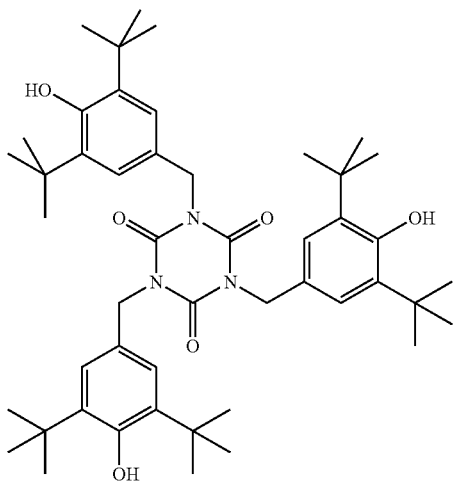
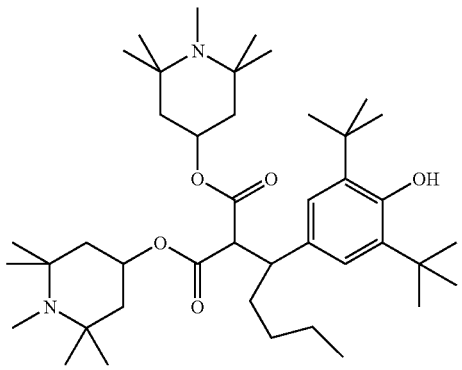
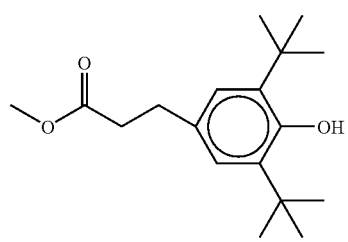
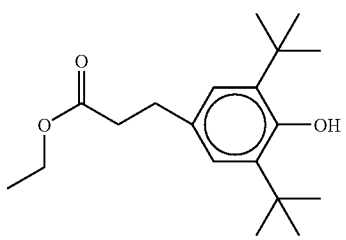
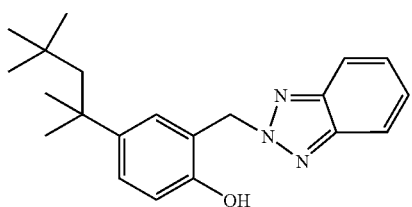
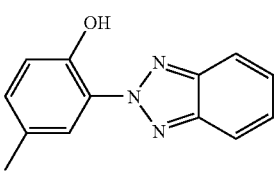

TABLE D-continued
Stabilisers which can be added, for example, to the mixtures according to the invention are mentioned below.
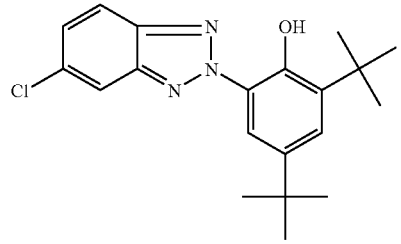
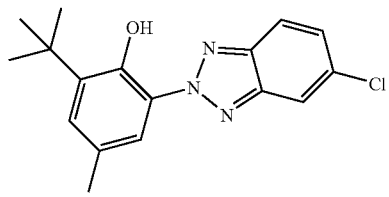
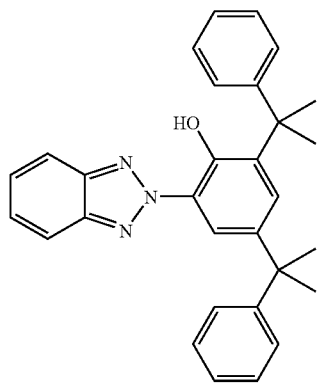
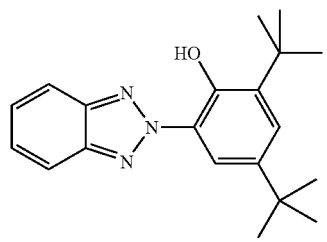
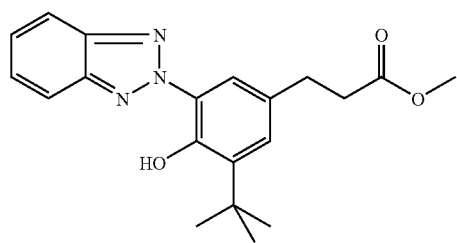
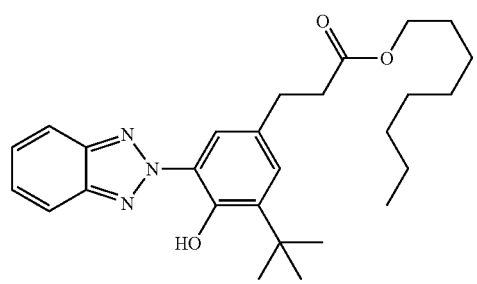

TABLE D-continued

Stabilisers which can be added, for example, to the mixtures according to the invention are mentioned below.

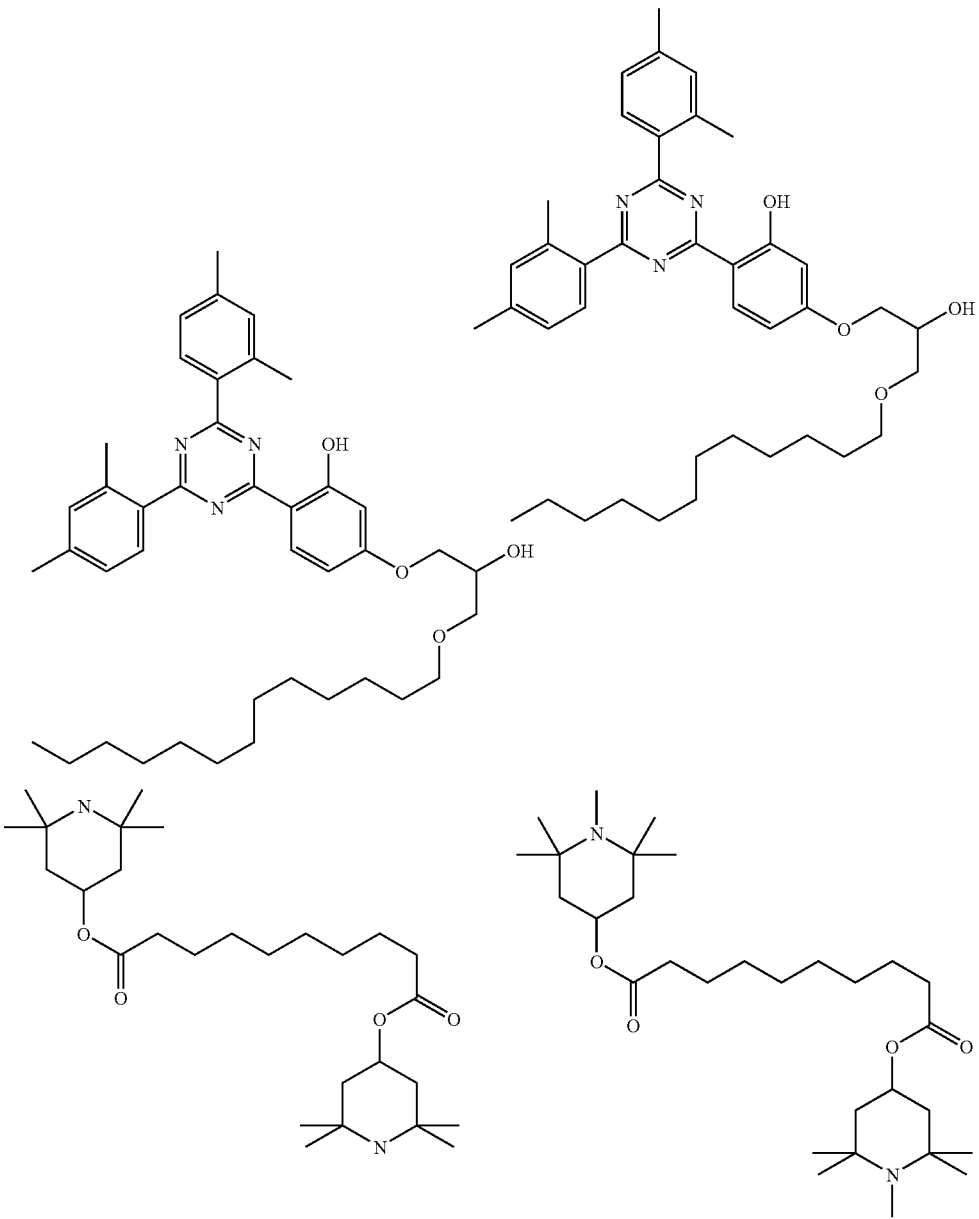

Besides one or more compounds of the formula I, particularly preferred mixtures comprise one, two, three, four, five or more compounds from Table B.

The following examples are intended to explain the invention without restricting it. Above and below, percentages are percent by weight. All temperatures are indicated in degrees Celsius. cl.p. denotes clearing point.

$\Delta n$ denotes the optical anisotropy (589 nm, 20° C.). The optical data were measured at 20° C., unless expressly stated otherwise. $\Delta\epsilon$ denotes the dielectric anisotropy ($\Delta\epsilon=\epsilon_\parallel-\epsilon_\perp$, where $\epsilon_\parallel$ denotes the dielectric constant parallel to the longitudinal molecular axes and $\epsilon_\perp$ denotes the dielectric constant perpendicular thereto). The electro-optical data were measured in a TN cell at the 1st minimum (i.e. at a d·$\Delta n$ value of 0.5 µm) at 20° C., unless expressly stated otherwise. The rotational viscosity $\gamma_1$ (mPa·s) was determined at 20° C.

$V_{10}$ denotes the threshold voltage, i.e. the characteristic voltage at a relative contrast of 10%, $V_{50}$ denotes the characteristic voltage at a relative contrast of 50% and $V_{90}$ denotes the characteristic voltage at a relative contrast of 90%. $V_0$ denotes the capacitive threshold voltage. The twist is 90°, unless indicated otherwise.

The elastic constants $K_1$ and $K_3$ were determined at 20° C. $K_3/K_1$ is the ratio of the elastic constants $K_3$ and $K_1$.

EXAMPLES

Example 1

| | | | |
|---|---|---|---|
| CCP-20CF$_3$ | 2.0% | Clearing point [° C.]: | 80.0 |
| CCP-30CF$_3$ | 8.0% | Δn [589 nm, 20° C.]: | 0.0934 |
| CCZU-3-F | 14.0% | Δε [1 kHz, 20° C.]: | 6.0 |
| CC-3-V1 | 10.0% | γ$_1$ [mPa · s, 20° C.]: | 70 |
| PCH-301 | 7.0% | V$_{10}$ [V]: | 1.64 |
| CCP-V-1 | 12.0% | V$_{50}$ [V]: | 1.99 |
| CCG-V-F | 10.0% | V$_{90}$ [V]: | 2.48 |
| CC-4-V | 18.0% | V$_{90}$/V$_{10}$: | 1.509 |
| PUQU-2-F | 6.0% | | |
| PUQU-3-F | 8.0% | | |
| PGP-2-3 | 5.0% | | |

Example 2

| | | | |
|---|---|---|---|
| CCP-20CF$_3$ | 4.0% | Clearing point [° C.]: | 79.0 |
| CCP-30CF$_3$ | 8.0% | Δn [589 nm, 20° C.]: | 0.0960 |
| CCZU-3-F | 14.0% | | |
| CC-3-V1 | 10.0% | | |
| PCH-301 | 9.0% | | |
| CCP-V-1 | 16.0% | | |
| CC-4-V | 18.0% | | |
| PUQU-1-F | 8.0% | | |
| PUQU-2-F | 7.0% | | |
| PGP-3-2 | 6.0% | | |

Example 3

| | | | |
|---|---|---|---|
| CCP-20CF$_3$ | 2.0% | Clearing point [° C.]: | 81.5 |
| CCP-30CF$_3$ | 8.0% | Δn [589 nm, 20° C.]: | 0.0940 |
| CCZU-3-F | 14.0% | Δε [1 kHz, 20° C.]: | 6.2 |
| CC-3-V1 | 10.0% | γ$_1$ [mPa · s, 20° C.]: | 70 |
| PCH-301 | 6.0% | V$_{10}$ [V]: | 1.67 |
| CCP-V-1 | 13.0% | V$_{50}$ [V]: | 2.02 |
| CCG-V-F | 10.0% | V$_{90}$ [V]: | 2.53 |
| CC-4-V | 18.0% | V$_{90}$/V$_{10}$: | 1.512 |
| PUQU-1-F | 8.0% | | |
| PUQU-2-F | 6.0% | | |
| PGP-3-2 | 5.0% | | |

Example 4

| | | | |
|---|---|---|---|
| CCP-30CF$_3$ | 8.0% | Clearing point [° C.]: | 82.0 |
| CCZU-3-F | 13.0% | Δn [589 nm, 20° C.]: | 0.0925 |
| CC-3-V1 | 10.0% | Δε [1 kHz, 20° C.]: | 6.1 |
| CCP-V-1 | 13.0% | | |
| CCG-V-F | 10.0% | | |
| CC-4-V | 18.0% | | |
| PUQU-1-F | 8.0% | | |
| PUQU-2-F | 7.0% | | |
| PGP-3-2 | 5.0% | | |
| CVC-3-V | 8.0% | | |

Example 5

| | | | |
|---|---|---|---|
| PGU-2-F | 2.0% | Clearing point [° C.]: | 80.5 |
| CCP-20CF$_3$ | 7.0% | Δn [589 nm, 20° C.]: | 0.0942 |
| CCP-30CF$_3$ | 7.0% | V$_{10}$ [V]: | 1.65 |
| CCZU-3-F | 14.0% | | |
| CC-3-V1 | 10.0% | | |
| PCH-301 | 3.0% | | |
| CCP-V-1 | 10.0% | | |
| CCG-V-F | 10.0% | | |
| CC-4-V | 18.0% | | |
| PUQU-2-F | 6.0% | | |
| PUQU-3-F | 8.0% | | |
| PGP-2-4 | 5.0% | | |

Example 6

| | | | |
|---|---|---|---|
| PGU-2-F | 7.0% | Clearing point [° C.]: | 79.0 |
| CC-3-V1 | 10.0% | Δn [589 nm, 20° C.]: | 0.1036 |
| CCP-V-1 | 12.0% | Δε [1 kHz, 20° C.]: | 5.0 |
| CCP-V2-1 | 3.0% | γ$_1$ [mPa · s, 20° C.]: | 67 |
| CCG-V-F | 10.0% | V$_{10}$ [V]: | 1.78 |
| CCP-20CF$_3$ | 4.0% | V$_{50}$ [V]: | 2.13 |
| CCP-30CF$_3$ | 4.0% | V$_{90}$ [V]: | 2.65 |
| CCP-40CF$_3$ | 2.0% | V$_{90}$/V$_{10}$: | 1.490 |
| CCZU-3-F | 5.0% | | |
| PCH-301 | 8.0% | | |
| CC-4-V | 18.0% | | |
| PUQU-2-F | 4.0% | | |
| PUQU-3-F | 5.0% | | |
| PGP-2-4 | 8.0% | | |

Example 7

| | | | |
|---|---|---|---|
| CC-4-V | 18.0% | Clearing point [° C.]: | 79.5 |
| CC-3-V1 | 11.0% | Δn [589 nm, 20° C.]: | 0.0939 |
| PCH-302 | 9.0% | Δε [1 kHz, 20° C.]: | 6.0 |
| CCP-20CF$_3$ | 7.5% | γ$_1$ [mPa · s, 20° C.]: | 71 |
| CCP-30CF$_3$ | 8.0% | V$_{10}$ [V]: | 1.80 |
| CCZU-3-F | 13.0% | V$_{50}$ [V]: | 2.15 |
| PGP-2-3 | 5.5% | V$_{90}$ [V]: | 2.65 |
| PGP-2-4 | 5.0% | V$_{90}$/V$_{10}$: | 1.474 |
| CCQU-2-F | 6.0% | | |
| CCQU-3-F | 10.0% | | |
| PUQU-2-F | 3.0% | | |
| PUQU-3-F | 4.0% | | |

Example 8

| | | | |
|---|---|---|---|
| CCP-20CF$_3$ | 4.0% | Clearing point [° C.]: | 79.0 |
| CCP-30CF$_3$ | 4.0% | Δn [589 nm, 20° C.]: | 0.0927 |
| CCP-40CF$_3$ | 4.0% | Δε [1 kHz, 20° C.]: | 5.1 |
| CCZU-3-F | 9.0% | γ$_1$ [mPa · s, 20° C.]: | 65 |
| CC-3-V1 | 10.0% | V$_{10}$ [V]: | 1.76 |
| PCH-301 | 9.0% | V$_{50}$ [V]: | 2.13 |
| CCP-V-1 | 14.0% | V$_{90}$ [V]: | 2.66 |
| CCG-V-F | 10.0% | V$_{90}$/V$_{10}$: | 1.513 |
| CC-4-V | 18.0% | | |
| PUQU-2-F | 6.0% | | |

| | | | |
|---|---|---|---|
| PUQU-3-F | 7.0% | | |
| PGP-2-3 | 5.0% | | |

Example 9

| | | | |
|---|---|---|---|
| CCP-30CF$_3$ | 7.0% | Clearing point [° C.]: | 79.5 |
| CCZU-2-F | 2.0% | Δn [589 nm, 20° C.]: | 0.0947 |
| CCZU-3-F | 14.0% | Δε [1 kHz, 20° C.]: | 6.0 |
| PUQU-2-F | 6.0% | γ$_1$ [mPa·s, 20° C.]: | 68 |
| PUQU-3-F | 8.0% | V$_{10}$ [V]: | 1.72 |
| CCP-V-1 | 8.0% | | |
| CC-3-V1 | 12.0% | | |
| CC-4-V | 18.0% | | |
| PCH-301 | 10.0% | | |
| PGP-2-3 | 6.0% | | |
| CVCP-1V-OT | 9.0% | | |

Example 10

| | | | |
|---|---|---|---|
| CCZU-2-F | 3.0% | Clearing point [° C.]: | 79.0 |
| CCZU-3-F | 14.0% | Δn [589 nm, 20° C.]: | 0.0935 |
| PCH-302 | 10.0% | Δε [1 kHz, 20° C.]: | 6.1 |
| CCP-V-1 | 9.0% | γ$_1$ [mPa·s, 20° C.]: | 70 |
| CCG-V-F | 5.0% | V$_{10}$ [V]: | 1.67 |
| CC-3-V1 | 12.0% | | |
| CC-4-V | 18.0% | | |
| PUQU-2-F | 6.0% | | |
| PUQU-3-F | 8.0% | | |
| PGP-2-3 | 5.0% | | |
| CVCP-1V-OT | 10.0% | | |

Example 11

| | | | |
|---|---|---|---|
| PGU-2-F | 4.0% | Clearing point [° C.]: | 80.5 |
| CC-3-V1 | 10.0% | γ$_1$ [mPa·s, 20° C.]: | 67 |
| CCP-V-1 | 14.0% | V$_{10}$ [V]: | 1.80 |
| CCG-V-F | 10.0% | | |
| CCP-20CF$_3$ | 6.0% | | |
| CCP-30CF$_3$ | 6.0% | | |
| CCP-40CF$_3$ | 4.0% | | |
| PCH-301 | 6.0% | | |
| CC-4-V | 18.0% | | |
| PUQU-2-F | 6.0% | | |
| PUQU-3-F | 8.0% | | |
| PGP-2-3 | 8.0% | | |

Example 12

| | | | |
|---|---|---|---|
| PGU-2-F | 6.0% | Clearing point [° C.]: | 80.0 |
| PGU-3-F | 2.0% | Δn [589 nm, 20° C.]: | 0.1048 |
| CC-3-V1 | 11.0% | Δε [1 kHz, 20° C.]: | 5.7 |
| CCP-V-1 | 12.0% | γ$_1$ [mPa·s, 20° C.]: | 69 |
| CCG-V-F | 10.0% | V$_{10}$ [V]: | 1.68 |
| CCP-30CF$_3$ | 6.0% | V$_{50}$ [V]: | 2.02 |
| CCZU-3-F | 12.0% | V$_{90}$ [V]: | 2.48 |
| PCH-301 | 7.0% | V$_{90}$/V$_{10}$: | 1.478 |
| CC-4-V | 18.0% | | |
| PUQU-2-F | 4.0% | | |
| PUQU-3-F | 4.0% | | |
| PGP-2-3 | 8.0% | | |

Example 13

| | | | |
|---|---|---|---|
| CCZU-2-F | 3.0% | Clearing point [° C.]: | 80.0 |
| CCZU-3-F | 14.0% | Δn [589 nm, 20° C.]: | 0.0934 |
| PUQU-2-F | 6.0% | Δε [1 kHz, 20° C.]: | 6.1 |
| PUQU-3-F | 8.0% | γ$_1$ [mPa·s, 20° C.]: | 69 |
| CCG-V-F | 9.0% | V$_{10}$ [V]: | 1.67 |
| CCP-V-1 | 12.0% | V$_{50}$ [V]: | 2.01 |
| CC-3-V1 | 13.0% | V$_{90}$ [V]: | 2.52 |
| CC-4-V | 18.0% | V$_{90}$/V$_{10}$: | 1.511 |
| PCH-301 | 5.0% | | |
| PGP-2-4 | 6.0% | | |
| CVCP-2V-OT | 6.0% | | |

Example 14

| | | | |
|---|---|---|---|
| PUQU-2-F | 10.0% | Clearing point [° C.]: | 79.0 |
| PUQU-3-F | 10.0% | Δn [589 nm, 20° C.]: | 0.0943 |
| CCP-V-1 | 16.0% | Δε [1 kHz, 20° C.]: | 5.6 |
| CCP-V2-1 | 4.0% | γ$_1$ [mPa·s, 20° C.]: | 67 |
| CCG-V-F | 10.0% | V$_{10}$ [V]: | 1.78 |
| CC-3-V1 | 13.0% | V$_{50}$ [V]: | 2.15 |
| CC-4-V | 18.0% | V$_{90}$ [V]: | 2.71 |
| PCH-301 | 6.0% | V$_{90}$/V$_{10}$: | 1.522 |
| PGP-2-4 | 2.0% | | |
| CVCP-1V-OT | 11.0% | | |

Example 15

| | | | |
|---|---|---|---|
| CCZU-3-F | 6.0% | Clearing point [° C.]: | 79.0 |
| CCP-V-1 | 16.0% | Δn [589 nm, 20° C.]: | 0.0940 |
| CCG-V-F | 10.0% | Δε [1 kHz, 20° C.]: | 5.8 |
| CC-4-V | 18.0% | γ$_1$ [mPa·s, 20° C.]: | 65 |
| CC-3-V1 | 13.0% | V$_{10}$ [V]: | 1.71 |
| PCH-301 | 6.0% | V$_{50}$ [V]: | 2.06 |
| PUQU-1-F | 9.0% | V$_{90}$ [V]: | 2.59 |
| PUQU-2-F | 9.0% | V$_{90}$/V$_{10}$: | 1.519 |
| PGP-2-4 | 3.0% | | |
| CVCP-1V-OT | 10.0% | | |

Example 16

| | | | |
|---|---|---|---|
| CCZU-3-F | 12.0% | Clearing point [° C.]: | 79.0 |
| PUQU-2-F | 8.0% | Δn [589 nm, 20° C.]: | 0.0938 |
| PUQU-3-F | 9.0% | Δε [1 kHz, 20° C.]: | 5.8 |
| CCP-V-1 | 12.0% | γ$_1$ [mPa·s, 20° C.]: | 68 |
| CC-3-V1 | 12.0% | V$_{10}$ [V]: | 1.72 |
| CC-4-V | 18.0% | V$_{50}$ [V]: | 2.08 |
| PCH-301 | 11.0% | V$_{90}$ [V]: | 2.59 |

-continued

| | | | |
|---|---|---|---|
| PGP-2-3 | 4.0% | $V_{90}/V_{10}$: | 1.506 |
| CVCP-1V-OT | 10.0% | | |
| CCC-V-V | 4.0% | | |

Example 17

| | | | |
|---|---|---|---|
| CCZU-3-F | 7.0% | Clearing point [° C.]: | 80.0 |
| CCP-V-1 | 16.0% | Δn [589 nm, 20° C.]: | 0.0936 |
| CCG-V-F | 10.0% | Δε [1 kHz, 20° C.]: | 5.9 |
| CC-4-V | 18.0% | $\gamma_1$ [mPa·s, 20° C.]: | 67 |
| CC-3-V1 | 13.0% | $V_{10}$ [V]: | 1.71 |
| PCH-301 | 5.0% | $V_{50}$ [V]: | 2.07 |
| PUQU-2-F | 9.0% | $V_{90}$ [V]: | 2.60 |
| PUQU-3-F | 9.0% | $V_{90}/V_{10}$: | 1.518 |
| PGP-2-4 | 3.0% | | |
| CVCP-1V-OT | 10.0% | | |

Example 18

| | | | |
|---|---|---|---|
| CCZU-2-F | 4.0% | Clearing point [° C.]: | 80.0 |
| CCZU-3-F | 14.0% | Δn [589 nm, 20° C.]: | 0.0941 |
| CCP-20CF3 | 4.0% | Δε [1 kHz, 20° C.]: | 7.4 |
| CCP-30CF3 | 3.0% | $\gamma_1$ [mPa·s, 20° C.]: | 66 |
| CCP-V-1 | 14.0% | $V_{10}$ [V]: | 1.55 |
| COG-V-F | 5.0% | $V_{50}$ [V]: | 1.87 |
| PUQU-1-F | 10.0% | $V_{90}$ [V]: | 2.33 |
| PUQU-2-F | 8.0% | $V_{90}/V_{10}$: | 1.505 |
| PGP-2-4 | 5.0% | | |
| CC-3-V1 | 13.0% | | |
| CC-3-V | 20.0% | | |

Example 19

| | | | |
|---|---|---|---|
| PGU-1-F | 5.0% | Clearing point [° C.]: | 79.0 |
| PGU-2-F | 4.0% | Δn [589 nm, 20° C.]: | 0.1047 |
| CC-3-V1 | 12.0% | Δε [1 kHz, 20° C.]: | 5.3 |
| CCP-V-1 | 14.0% | $\gamma_1$ [mPa·s, 20° C.]: | 65 |
| CCG-V-F | 5.0% | $V_{10}$ [V]: | 1.72 |
| CCP-30CF3 | 6.0% | $V_{50}$ [V]: | 2.07 |
| CCZU-3-F | 12.0% | $V_{90}$ [V]: | 2.57 |
| PCH-301 | 9.0% | $V_{90}/V_{10}$: | 1.496 |
| CC-4-V | 18.0% | | |
| PUQU-2-F | 3.0% | | |
| PUQU-3-F | 4.0% | | |
| PGP-2-4 | 8.0% | | |

Example 20

| | | | |
|---|---|---|---|
| CCZU-2-F | 4.0% | Clearing point [° C.]: | 78.0 |
| CCZU-3-F | 14.0% | Δn [589 nm, 20° C.]: | 0.0992 |
| PUQU-1-F | 8.0% | Δε [1 kHz, 20° C.]: | 5.8 |
| PUQU-2-F | 6.0% | $\gamma_1$ [mPa·s, 20° C.]: | 66 |
| CCP-V-1 | 13.0% | $V_{10}$ [V]: | 1.67 |
| CCG-V-F | 7.0% | $V_{50}$ [V]: | 2.00 |
| CC-3-V1 | 15.0% | $V_{90}$ [V]: | 2.47 |
| CC-4-V | 18.0% | $V_{90}/V_{10}$: | 1.480 |
| PCH-301 | 5.0% | | |
| PGP-2-3 | 4.0% | | |
| PGP-2-4 | 6.0% | | |

Example 21

| | | | |
|---|---|---|---|
| CCP-20CF3 | 4.0% | Clearing point [° C.]: | 76.0 |
| CCP-30CF3 | 4.0% | Δε [1 kHz, 20° C.]: | 5.4 |
| CCZU-3-F | 4.0% | $\gamma_1$ [mPa·s, 20° C.]: | 58 |
| PUQU-1-F | 8.0% | | |
| PUQU-2-F | 8.0% | | |
| CC-3-V1 | 6.0% | | |
| CVCP-1V-OT | 14.0% | | |
| CVCP-2V-OT | 4.0% | | |
| PGP-2-4 | 8.0% | | |
| CC-V-V1 | 40.0% | | |

Comparative Example 1

| | | | |
|---|---|---|---|
| CCP-2F·F·F | 9.5% | Clearing point [° C.]: | 80.0 |
| CCP-3F·F·F | 1.5% | Δn [589 nm, 20° C.]: | 0.0773 |
| CCZU-2-F | 3.5% | Δε [1 kHz, 20° C.]: | 6.0 |
| CCZU-3-F | 9.0% | $\gamma_1$ [mPa·s, 20° C.]: | 81 |
| CCP-20CF$_3$ | 6.0% | $V_{10}$ [V]: | 1.60 |
| CCP-30CF$_3$ | 4.0% | $V_{50}$ [V]: | 1.97 |
| CC-5-V | 20.0% | $V_{90}$ [V]: | 2.45 |
| CC-3-V1 | 5.0% | $V_{90}/V_{10}$: | 1.526 |
| PCH-301 | 6.0% | | |
| CGZP-2-OT | 9.0% | | |
| CCP-V-1 | 4.0% | | |
| CCG-V-F | 10.5% | | |
| CGU-2-F | 5.0% | | |
| CCH-35 | 3.5% | | |
| CCP-20CF$_3$·F | 3.5% | | |

Example 22

| | | | |
|---|---|---|---|
| PGP-2-3 | 6.0% | Clearing point [° C.]: | 75.0 |
| PGP-2-4 | 6.0% | Δn [589 nm, 20° C.]: | 0.1763 |
| PGP-3-3 | 6.0% | Δε [1 kHz, 20° C.]: | 4.5 |
| PCH-301 | 11.0% | $\gamma_1$ [mPa·s, 20° C.]: | 150 |
| PCH-302 | 10.0% | $V_0$ [V]: | 1.66 |
| PGIGI-3-F | 8.0% | $\gamma_1/(\Delta n)^2$: | 4826 |
| GGP-2-F | 10.0% | $K_1$ [pN]: | 11.3 |
| GGP-3-F | 11.0% | $K_3$ [pN]: | 14.4 |
| GGP-5-F | 10.0% | $K_3/K_1$: | 1.27 |
| CCP-V-1 | 8.0% | | |
| CGG-3-F | 14.0% | | |

Example 23

| | | | |
|---|---|---|---|
| PGP-2-3 | 6.0% | Clearing point [° C.]: | 77.0 |
| PGP-2-4 | 8.0% | Δn [589 nm, 20° C.]: | 0.1695 |
| PGP-3-3 | 6.0% | Δε [1 kHz, 20° C.]: | 4.4 |

-continued

| | | | |
|---|---|---|---|
| PCH-301 | 15.0% | $\gamma_1$ [mPa·s, 20° C.]: | 156 |
| PCH-302 | 14.0% | $V_0$ [V]: | 1.73 |
| GGP-2-F | 9.0% | $\gamma_1/(\Delta n)^2$: | 5430 |
| GGP-3-F | 9.0% | $K_1$ [pN]: | 11.7 |
| GGP-5-F | 9.0% | $K_3$ [pN]: | 14.2 |
| CGG-3-F | 18.0% | $K_3/K_1$: | 1.21 |
| CBC-33F | 3.0% | | |
| CBC-53F | 3.0% | | |

Example 24

| | | | |
|---|---|---|---|
| PGP-2-3 | 10.0% | Clearing point [° C.]: | 79.0 |
| PGP-2-4 | 10.0% | $\Delta n$ [589 nm, 20° C.]: | 0.1780 |
| PGP-3-3 | 6.0% | $\Delta\epsilon$ [1 kHz, 20° C.]: | 4.6 |
| PCH-301 | 13.0% | $\gamma_1$ [mPa·s, 20° C.]: | 153 |
| PCH-302 | 12.0% | $V_0$ [V]: | 1.69 |
| GGP-2-F | 9.0% | $\gamma_1/(\Delta n)^2$: | 4829 |
| GGP-3-F | 10.0% | $K_1$ [pN]: | 11.8 |
| GGP-5-F | 7.0% | $K_3$ [pN]: | 14.0 |
| CGG-3-F | 19.0% | $K_3/K_1$: | 1.19 |
| CBC-33F | 4.0% | | |

Example 25

| | | | |
|---|---|---|---|
| PGP-2-3 | 11.0% | Clearing point [° C.]: | 80.5 |
| PGP-2-4 | 11.0% | $\Delta n$ [589 nm, 20° C.]: | 0.1813 |
| PGP-3-2 | 6.0% | $\Delta\epsilon$ [1 kHz, 20° C.]: | 4.6 |
| PCH-301 | 12.0% | $\gamma_1$ [mPa·s, 20° C.]: | 157 |
| PCH-302 | 11.0% | $V_0$ [V]: | 1.69 |
| GGP-2-F | 9.0% | $\gamma_1/(\Delta n)^2$: | 4776 |
| GGP-3-F | 10.0% | $K_1$ [pN]: | 11.9 |
| GGP-5-F | 7.0% | $K_3$ [pN]: | 13.7 |
| CGG-3-F | 19.0% | $K_3/K_1$: | 1.16 |
| CBC-33F | 4.0% | | |

Example 26

| | | | |
|---|---|---|---|
| PGP-2-3 | 12.0% | Clearing point [° C.]: | 81.5 |
| PGP-2-4 | 12.0% | $\Delta n$ [589 nm, 20° C.]: | 0.1885 |
| PGP-3-2 | 9.0% | $\Delta\epsilon$ [1 kHz, 20° C.]: | 4.7 |
| PCH-301 | 11.0% | $\gamma_1$ [mPa·s, 20° C.]: | 157 |
| PCH-302 | 9.0% | $V_0$ [V]: | 1.70 |
| GGP-2-F | 9.0% | $\gamma_1/(\Delta n)^2$: | 4419 |
| GGP-3-F | 10.0% | $K_1$ [pN]: | 12.3 |
| GGP-5-F | 6.0% | | |
| CGG-3-F | 20.0% | | |
| CBC-33F | 2.0% | | |

Example 27

| | | | |
|---|---|---|---|
| PGP-2-3 | 13.0% | Clearing point [° C.]: | 80.0 |
| PGP-2-4 | 14.0% | $\Delta n$ [589 nm, 20° C.]: | 0.1931 |
| PGP-3-2 | 9.0% | $\Delta\epsilon$ [1 kHz, 20° C.]: | 4.8 |
| PCH-301 | 12.0% | $\gamma_1$ [mPa·s, 20° C.]: | 152 |
| PCH-302 | 6.0% | $V_0$ [V]: | 1.66 |

-continued

| | | | |
|---|---|---|---|
| GGP-2-F | 9.0% | $\gamma_1/(\Delta n)^2$: | 4076 |
| GGP-3-F | 11.0% | $K_1$ [pN]: | 12.3 |
| GGP-5-F | 6.0% | $K_3$ [pN]: | 12.7 |
| CGG-3-F | 20.0% | $K_3/K_1$: | 1.04 |

Example 28

| | | | |
|---|---|---|---|
| PGP-2-3 | 14.0% | Clearing point [° C.]: | 80.5 |
| PGP-2-4 | 15.0% | $\Delta n$ [589 nm, 20° C.]: | 0.1939 |
| PGP-3-2 | 9.0% | $\Delta\epsilon$ [1 kHz, 20° C.]: | 4.8 |
| PCH-301 | 17.0% | $\gamma_1$ [mPa·s, 20° C.]: | 157 |
| GGP-2-F | 9.0% | $V_0$ [V]: | 1.66 |
| GGP-3-F | 10.0% | $\gamma_1/(\Delta n)^2$: | 4176 |
| GCP-S-F | 6.0% | $K_1$ [pN]: | 11.8 |
| CGG-3-F | 20.0% | $K_3$ [pN]: | 12.5 |
| | | $K_3/K_1$: | 1.06 |

Example 29

| | | | |
|---|---|---|---|
| PGP-2-3 | 15.0% | Clearing point [° C.]: | 84.5 |
| PGP-2-4 | 15.0% | $\Delta n$ [589 nm, 20° C.]: | 0.2001 |
| PGP-3-2 | 9.0% | $\Delta\epsilon$ [1 kHz, 20° C.]: | 5.3 |
| PCH-301 | 13.0% | $\gamma_1$ [mPa·s, 20° C.]: | 172 |
| GGP-2-F | 10.0% | $V_0$ [V]: | 1.64 |
| GGP-3-F | 10.0% | $\gamma_1/(\Delta n)^2$: | 4296 |
| GGP-5-F | 7.0% | $K_1$ [pN]: | 12.4 |
| CGG-3-F | 21.0% | $K_3$ [pN]: | 12.2 |
| | | $K_3/K_1$: | 0.98 |

Example 30

| | | | |
|---|---|---|---|
| PGP-2-3 | 15.0% | Clearing point [° C.]: | 83.0 |
| PGP-2-4 | 15.0% | $\Delta n$ [589 nm, 20° C.]: | 0.2015 |
| PGP-3-2 | 9.0% | $\Delta\epsilon$ [1 kHz, 20° C.]: | 5.0 |
| PCH-301 | 12.0% | $\gamma_1$ [mPa·s, 20° C.]: | 159 |
| GGP-2-F | 9.0% | $V_0$ [V]: | 1.72 |
| GGP-3-F | 10.0% | $\gamma_1/(\Delta n)^2$: | 3916 |
| GGP-5-F | 6.0% | $K_1$ [pN]: | 13.1 |
| CGG-3-F | 20.0% | $K_3$ [pN]: | 13.0 |
| PP-1-2V1 | 4.0% | $K_3/K_1$: | 0.99 |

Example 31

| | | | |
|---|---|---|---|
| PGP-2-3 | 16.0% | Clearing point [° C.]: | 87.5 |
| PGP-2-4 | 16.0% | $\Delta n$ [589 nm, 20° C.]: | 0.2113 |
| PGP-3-2 | 11.0% | $\Delta\epsilon$ [1 kHz, 20° C.]: | 4.8 |
| PCH-301 | 9.0% | $\gamma_1$ [mPa·s, 20° C.]: | 174 |
| GGP-2-F | 9.0% | $V_0$ [V]: | 1.83 |
| GGP-3-F | 10.0% | $\gamma_1/(\Delta n)^2$: | 3897 |
| GGP-5-F | 6.0% | $K_1$ [pN]: | 14.5 |
| CGG-3-F | 18.0% | $K_3$ [pN]: | 13.6 |
| PP-1-2V1 | 5.0% | $K_3/K_1$: | 0.94 |

Comparative Example 2

| | | | |
|---|---|---|---|
| FET-2Cl | 15.0% | Clearing point [° C.]: | 80.3 |
| FET-3Cl | 6.0% | $\Delta n$ [589 nm, 20° C.]: | 0.2106 |
| FET-5Cl | 19.0% | $\Delta \epsilon$ [1 kHz, 20° C.]: | 5.5 |
| PGIGI-3-Cl | 10.0% | $\gamma_1$ [mPa·s, 20° C.]: | 299 |
| PGIGI-5-Cl | 13.0% | $V_0$ [V]: | 1.76 |
| PCH-301 | 10.0% | $\gamma_1/(\Delta n)^2$: | 6741 |
| GGP-5-Cl | 16.0% | $K_1$ [pN]: | 14.4 |
| BCH-3F•F | 11.0% | $K_3$ [pN]: | 19.6 |
| | | $K_3/K_1$: | 1.36 |

Example 32

| | | | |
|---|---|---|---|
| PGU-1-F | 5.00% | Clearing point [° C.]: | 79.0 |
| PGU-2-F | 4.00% | $\Delta n$ [589 nm, 20° C.]: | 0.1047 |
| CC-3-V1 | 12.00% | $\Delta \epsilon$ [1 kHz, 20° C.]: | 5.3 |
| CCP-V-1 | 14.00% | $\gamma_1$ [mPa·s, 20° C.]: | 64 |
| CCG-V-F | 5.00% | $V_{10}$ [V]: | 1.75 |
| CCP-30CF$_3$ | 6.00% | $V_{50}$ [V]: | 2.11 |
| CCZU-3-F | 12.00% | $V_{90}$ [V]: | 2.62 |
| PCH-301 | 9.00% | $V_{90}/V_{10}$: | 1.499 |
| CC-4-V | 18.00% | | |
| PUQU-2-F | 7.00% | | |
| PGP-2-4 | 8.00% | | |

Example 33

| | | | |
|---|---|---|---|
| CCP-20CF$_3$ | 2.00% | Clearing point [° C.]: | 79.0 |
| CCP-30CF$_3$ | 8.00% | $\Delta n$ [589 nm, 20° C.]: | 0.0930 |
| CCZU-3-F | 13.00% | $\Delta \epsilon$ [1 kHz, 20° C.]: | 5.9 |
| CC-3-V1 | 10.00% | $\gamma_1$ [mPa·s, 20° C.]: | 67 |
| PCH-301 | 8.00% | $V_{10}$ [V]: | 1.50 |
| CCP-V-1 | 12.00% | $V_{50}$ [V]: | 1.65 |
| CCG-V-F | 10.00% | $V_{90}$ [V]: | 2.00 |
| CC-4-V | 18.00% | $V_{90}/V_{10}$: | 1.511 |
| PUQU-1-F | 8.00% | $K_1$ [pN]: | 11.8 |
| PUQU-2-F | 6.00% | $K_3$ [pN]: | 13.5 |
| PGP-2-3 | 5.00% | $K_3/K_1$: | 1.15 |

Example 34

| | | | |
|---|---|---|---|
| PGU-1-F | 3.00% | Clearing point [° C.]: | 81.0 |
| PGU-2-F | 5.00% | $\Delta n$ [589 nm, 20° C.]: | 0.1044 |
| CC-3-V1 | 11.00% | $\Delta \epsilon$ [1 kHz, 20° C.]: | 5.5 |
| CCP-V-1 | 14.00% | $\gamma_1$ [mPa·s, 20° C.]: | 65 |
| CCG-V-F | 8.00% | $V_{10}$ [V]: | 1.70 |
| CCP-30CF$_3$ | 6.00% | $V_{50}$ [V]: | 2.06 |
| CCZU-3-F | 12.00% | $V_{90}$ [V]: | 2.55 |
| PCH-301 | 7.00% | $V_{90}/V_{10}$: | 1.500 |
| CC-4-V | 18.00% | | |
| PUQU-2-F | 4.00% | | |
| PUQU-3-F | 4.00% | | |
| PGP-2-4 | 8.00% | | |

Example 35

| | | | |
|---|---|---|---|
| CCP-20CF$_3$ | 4.00% | Clearing point [° C.]: | 79.0 |
| CCP-30CF$_3$ | 4.00% | $\Delta n$ [589 nm, 20° C.]: | 0.1024 |
| CCZU-3-F | 4.00% | $\Delta \epsilon$ [1 kHz, 20° C.]: | 6.1 |
| PUQU-1-F | 9.00% | $\gamma_1$ [mPa·s, 20° C.]: | 75 |
| PUQU-2-F | 7.00% | $V_{10}$ [V]: | 1.76 |
| CC-3-V1 | 12.00% | $V_{50}$ [V]: | 2.14 |
| CVCP-1V-OT | 14.00% | $V_{90}$ [V]: | 2.66 |
| CVCP-2V-OT | 6.00% | $V_{90}/V_{10}$: | 1.511 |
| PGP-2-3 | 4.00% | | |
| PGP-2-4 | 6.00% | | |
| CC-V2-V | 30.00% | | |

Example 36

| | | | |
|---|---|---|---|
| CC-4-V | 18.00% | Clearing point [° C.]: | 74.5 |
| CCP-1F•F•F | 2.50% | $\Delta n$ [589 nm, 20° C.]: | 0.0893 |
| CCQU-2-F | 14.00% | $\Delta \epsilon$ [1 kHz, 20° C.]: | 12.8 |
| CCQU-3-F | 13.00% | $\gamma_1$ [mPa·s, 20° C.]: | 103 |
| CCQU-5-F | 11.00% | $V_{10}$ [V]: | 1.10 |
| CCQG-3-F | 8.00% | $V_{50}$ [V]: | 1.35 |
| CCP-30CF$_3$ | 3.00% | $V_{90}$ [V]: | 1.69 |
| PUQU-1-F | 8.00% | $V_{90}/V_{10}$: | 1.539 |
| PUQU-2-F | 5.00% | | |
| PUQU-3-F | 9.00% | | |
| PGP-2-4 | 3.00% | | |
| CCGU-3-F | 3.50% | | |
| CBC-33 | 2.00% | | |

Example 37

| | | | |
|---|---|---|---|
| CC-4-V | 14.00% | Clearing point [° C.]: | 82.0 |
| CC-3-V1 | 8.00% | $\Delta n$ [589 nm, 20° C.]: | 0.0918 |
| CCQU-2-F | 14.00% | $\Delta \epsilon$ [1 kHz, 20° C.]: | 12.0 |
| CCQU-3-F | 12.00% | $\gamma_1$ [mPa·s, 20° C.]: | 106 |
| CCQU-5-F | 10.00% | $V_{10}$ [V]: | 1.22 |
| CCP-2F•F•F | 4.00% | $V_{50}$ [V]: | 1.50 |
| CCP-30CF$_3$ | 8.00% | $V_{90}$ [V]: | 1.87 |
| PUQU-1-F | 8.00% | $V_{90}/V_{10}$: | 1.535 |
| PUQU-2-F | 4.00% | | |
| PUQU-3-F | 7.00% | | |
| PGP-2-4 | 3.00% | | |
| CCGU-3-F | 6.00% | | |
| CBC-33 | 2.00% | | |

Example 38

| | | | |
|---|---|---|---|
| CC-4-V | 18.00% | Clearing point [° C.]: | 74.5 |
| CCP-1F•F•F | 6.00% | $\Delta n$ [589 nm, 20° C.]: | 0.0890 |
| CCQU-2-F | 14.00% | $\Delta \epsilon$ [1 kHz, 20° C.]: | 12.6 |
| CCQU-3-F | 13.00% | $\gamma_1$ [mPa·s, 20° C.]: | 107 |
| CCQU-5-F | 12.00% | $V_{10}$ [V]: | 1.10 |
| CCQG-3-F | 8.00% | $V_{50}$ [V]: | 1.36 |
| PUQU-1-F | 7.00% | $V_{90}$ [V]: | 1.71 |
| PUQU-2-F | 4.00% | $V_{90}/V_{10}$: | 1.550 |
| PUQU-3-F | 7.00% | | |
| PGP-2-3 | 4.00% | | |
| CCGU-3-F | 7.00% | | |

Example 39

| | | | |
|---|---|---|---|
| CC-4-V | 14.00% | Clearing point [° C.]: | 81.0 |
| CC-3-V1 | 8.00% | $\Delta n$ [589 nm, 20° C.]: | 0.0911 |
| CCQU-2-F | 13.00% | $\Delta\epsilon$ [1 kHz, 20° C.]: | 11.5 |
| CCQU-3-F | 13.00% | $\gamma_1$ [mPa·s, 20° C.]: | 108 |
| CCQU-5-F | 10.00% | $V_{10}$ [V]: | 1.24 |
| CCP-1F•F•F | 5.00% | $V_{50}$ [V]: | 1.53 |
| CCQG-3-F | 2.00% | $V_{90}$ [V]: | 1.91 |
| CCP-30CF$_3$ | 8.00% | $V_{90}/V_{10}$: | 1.536 |
| PUQU-1-F | 7.00% | | |
| PUQU-2-F | 3.00% | | |
| PUQU-3-F | 6.00% | | |
| PGP-2-3 | 4.00% | | |
| CCGU-3-F | 7.00% | | |

Example 40

| | | | |
|---|---|---|---|
| PGU-1-F | 8.00% | Clearing point [° C.]: | 80.0 |
| CC-3-V1 | 12.00% | $\Delta n$ [589 nm, 20° C.]: | 0.1043 |
| CCP-V-1 | 14.00% | $\Delta\epsilon$ [1 kHz, 20° C.]: | 5.4 |
| CCG-V-F | 5.00% | $V_{10}$ [V]: | 1.77 |
| CCP-30CF$_3$ | 6.00% | $V_{50}$ [V]: | 2.13 |
| CCZU-3-F | 13.00% | $V_{90}$ [V]: | 2.65 |
| PCH-301 | 10.00% | $V_{90}/V_{10}$: | 1.494 |
| CC-4-V | 17.00% | $K_1$ [pN]: | 12.3 |
| PUQU-2-F | 3.00% | $K_3$ [pN]: | 12.9 |
| PUQU-3-F | 4.00% | $K_3/K_1$: | 1.05 |
| PGP-2-4 | 8.00% | | |

Example 41

| | | | |
|---|---|---|---|
| CC-4-V | 14.00% | Clearing point [° C.]: | 81.0 |
| CC-3-V1 | 8.00% | $\Delta n$ [589 nm, 20° C.]: | 0.0921 |
| CCQU-2-F | 13.00% | $\Delta\epsilon$ [1 kHz, 20° C.]: | 11.4 |
| CCQU-3-F | 12.00% | $\gamma_1$ [mPa·s, 20° C.]: | 100 |
| CCQU-5-F | 11.00% | $V_{10}$ [V]: | 1.25 |
| CCP-1F•F•F | 4.00% | $V_{50}$ [V]: | 1.53 |
| BCH-3F•F•F | 3.00% | $V_{90}$ [V]: | 1.90 |
| CCP-30CF$_3$ | 8.00% | $V_{90}/V_{10}$: | 1.522 |
| PUQU-1-F | 9.00% | | |
| PUQU-2-F | 7.00% | | |
| PGP-2-3 | 4.00% | | |
| CCGU-3-F | 6.00% | | |
| CBC-33 | 1.00% | | |

Example 42

| | | | |
|---|---|---|---|
| CC-4-V | 14.00% | Clearing point [° C.]: | 76.0 |
| CCQU-2-F | 13.00% | $\Delta n$ [589 nm, 20° C.]: | 0.0878 |
| CCQU-3-F | 13.00% | $\Delta\epsilon$ [1 kHz, 20° C.]: | 12.5 |
| CCQU-5-F | 11.00% | $\gamma_1$ [mPa·s, 20° C.]: | 111 |
| CCP-1F•F•F | 8.00% | $V_{10}$ [V]: | 1.10 |
| CCQG-3-F | 8.00% | $V_{50}$ [V]: | 1.36 |
| CCP-20CF$_3$ | 6.00% | $V_{90}$ [V]: | 1.69 |
| PUQU-2-F | 7.00% | $V_{90}/V_{10}$: | 1.537 |
| PUQU-3-F | 10.00% | | |
| PGP-2-3 | 3.00% | | |
| CCGU-3-F | 7.00% | | |

Example 43

| | | | |
|---|---|---|---|
| CC-4-V | 18.00% | Clearing point [° C.]: | 74.0 |
| CCP-1F•F•F | 7.00% | $\Delta n$ [589 nm, 20° C.]: | 0.0887 |
| CCP-2F•F•F | 2.00% | $\Delta\epsilon$ [1 kHz, 20° C.]: | 11.9 |
| CCQU-2-F | 14.00% | $\gamma_1$ [mPa·s, 20° C.]: | 103 |
| CCQU-3-F | 13.00% | $V_{10}$ [V]: | 1.11 |
| CCQU-5-F | 11.00% | $V_{50}$ [V]: | 1.37 |
| CCQG-3-F | 8.00% | $V_{90}$ [V]: | 1.72 |
| PUQU-1-F | 9.00% | $V_{90}/V_{10}$: | 1.545 |
| PUQU-2-F | 7.00% | | |
| PGP-2-3 | 5.00% | | |
| CCGU-3-F | 6.00% | | |

Example 44

| | | | |
|---|---|---|---|
| CC-4-V | 12.00% | Clearing point [° C.]: | 81.5 |
| CC-3-V1 | 7.00% | $\Delta n$ [589 nm, 20° C.]: | 0.0938 |
| CCQU-2-F | 13.00% | $\Delta\epsilon$ [1 kHz, 20° C.]: | 11.8 |
| CCQU-3-F | 12.00% | $\gamma_1$ [mPa·s, 20° C.]: | 111 |
| CCQU-5-F | 11.00% | $V_{10}$ [V]: | 1.22 |
| CCP-1F•F•F | 5.00% | $V_{50}$ [V]: | 1.50 |
| CCP-2F•F•F | 4.00% | $V_{90}$ [V]: | 1.87 |
| CCP-30CF$_3$ | 8.00% | $V_{90}/V_{10}$: | 1.533 |
| PUQU-1-F | 9.00% | | |
| PUQU-3-F | 7.00% | | |
| PGP-2-3 | 5.00% | | |
| CCGU-3-F | 6.00% | | |
| CBC-33 | 1.00% | | |

Example 45

| | | | |
|---|---|---|---|
| CCP-20CF$_3$ | 2.00% | Clearing point [° C.]: | 79.5 |
| CCP-30CF$_3$ | 8.00% | $\Delta n$ [589 nm, 20° C.]: | 0.0948 |
| CCZU-3-F | 13.00% | $\Delta\epsilon$ [1 kHz, 20° C.]: | 5.9 |
| CC-3-V1 | 10.00% | $\gamma_1$ [mPa·s, 20° C.]: | 64 |
| PCH-301 | 7.00% | $V_{10}$ [V]: | 1.64 |
| CCP-V-1 | 12.00% | $V_{50}$ [V]: | 1.99 |
| CCG-V-F | 10.00% | $V_{90}$ [V]: | 2.48 |
| CC-4-V | 18.00% | $V_{90}/V_{10}$: | 1.513 |
| PUQU-1-F | 8.00% | $K_1$ [pN]: | 11.7 |
| PUQU-2-F | 6.00% | $K_3$ [pN]: | 13.4 |
| PGP-2-2 | 6.00% | $K_3/K_1$: | 1.15 |

Example 46

| | | | |
|---|---|---|---|
| CCP-20CF$_3$ | 2.00% | Clearing point [° C.]: | 79.5 |
| CCP-30CF$_3$ | 8.00% | $\Delta n$ [589 nm, 20° C.]: | 0.0939 |
| CCZU-3-F | 13.00% | $\Delta\epsilon$ [1 kHz, 20° C.]: | 6.0 |
| CC-3-V1 | 10.00% | $\gamma_1$ [mPa·s, 20° C.]: | 69 |
| PCH-301 | 7.00% | $V_{10}$ [V]: | 1.66 |
| CCP-V-1 | 12.00% | $V_{50}$ [V]: | 2.01 |
| CCG-V-F | 10.00% | $V_{90}$ [V]: | 2.49 |
| CC-4-V | 18.00% | $V_{90}/V_{10}$: | 1.497 |
| PUQU-1-F | 8.00% | $K_1$ [pN]: | 11.8 |
| PUQU-2-F | 6.00% | $K_3$ [pN]: | 13.3 |
| PGP-2-4 | 6.00% | $K_3/K_1$: | 1.13 |

Example 47

| | | | |
|---|---|---|---|
| CCP-20CF$_3$ | 3.00% | Clearing point [° C.]: | 78.0 |
| CCP-30CF$_3$ | 7.00% | Δn [589 nm, 20° C.]: | 0.0996 |
| CCZU-3-F | 13.00% | Δε [1 kHz, 20° C.]: | 5.7 |
| CC-3-V1 | 12.00% | γ$_1$ [mPa·s, 20° C.]: | 63 |
| PCH-301 | 7.00% | V$_{10}$ [V]: | 1.68 |
| CCP-V-1 | 10.00% | V$_{50}$ [V]: | 2.02 |
| CCG-V-F | 6.00% | V$_{90}$ [V]: | 2.49 |
| CC-4-V | 18.00% | V$_{90}$/V$_{10}$: | 1.479 |
| PUQU-1-F | 8.00% | K$_1$ [pN]: | 12.1 |
| PUQU-2-F | 6.00% | K$_3$ [pN]: | 12.5 |
| PGP-2-4 | 6.00% | K$_3$/K$_1$: | 1.03 |
| PGP-2-2 | 4.00% | | |

Example 48

| | | | |
|---|---|---|---|
| CCP-30CF$_3$ | 4.00% | Clearing point [° C.]: | 76.5 |
| CCZU-3-F | 10.00% | Δn [589 nm, 20° C.]: | 0.1090 |
| CCP-V-1 | 11.00% | Δε [1 kHz, 20° C.]: | 6.3 |
| CCG-V-F | 8.00% | γ$_1$ [mPa·s, 20° C.]: | 66 |
| CC-4-V | 18.00% | V$_{10}$ [V]: | 1.65 |
| CC-3-V1 | 13.00% | V$_{50}$ [V]: | 1.96 |
| PCH-301 | 4.00% | V$_{90}$ [V]: | 2.41 |
| PUQU-1-F | 8.00% | V$_{90}$/V$_{10}$: | 1.458 |
| PUQU-2-F | 4.00% | K$_1$ [pN]: | 12.3 |
| PUQU-3-F | 6.00% | K$_3$ [pN]: | 12.1 |
| PGP-2-3 | 7.00% | K$_3$/K$_1$: | 0.99 |
| PGP-2-4 | 7.00% | | |

Example 49

| | | | |
|---|---|---|---|
| CCZU-3-F | 12.00% | Clearing point [° C.]: | 80.0 |
| CCP-V-1 | 8.00% | Δn [589 nm, 20° C.]: | 0.1011 |
| CCG-V-F | 10.00% | Δε [1 kHz, 20° C.]: | 6.2 |
| CC-3-V1 | 13.00% | γ$_1$ [mPa·s, 20° C.]: | 67 |
| CC-4-V | 18.00% | V$_{10}$ [V]: | 1.64 |
| PCH-301 | 5.00% | V$_{50}$ [V]: | 1.97 |
| PUQU-1-F | 8.00% | V$_{90}$ [V]: | 2.45 |
| PUQU-2-F | 4.00% | V$_{90}$/V$_{10}$: | 1.491 |
| PUQU-3-F | 6.00% | K$_1$ [pN]: | 11.9 |
| PGP-2-3 | 4.00% | K$_3$ [pN]: | 12.6 |
| PGP-2-4 | 6.00% | K$_3$/K$_1$: | 1.06 |
| CVCC-V-2 | 3.00% | | |
| CVCC-V-3 | 3.00% | | |

Example 50

| | | | |
|---|---|---|---|
| CCZU-3-F | 12.00% | Clearing point [° C.]: | 77.0 |
| CCP-V-1 | 10.00% | Δn [589 nm, 20° C.]: | 0.1092 |
| CCG-V-F | 9.00% | Δε [1 kHz, 20° C.]: | 6.3 |
| CC-4-V | 10.00% | γ$_1$ [mPa·s, 20° C.]: | 66 |
| CC-3-V1 | 13.00% | V$_{10}$ [V]: | 1.65 |
| PCH-301 | 4.00% | V$_{50}$ [V]: | 1.97 |
| PUQU-1-F | 8.00% | V$_{90}$ [V]: | 2.42 |
| PUQU-2-F | 4.00% | V$_{90}$/V$_{10}$: | 1.458 |
| PUQU-3-F | 6.00% | K$_1$ [pN]: | 12.8 |
| PGP-2-3 | 7.00% | K$_3$ [pN]: | 12.5 |
| PGP-2-4 | 7.00% | K$_3$/K$_1$: | 0.98 |
| CC-3-2V | 10.00% | | |

Example 51

| | | | |
|---|---|---|---|
| PGP-2-3 | 14.00% | Clearing point [° C.]: | 78.5 |
| PGP-2-4 | 15.00% | Δn [589 nm, 20° C.]: | 0.1911 |
| PGP-3-2 | 9.00% | Δε [1 kHz, 20° C.]: | 4.5 |
| PCH-301 | 19.00% | γ$_1$ [mPa·s, 20° C.]: | 149 |
| GGP-2-F | 10.00% | | |
| GGP-3-F | 10.00% | | |
| GGP-5-F | 4.00% | | |
| CGG-3-F | 19.00% | | |

Example 52

| | | | |
|---|---|---|---|
| PGP-2-3 | 15.00% | Clearing point [° C.]: | 76.0 |
| PGP-2-4 | 15.00% | Δn [589 nm, 20° C.]: | 0.1888 |
| PGP-3-2 | 9.00% | Δε [1 kHz, 20° C.]: | 5.2 |
| PCH-301 | 19.00% | γ$_1$ [mPa·s, 20° C.]: | 149 |
| CGG-3-F | 18.00% | | |
| GGG-3-F | 8.00% | | |
| GGG-5-F | 8.00% | | |
| GGP-3-F | 8.00% | | |

Example 53

| | | | |
|---|---|---|---|
| CCP-1F•F•F | 8.00% | Clearing point [° C.]: | 76.5 |
| CCP-3F•F•F | 5.00% | Δn [589 nm, 20° C.]: | 0.1045 |
| CCP-20CF$_3$ | 6.00% | Δε [1 kHz, 20° C.]: | 8.1 |
| CCP-30CF$_3$ | 7.00% | γ$_1$ [mPa·s, 20° C.]: | 69 |
| PGU-2-F | 6.00% | K$_1$ [pN]: | 12.4 |
| PUQU-2-F | 9.00% | K$_3$ [pN]: | 12.5 |
| PUQU-3-F | 9.00% | K$_3$/K$_1$: | 1.00 |
| CCP-V-1 | 9.00% | | |
| CCP-V2-1 | 7.00% | | |
| CC-3-V1 | 13.00% | | |
| CC-4-V | 15.00% | | |
| PGP-2-3 | 6.00% | | |

Example 54

| | | | |
|---|---|---|---|
| CCP-1F•F•F | 8.00% | Clearing point [° C.]: | 74.5 |
| CCP-3F•F•F | 10.00% | Δn [589 nm, 20° C.]: | 0.1046 |
| CCP-20CF$_3$ | 6.00% | Δε [1 kHz, 20° C.]: | 7.9 |
| CCP-30CF$_3$ | 7.00% | γ$_1$ [mPa·s, 20° C.]: | 72 |
| PUQU-2-F | 10.00% | K$_1$ [pN]: | 14.9 |
| PUQU-3-F | 10.00% | K$_3$ [pN]: | 13.7 |
| CCP-V-1 | 10.00% | K$_3$/K$_1$: | 0.92 |
| CCP-V2-1 | 3.00% | | |
| CC-3-V1 | 12.00% | | |
| CC-5-V | 13.00% | | |
| PGP-2-3 | 5.50% | | |
| PP-1-2V1 | 5.50% | | |

Example 55

| | | | |
|---|---|---|---|
| PGU-1-F | 9.00% | Clearing point [° C.]: | 80.0 |
| CC-3-V1 | 12.00% | $\Delta n$ [589 nm, 20° C.]: | 0.1029 |
| CCP-V-1 | 14.00% | $\Delta\epsilon$ [1 kHz, 20° C.]: | 5.0 |
| CCG-V-F | 5.00% | $K_1$ [pN]: | 12.4 |
| CCP-30CF$_3$ | 6.00% | $K_3$ [pN]: | 13.1 |
| CCZU-3-F | 12.00% | $K_3/K_1$: | 1.05 |
| PCH-301 | 9.00% | | |
| CC-4-V | 18.00% | | |
| PUQU-2-F | 7.00% | | |
| PGP-2-4 | 8.00% | | |

Example 56

| | | | |
|---|---|---|---|
| PGIGI-3-F | 10.00% | Clearing point [° C.]: | 80.0 |
| PP-1-2V1 | 10.00% | $\Delta n$ [589 nm, 20° C.]: | 0.2024 |
| PCH-301 | 19.00% | $\Delta\epsilon$ [1 kHz, 20° C.]: | 6.1 |
| PGP-2-3 | 14.00% | $\gamma_1$ [mPa · s, 20° C.]: | 178 |
| PGP-2-4 | 14.00% | $K_1$ [pN]: | 18.6 |
| PGU-2-F | 9.00% | $K_3$ [pN]: | 25.1 |
| PGU-3-F | 9.00% | $K_3/K_1$: | 1.35 |
| PGU-5-F | 8.00% | | |
| CBC-33F | 4.00% | | |
| CBC-53F | 3.00% | | |

Example 57

| | | | |
|---|---|---|---|
| CC-4-V | 18.00% | Clearing point [° C.]: | 82.5 |
| CC-3-V1 | 7.00% | $\Delta n$ [589 nm, 20° C.]: | 0.0944 |
| CCP-20CF$_3$ | 8.00% | $\Delta\epsilon$ [1 kHz, 20° C.]: | 11.3 |
| BCH-3F•F•F | 5.00% | $\gamma_1$ [mPa · s, 20° C.]: | 102 |
| CCZU-3-F | 14.00% | $V_{10}$ [V]: | 1.22 |
| PUQU-2-F | 7.00% | $V_{50}$ [V]: | 1.51 |
| PUQU-3-F | 10.00% | $V_{90}$ [V]: | 1.86 |
| CCQU-2-F | 6.00% | $V_{90}/V_{10}$: | 1.531 |
| CCQU-3-F | 13.00% | | |
| PGP-2-3 | 3.00% | | |
| CCGU-3-F | 7.00% | | |
| CBC-33 | 2.00% | | |

Example 58

| | | | |
|---|---|---|---|
| CC-4-V | 12.00% | Clearing point [° C.]: | 76.0 |
| CCQU-2-F | 13.00% | $\Delta n$ [589 nm, 20° C.]: | 0.0889 |
| CCQU-3-F | 14.00% | $\Delta\epsilon$ [1 kHz, 20° C.]: | 11.6 |
| CCQU-5-F | 11.00% | $\gamma_1$ [mPa · s, 20° C.]: | 119 |
| CCP-1F•F•F | 6.00% | $V_{10}$ [V]: | 1.14 |
| CCP-2F•F•F | 5.00% | $V_{50}$ [V]: | 1.40 |
| CCQG-2-F | 7.00% | $V_{90}$ [V]: | 1.76 |
| CCP-20CF$_3$ | 5.00% | $V_{90}/V_{10}$: | 1.540 |
| PUQG-2-F | 9.00% | | |
| PUQG-3-F | 8.00% | | |
| PGP-2-3 | 3.00% | | |
| CCGU-3-F | 7.00% | | |

Example 59

| | | | |
|---|---|---|---|
| CCP-2F•F•F | 8.00% | Clearing point [° C.]: | 73.0 |
| CCP-3F•F•F | 5.00% | $\Delta n$ [589 nm, 20° C.]: | 0.1099 |
| PGU-1-F | 5.00% | $\Delta\epsilon$ [1 kHz, 20° C.]: | 4.5 |
| PUQU-1-F | 6.00% | $\gamma_1$ [mPa · s, 20° C.]: | 61 |
| PUQU-3-F | 4.00% | $V_{10}$ [V]: | 1.86 |
| CC-3-V1 | 13.00% | $V_{50}$ [V]: | 2.22 |
| CC-4-V | 18.00% | $V_{90}$ [V]: | 2.74 |
| CCP-V-1 | 14.00% | $V_{90}/V_{10}$: | 1.474 |
| CCP-V2-1 | 3.00% | $K_1$ [pN]: | 11.8 |
| PCH-301 | 10.00% | $K_3$ [pN]: | 11.8 |
| PGP-2-3 | 6.00% | $K_3/K_1$: | 1.00 |
| PGP-2-4 | 8.00% | | |

Example 60

| | | | |
|---|---|---|---|
| CCP-20CF$_3$ | 4.00% | Clearing point [° C.]: | 78.0 |
| CCP-30CF$_3$ | 4.00% | $\Delta n$ [589 nm, 20° C.]: | 0.0987 |
| CCZU-3-F | 12.00% | $\Delta\epsilon$ [1 kHz, 20° C.]: | 5.6 |
| CCP-V-1 | 13.00% | $\gamma_1$ [mPa · s, 20° C.]: | 64 |
| CCP-V2-1 | 4.00% | $V_{10}$ [V]: | 1.74 |
| CC-4-V | 18.00% | $V_{50}$ [V]: | 2.09 |
| CC-3-V1 | 13.00% | $V_{90}$ [V]: | 2.57 |
| PCH-301 | 8.00% | $V_{90}/V_{10}$: | 1.477 |
| PUQU-1-F | 6.00% | $K_1$ [pN]: | 12.5 |
| PUQU-2-F | 4.00% | $K_3$ [pN]: | 12.9 |
| PUQU-3-F | 6.00% | $K_3/K_1$: | 1.03 |
| PGP-2-2 | 4.00% | | |
| PGP-2-4 | 4.00% | | |

Example 61

| | | | |
|---|---|---|---|
| CCP-20CF$_3$ | 4.00% | Clearing point [° C.]: | 82.0 |
| CCP-30CF$_3$ | 4.00% | $\Delta n$ [589 nm, 20° C.]: | 0.1045 |
| CCQU-2-F | 5.00% | $\Delta\epsilon$ [1 kHz, 20° C.]: | 5.6 |
| CCQU-3-F | 12.00% | $\gamma_1$ [mPa · s, 20° C.]: | 76 |
| CCQU-5-F | 5.00% | $V_{10}$ [V]: | 1.79 |
| CC-3-V1 | 16.00% | $V_{50}$ [V]: | 2.14 |
| CC-4-V | 12.00% | $V_{90}$ [V]: | 2.64 |
| CVCP-1V-OT | 16.00% | $V_{90}/V_{10}$: | 1.479 |
| PGP-2-2V | 7.00% | $K_1$ [pN]: | 12.9 |
| PGP-2-4 | 7.00% | $K_3$ [pN]: | 13.5 |
| GU-1V2-F | 12.00% | $K_3/K_1$: | 1.05 |

Example 62

| | | | |
|---|---|---|---|
| CCP-20CF$_3$ | 4.00% | Clearing point [° C.]: | 78.5 |
| CCP-30CF$_3$ | 4.00% | $\Delta n$ [589 nm, 20° C.]: | 0.0990 |
| CCZU-3-F | 12.00% | $\Delta\epsilon$ [1 kHz, 20° C.]: | 5.6 |
| CCP-V-1 | 13.00% | $\gamma_1$ [mPa · s, 20° C.]: | 65 |
| CCP-V2-1 | 4.00% | $V_{10}$ [V]: | 1.74 |
| CC-4-V | 18.00% | $V_{50}$ [V]: | 2.09 |
| CC-3-V1 | 13.00% | $V_{90}$ [V]: | 2.60 |
| PCH-301 | 8.00% | $V_{90}/V_{10}$: | 1.491 |
| PUQU-1-F | 6.00% | $K_1$ [pN]: | 12.5 |
| PUQU-2-F | 4.00% | $K_3$ [pN]: | 13.1 |
| PUQU-3-F | 6.00% | $K_3/K_1$: | 1.05 |

-continued

| | | | |
|---|---|---|---|
| PGP-2-3 | 4.00% | | |
| PGP-2-4 | 4.00% | | |

Example 63

| | | | |
|---|---|---|---|
| CCP-20CF$_3$ | 4.00% | Clearing point [° C.]: | 81.0 |
| CCP-30CF$_3$ | 4.00% | Δn [589 nm, 20° C.]: | 0.0982 |
| CCZU-3-F | 12.00% | Δε [1 kHz, 20° C.]: | 6.3 |
| CCP-V-1 | 16.00% | γ$_1$ [mPa·s, 20° C.]: | 67 |
| CCP-V2-1 | 4.00% | V$_{10}$ [V]: | 1.70 |
| CC-4-V | 18.00% | V$_{50}$ [V]: | 2.04 |
| CC-3-V1 | 13.00% | V$_{90}$ [V]: | 2.52 |
| PCH-301 | 5.00% | V$_{90}$/V$_{10}$: | 1.487 |
| PUQU-2-F | 8.00% | K$_1$ [pN]: | 12.6 |
| PUQU-3-F | 8.00% | K$_3$ [pN]: | 13.7 |
| PGP-2-F | 4.00% | K$_3$/K$_1$: | 1.09 |
| PGP-4-F | 4.00% | | |

Example 64

| | | | |
|---|---|---|---|
| CCQG-2-F | 5.00% | Clearing point [° C.]: | 79.5 |
| CCQG-3-F | 6.00% | Δn [589 nm, 20° C.]: | 0.1034 |
| CCQU-2-F | 10.00% | Δε [1 kHz, 20° C.]: | 6.0 |
| CCQU-3-F | 12.00% | γ$_1$ [mPa·s, 20° C.]: | 78 |
| CC-3-V1 | 16.00% | V$_{10}$ [V]: | 1.69 |
| CC-4-V | 9.00% | V$_{50}$ [V]: | 2.03 |
| CVCP-1V-OT | 16.00% | V$_{90}$ [V]: | 2.52 |
| PGP-2-3 | 7.00% | V$_{90}$/V$_{10}$: | 1.488 |
| PGP-2-4 | 7.00% | K$_1$ [pN]: | 12.4 |
| GU-1V2-F | 12.00% | K$_3$ [pN]: | 12.9 |
| | | K$_3$/K$_1$: | 1.04 |

Example 65

| | | | |
|---|---|---|---|
| CVCP-1V-OT | 12.00% | Clearing point [° C.]: | 81.5 |
| CCQU-2-F | 12.00% | Δn [589 nm, 20° C.]: | 0.1004 |
| CCQU-3-F | 10.00% | Δε [1 kHz, 20° C.]: | 5.6 |
| CCP-2F.F.F | 11.00% | γ$_1$ [mPa·s, 20° C.]: | 82 |
| CCP-3F.F.F | 12.00% | V$_{10}$ [V]: | 1.91 |
| CC-3-V1 | 14.00% | V$_{50}$ [V]: | 2.29 |
| CC-5-V | 10.00% | V$_{90}$ [V]: | 2.83 |
| PGP-2-4 | 6.00% | V$_{90}$/V$_{10}$: | 1.483 |
| PP-1-2V1 | 13.00% | K$_1$ [pN]: | 14.2 |
| | | K$_3$ [pN]: | 15.0 |
| | | K$_3$/K$_1$: | 1.06 |

Example 66

| | | | |
|---|---|---|---|
| CCP-20CF$_3$ | 3.50% | Clearing point [° C.]: | 79.5 |
| CCP-30CF$_3$ | 4.50% | Δn [589 nm, 20° C.]: | 0.0991 |
| CCZU-3-F | 12.00% | Δε [1 kHz, 20° C.]: | 5.6 |
| CC-3-V1 | 13.00% | γ$_1$ [mPa·s, 20° C.]: | 65 |
| PCH-301 | 7.00% | V$_{10}$ [V]: | 1.73 |
| CCP-V-1 | 13.00% | V$_{50}$ [V]: | 2.08 |
| CCP-V2-1 | 5.00% | V$_{90}$ [V]: | 2.58 |

| | | | |
|---|---|---|---|
| CC-4-V | 18.00% | V$_{90}$/V$_{10}$: | 1.491 |
| PUQU-2-F | 8.00% | K$_1$ [pN]: | 12.7 |
| PUQU-3-F | 8.00% | K$_3$ [pN]: | 13.1 |
| PGP-2-4 | 8.00% | K$_3$/K$_1$: | 1.03 |

Example 67

| | | | |
|---|---|---|---|
| CCZU-3-F | 12.00% | Clearing point [° C.]: | 79.5 |
| CC-3-V1 | 13.00% | Δn [589 nm, 20° C.]: | 0.1029 |
| CC-4-V | 18.00% | Δε [1 kHz, 20° C.]: | 7.8 |
| PCH-301 | 8.00% | γ$_1$ [mPa·s, 20° C.]: | 77 |
| CCP-V-1 | 14.00% | V$_{10}$ [V]: | 1.53 |
| PUQU-2-F | 6.00% | V$_{50}$ [V]: | 1.84 |
| PUQU-3-F | 6.00% | V$_{90}$ [V]: | 2.28 |
| CDUQU-2-F | 6.00% | V$_{90}$/V$_{10}$: | 1.490 |
| CDUQU-4-F | 6.00% | K$_1$ [pN]: | 12.6 |
| PGP-2-3 | 6.00% | K$_3$ [pN]: | 12.7 |
| PGP-2-4 | 5.00% | K$_3$/K$_1$: | 1.00 |

Example 68

| | | | |
|---|---|---|---|
| BCH-3F.F.F | 9.00% | Clearing point [° C.]: | 71.5 |
| BCH-5F.F.F | 6.00% | Δn [589 nm, 20° C.]: | 0.1134 |
| PUQU-1-F | 7.00% | Δε [1 kHz, 20° C.]: | 8.4 |
| PUQU-2-F | 8.00% | γ$_1$ [mPa·s, 20° C.]: | 74 |
| PUQU-3-F | 5.00% | V$_{10}$ [V]: | 1.40 |
| CC-3-V1 | 12.00% | V$_{50}$ [V]: | 1.69 |
| CC-5-V | 10.00% | V$_{90}$ [V]: | 2.09 |
| CCP-V-1 | 14.00% | V$_{90}$/V$_{10}$: | 1.493 |
| PCH-301 | 7.00% | K$_1$ [pN]: | 11.7 |
| PGP-2-4 | 10.00% | K$_3$ [pN]: | 11.4 |
| CCQU-3-F | 7.00% | K$_3$/K$_1$: | 0.97 |
| CCQU-5-F | 5.00% | | |

Example 69

| | | | |
|---|---|---|---|
| CCP-20CF$_3$ | 2.00% | Clearing point [° C.]: | 80.0 |
| CCP-30CF$_3$ | 8.00% | Δn [589 nm, 20° C.]: | 0.0950 |
| CCZU-3-F | 13.00% | Δε [1 kHz, 20° C.]: | 6.0 |
| CC-3-V1 | 10.00% | γ$_1$ [mPa·s, 20° C.]: | 67 |
| PCH-301 | 7.00% | V$_{10}$ [V]: | 1.67 |
| CCP-V-1 | 12.00% | V$_{50}$ [V]: | 2.03 |
| CCG-V-F | 10.00% | V$_{90}$ [V]: | 2.56 |
| CC-4-V | 18.00% | V$_{90}$/V$_{10}$: | 1.533 |
| PUQU-1-F | 8.00% | K$_1$ [pN]: | 11.8 |
| PUQU-2-F | 6.00% | K$_3$ [pN]: | 13.5 |
| PGP-2-3 | 6.00% | K$_3$/K$_1$: | 1.14 |

Example 70

| | | | |
|---|---|---|---|
| CCP-20CF$_3$ | 2.00% | Clearing point [° C.]: | 79.5 |
| CCP-30CF$_3$ | 8.00% | Δn [589 nm, 20° C.]: | 0.0946 |
| CCZU-3-F | 13.00% | Δε [1 kHz, 20° C.]: | 5.9 |
| CC-3-V1 | 10.00% | V$_{10}$ [V]: | 1.64 |
| PCH-301 | 7.00% | V$_{50}$ [V]: | 2.00 |

-continued

| | | | |
|---|---|---|---|
| CCP-V-1 | 12.00% | $V_{90}$ [V]: | 2.53 |
| CCG-V-F | 10.00% | $V_{90}/V_{10}$: | 1.543 |
| CC-4-V | 18.00% | $K_1$ [pN]: | 11.7 |
| PUQU-1-F | 8.00% | $K_3$ [pN]: | 13.4 |
| PUQU-2-F | 6.00% | $K_3/K_1$: | 1.15 |
| PGP-2-4 | 6.00% | | |

Example 71

| | | | |
|---|---|---|---|
| CCP-20CF$_3$ | 2.00% | Clearing point [° C.]: | 81.0 |
| CCP-30CF$_3$ | 8.00% | $\Delta n$ [589 nm, 20° C.]: | 0.0951 |
| CCZU-3-F | 13.00% | $\Delta\epsilon$ [1 kHz, 20° C.]: | 6.0 |
| CC-3-V1 | 10.00% | $\gamma_1$ [mPa·s, 20° C.]: | 67 |
| PCH-301 | 7.00% | $V_{10}$ [V]: | 1.67 |
| CCP-V-1 | 12.00% | $V_{50}$ [V]: | 2.03 |
| CCG-V-F | 10.00% | $V_{90}$ [V]: | 2.56 |
| CC-4-V | 18.00% | $V_{90}/V_{10}$: | 1.533 |
| PUQU-1-F | 8.00% | $K_1$ [pN]: | 11.8 |
| PUQU-2-F | 6.00% | $K_3$ [pN]: | 13.9 |
| PGP-2-2V | 6.00% | $K_3/K_1$: | 1.18 |

Example 72

| | | | |
|---|---|---|---|
| CCP-20CF$_3$ | 3.50% | Clearing point [° C.]: | 82.0 |
| CCP-30CF$_3$ | 4.50% | $\Delta n$ [589 nm, 20° C.]: | 0.1000 |
| CCZU-3-F | 12.00% | $\Delta\epsilon$ [1 kHz, 20° C.]: | 5.7 |
| CCP-V-1 | 13.00% | $\gamma_1$ [mPa·s, 20° C.]: | 66 |
| CCP-V2-1 | 5.00% | $V_{10}$ [V]: | 1.76 |
| CC-4-V | 18.00% | $V_{50}$ [V]: | 2.11 |
| CC-3-V1 | 13.00% | $V_{90}$ [V]: | 2.62 |
| PCH-301 | 7.00% | $V_{90}/V_{10}$: | 1.489 |
| PUQU-2-F | 8.00% | $K_1$ [pN]: | 12.9 |
| PUQU-3-F | 8.00% | $K_3$ [pN]: | 13.8 |
| PGP-2-2V | 8.00% | $K_3/K_1$: | 1.07 |

Example 73

| | | | |
|---|---|---|---|
| CCP-20CF$_3$ | 0.00% | Clearing point [° C.]: | 80.0 |
| CCP-30CF$_3$ | 4.00% | $\Delta n$ [589 nm, 20° C.]: | 0.0996 |
| CCZU-3-F | 12.00% | $\Delta\epsilon$ [1 kHz, 20° C.]: | 6.5 |
| CCP-V-1 | 13.00% | $K_1$ [pN]: | 11.9 |
| CCP-V2-1 | 5.00% | $K_3$ [pN]: | 13.7 |
| CC-4-V | 15.00% | $K_3/K_1$: | 1.15 |
| CC-3-V1 | 13.00% | | |
| PCH-301 | 6.00% | | |
| PUQU-2-F | 8.00% | | |
| PUQU-3-F | 8.00% | | |
| PGP-2-F | 5.00% | | |
| PGP-4-F | 3.00% | | |
| CCG-V-F | 8.00% | | |

Example 74

| | | | |
|---|---|---|---|
| CCP-20CF$_3$ | 2.00% | Clearing point [° C.]: | 79.0 |
| CCP-30CF$_3$ | 4.00% | $\Delta n$ [589 nm, 20° C.]: | 0.0992 |
| CCZU-3-F | 10.00% | $\Delta\epsilon$ [1 kHz, 20° C.]: | 6.4 |
| CCP-V-1 | 13.00% | $K_1$ [pN]: | 11.8 |
| CCP-V2-1 | 0.00% | $K_3$ [pN]: | 14.0 |
| CC-4-V | 15.00% | $K_3/K_1$: | 1.19 |
| CC-3-V1 | 13.00% | | |
| PCH-301 | 9.00% | | |
| PUQU-2-F | 8.00% | | |
| PUQU-3-F | 8.00% | | |
| PGP-2-F | 5.00% | | |
| PGP-4-F | 3.00% | | |
| CVCP-1V-OT | 10.00% | | |

Example 75

| | | | |
|---|---|---|---|
| CCP-2F·F·F | 5.00% | Clearing point [° C.]: | 75.5 |
| CCP-3F·F·F | 11.00% | $\Delta n$ [589 nm, 20° C.]: | 0.1086 |
| PUQU-2-F | 6.00% | $\Delta\epsilon$ [1 kHz, 20° C.]: | 4.9 |
| PUQU-3-F | 8.00% | $\gamma_1$ [mPa·s, 20° C.]: | 67 |
| CC-3-V1 | 12.00% | $V_{10}$ [V]: | 1.83 |
| CC-4-V | 14.00% | $V_{50}$ [V]: | 2.19 |
| CCP-V-1 | 11.00% | $V_{90}$ [V]: | 2.71 |
| CCP-V2-1 | 8.00% | $V_{90}/V_{10}$: | 1.485 |
| PCH-301 | 11.00% | $K_1$ [pN]: | 12.0 |
| PGP-2-3 | 7.00% | $K_3$ [pN]: | 12.4 |
| PGP-2-4 | 7.00% | $K_3/K_1$: | 1.03 |

Example 76

| | | | |
|---|---|---|---|
| CCP-20CF$_3$ | 4.00% | Clearing point [° C.]: | 75.5 |
| CCP-30CF$_3$ | 4.00% | $\Delta n$ [589 nm, 20° C.]: | 0.1076 |
| PGU-2-F | 2.00% | $\Delta\epsilon$ [1 kHz, 20° C.]: | 4.5 |
| PGU-3-F | 4.00% | $\gamma_1$ [mPa·s, 20° C.]: | 61 |
| PUQU-2-F | 5.00% | $V_{10}$ [V]: | 1.86 |
| PUQU-3-F | 6.00% | $V_{50}$ [V]: | 2.23 |
| CC-3-V1 | 12.00% | $V_{90}$ [V]: | 2.77 |
| CC-4-V | 16.00% | $V_{90}/V_{10}$: | 1.493 |
| CCP-V-1 | 15.00% | $K_1$ [pN]: | 11.6 |
| CCG-V-F | 12.00% | $K_3$ [pN]: | 12.5 |
| PCH-301 | 10.00% | $K_3/K_1$: | 1.08 |
| PGP-2-3 | 5.00% | | |
| PGP-2-4 | 5.00% | | |

Example 77

| | | | |
|---|---|---|---|
| CCP-30CF$_3$ | 4.00% | Clearing point [° C.]: | 79.0 |
| CCZU-2-F | 3.00% | $\Delta n$ [589 nm, 20° C.]: | 0.1007 |
| CCZU-3-F | 14.00% | $\Delta\epsilon$ [1 kHz, 20° C.]: | 5.5 |
| CC-3-V1 | 13.00% | $\gamma_1$ [mPa·s, 20° C.]: | 66 |
| CC-4-V | 18.00% | $V_{10}$ [V]: | 1.75 |
| PCH-301 | 8.00% | $V_{50}$ [V]: | 2.09 |
| CCP-V-1 | 16.00% | $V_{90}$ [V]: | 2.59 |
| PUQU-2-F | 6.00% | $V_{90}/V_{10}$: | 1.477 |
| PUQU-3-F | 8.00% | $K_1$ [pN]: | 12.4 |
| PGP-2-3 | 5.00% | $K_3$ [pN]: | 12.7 |
| PGP-2-4 | 5.00% | $K_3/K_1$: | 1.02 |

Example 78

| | | | |
|---|---|---|---|
| CVCP-1V-OT | 8.00% | Clearing point [° C.]: | 79.0 |
| CCZU-2-F | 3.00% | Δn [589 nm, 20° C.]: | 0.1011 |
| CCZU-3-F | 14.00% | Δε [1 kHz, 20° C.]: | 5.7 |
| CC-3-V1 | 13.00% | $\gamma_1$ [mPa·s, 20° C.]: | 69 |
| CC-4-V | 18.00% | $V_{10}$ [V]: | 1.69 |
| PCH-301 | 8.50% | $V_{50}$ [V]: | 2.03 |
| CCP-V-1 | 11.50% | $V_{90}$ [V]: | 2.50 |
| PUQU-2-F | 6.00% | $V_{90}/V_{10}$: | 1.481 |
| PUQU-3-F | 8.00% | $K_1$ [pN]: | 12.0 |
| PGP-2-3 | 5.00% | $K_3$ [pN]: | 13.0 |
| PGP-2-4 | 5.00% | $K_3/K_1$: | 1.08 |

Example 79

| | | | |
|---|---|---|---|
| CCP-20CF$_3$ | 4.00% | Clearing point [° C.]: | 75.0 |
| CCP-30CF$_3$ | 4.00% | Δn [589 nm, 20° C.]: | 0.1013 |
| PUQU-2-F | 7.00% | Δε [1 kHz, 20° C.]: | 4.5 |
| PUQU-3-F | 9.00% | $\gamma_1$ [mPa·s, 20° C.]: | 65 |
| CCP-3F•F•F | 5.00% | $V_{10}$ [V]: | 1.93 |
| CCP-V-1 | 11.00% | $V_{50}$ [V]: | 2.30 |
| CCP-V2-1 | 9.00% | $V_{90}$ [V]: | 2.85 |
| CC-5-V | 15.00% | $V_{90}/V_{10}$: | 1.478 |
| CC-3-V1 | 13.00% | $K_1$ [pN]: | 12.3 |
| PCH-301 | 15.00% | $K_3$ [pN]: | 13.6 |
| PGP-2-3 | 4.00% | $K_3/K_1$: | 1.10 |
| PGP-2-4 | 4.00% | | |

Example 80

| | | | |
|---|---|---|---|
| CCP-20CF$_3$ | 4.00% | Clearing point [° C.]: | 75.0 |
| CCP-30CF$_3$ | 4.00% | Δn [589 nm, 20° C.]: | 0.1071 |
| PGU-2-F | 2.00% | Δε [1 kHz, 20° C.]: | 4.1 |
| PGU-3-F | 4.00% | $\gamma_1$ [mPa·s, 20° C.]: | 59 |
| PUQU-2-F | 4.00% | $V_{10}$ [V]: | 1.96 |
| PUQU-3-F | 6.00% | $V_{50}$ [V]: | 2.34 |
| CC-3-V1 | 13.00% | $V_{90}$ [V]: | 2.90 |
| CC-4-V | 16.00% | $V_{90}/V_{10}$: | 1.477 |
| CCP-V-1 | 16.00% | $K_1$ [pN]: | 11.7 |
| CCG-V-F | 9.00% | $K_3$ [pN]: | 12.6 |
| PCH-301 | 12.00% | $K_3/K_1$: | 1.08 |
| PGP-2-3 | 5.00% | | |
| PGP-2-4 | 5.00% | | |

Example 81

| | | | |
|---|---|---|---|
| CCP-1F•F•F | 8.00% | Clearing point [° C.]: | 76.0 |
| CCP-3F•F•F | 10.00% | Δn [589 nm, 20° C.]: | 0.1041 |
| CCP-20CF$_3$ | 10.00% | Δε [1 kHz, 20° C.]: | 7.9 |
| CCP-30CF$_3$ | 4.00% | $\gamma_1$ [mPa·s, 20° C.]: | 78 |
| PUQU-2-F | 10.00% | $V_{10}$ [V]: | 1.50 |
| PUQU-3-F | 10.00% | $V_{50}$ [V]: | 1.83 |
| PCH-301 | 5.00% | $V_{90}$ [V]: | 2.30 |
| CCP-V-1 | 10.00% | $V_{90}/V_{10}$: | 1.530 |
| CCP-V2-1 | 8.00% | $K_1$ [pN]: | 12.1 |
| CC-3-V1 | 12.00% | $K_3$ [pN]: | 13.5 |
| CC-5-V | 5.00% | $K_3/K_1$: | 1.12 |
| PGP-2-3 | 4.00% | | |
| PP-1-2V1 | 4.00% | | |

Example 82

| | | | |
|---|---|---|---|
| CCP-20CF$_3$ | 4.00% | Clearing point [° C.]: | 80.0 |
| CCP-30CF$_3$ | 4.00% | Δn [589 nm, 20° C.]: | 0.1038 |
| PGU-3-F | 5.00% | Δε [1 kHz, 20° C.]: | 6.0 |
| PUQU-2-F | 6.00% | $\gamma_1$ [mPa·s, 20° C.]: | 69 |
| PUQU-3-F | 10.00% | $V_{10}$ [V]: | 1.67 |
| CC-3-V1 | 13.00% | $V_{50}$ [V]: | 2.01 |
| CC-4-V | 18.00% | $V_{90}$ [V]: | 2.51 |
| CCP-V-1 | 12.00% | $V_{90}/V_{10}$: | 1.503 |
| CCP-V2-1 | 5.00% | $K_1$ [pN]: | 12.1 |
| CCG-V-F | 8.00% | $K_3$ [pN]: | 13.5 |
| PCH-301 | 6.00% | $K_3/K_1$: | 1.11 |
| PGP-2-3 | 5.00% | | |
| CCGU-3-F | 4.00% | | |

Example 83

| | | | |
|---|---|---|---|
| CCP-20CF$_3$ | 4.00% | Clearing point [° C.]: | 78.0 |
| CCP-30CF$_3$ | 4.00% | Δn [589 nm, 20° C.]: | 0.1143 |
| PGU-3-F | 3.00% | Δε [1 kHz, 20° C.]: | 4.9 |
| PUQU-2-F | 7.00% | $\gamma_1$ [mPa·s, 20° C.]: | 68 |
| PUQU-3-F | 10.00% | $V_{10}$ [V]: | 1.91 |
| CC-3-V1 | 16.00% | $V_{50}$ [V]: | 2.27 |
| CC-4-V | 10.00% | $V_{90}$ [V]: | 2.80 |
| PCH-301 | 12.00% | $V_{90}/V_{10}$: | 1.466 |
| CCP-V-1 | 12.00% | $K_1$ [pN]: | 12.9 |
| CCP-V2-1 | 10.00% | $K_3$ [pN]: | 13.5 |
| PGP-2-3 | 6.00% | $K_3/K_1$: | 1.04 |
| PGP-2-4 | 6.00% | | |

Example 84

| | | | |
|---|---|---|---|
| CCP-20CF$_3$ | 4.00% | Clearing point [° C.]: | 77.5 |
| CCP-30CF$_3$ | 4.00% | Δn [589 nm, 20° C.]: | 0.1147 |
| PUQU-2-F | 6.00% | Δε [1 kHz, 20° C.]: | 5.0 |
| PUQU-3-F | 10.00% | $\gamma_1$ [mPa·s, 20° C.]: | 70 |
| CC-3-V1 | 14.00% | $V_{10}$ [V]: | 1.94 |
| CC-4-V | 10.00% | $V_{50}$ [V]: | 2.31 |
| PCH-301 | 10.00% | $V_{90}$ [V]: | 2.84 |
| CCP-V-1 | 10.00% | $V_{90}/V_{10}$: | 1.464 |
| CCP-V2-1 | 10.00% | $K_1$ [pN]: | 13.6 |
| CCGU-3-F | 6.00% | $K_3$ [pN]: | 14.4 |
| PP-1-2V1 | 10.00% | $K_3/K_1$: | 1.06 |
| PGP-2-4 | 6.00% | | |

Example 85

| | | | |
|---|---|---|---|
| CCP-20CF$_3$ | 4.00% | Clearing point [° C.]: | 79.0 |
| CCP-30CF$_3$ | 4.00% | Δn [589 nm, 20° C.]: | 0.1049 |
| PGU-3-F | 5.00% | Δε [1 kHz, 20° C.]: | 6.0 |
| PUQU-2-F | 8.00% | $\gamma_1$ [mPa·s, 20° C.]: | 68 |

-continued

| | | | |
|---|---|---|---|
| PUQU-3-F | 10.00% | $V_{10}$ [V]: | 1.69 |
| CC-3-V1 | 13.00% | $V_{50}$ [V]: | 2.03 |
| CC-4-V | 15.00% | $V_{90}$ [V]: | 2.53 |
| CCP-V-1 | 12.00% | $V_{90}/V_{10}$: | 1.497 |
| CCP-V2-1 | 10.00% | $K_1$ [pN]: | 12.3 |
| CCG-V-F | 8.00% | $K_3$ [pN]: | 13.6 |
| PCH-301 | 6.00% | $K_3/K_1$: | 1.10 |
| PGP-2-3 | 5.00% | | |

Example 86

| | | | |
|---|---|---|---|
| GGP-3-CL | 9.00% | Clearing point [° C.]: | 87.5 |
| GGP-5-CL | 23.00% | Δn [589 nm, 20° C.]: | 0.2040 |
| FET-2CL | 7.00% | Δε [1 kHz, 20° C.]: | 6.9 |
| FET-3CL | 4.00% | $γ_1$ [mPa·s, 20° C.]: | 179 |
| FET-5CL | 7.00% | | |
| PP-1-2V1 | 13.00% | | |
| CCP-V-1 | 12.00% | | |
| CC-3-V1 | 8.00% | | |
| BCH-2F·F | 6.00% | | |
| PGP-2-3 | 2.00% | | |
| PGP-2-4 | 3.00% | | |
| PGU-3-F | 6.00% | | |

Example 87

| | | | |
|---|---|---|---|
| CCZU-3-F | 12.00% | Clearing point [° C.]: | 81.0 |
| PGU-2-F | 3.00% | Δn [589 nm, 20° C.]: | 0.1043 |
| PGU-3-F | 4.00% | Δε [1 kHz, 20° C.]: | 6.6 |
| PUQU-2-F | 6.00% | $γ_1$ [mPa·s, 20° C.]: | 72 |
| PUQU-3-F | 8.00% | $V_{10}$ [V]: | 1.60 |
| CC-3-V1 | 13.00% | $V_{50}$ [V]: | 1.94 |
| CC-4-V | 15.00% | $V_{90}$ [V]: | 2.41 |
| CCP-V-1 | 12.00% | $V_{90}/V_{10}$: | 1.506 |
| CCP-V2-1 | 8.00% | $K_1$ [pN]: | 12.2 |
| CCG-V-F | 8.00% | $K_3$ [pN]: | 13.5 |
| PCH-301 | 6.00% | $K_3/K_1$: | 1.10 |
| PGP-2-3 | 5.00% | | |

Example 88

| | | | |
|---|---|---|---|
| GGP-3-CL | 9.00% | Clearing point [° C.]: | 87.5 |
| GGP-5-CL | 20.00% | Δn [589 nm, 20° C.]: | 0.2017 |
| FET-2CL | 9.00% | Δε [1 kHz, 20° C.]: | 6.5 |
| FET-3CL | 4.00% | $γ_1$ [mPa·s, 20° C.]: | 172 |
| FET-5CL | 7.00% | | |
| PP-1-2V1 | 13.00% | | |
| CCP-V-1 | 14.00% | | |
| CC-3-V1 | 10.00% | | |
| PGP-2-3 | 3.00% | | |
| PGP-2-4 | 3.00% | | |
| PGU-3-F | 8.00% | | |

Example 89

| | | | |
|---|---|---|---|
| CCQU-2-F | 6.00% | Clearing point [° C.]: | 80.0 |
| CCQU-3-F | 7.00% | Δn [589 nm, 20° C.]: | 0.0975 |
| CCP-20CF$_3$ | 4.00% | Δε [1 kHz, 20° C.]: | 6.7 |
| CCP-30CF$_3$ | 4.00% | $γ_1$ [mPa·s, 20° C.]: | 76 |
| CC-3-V1 | 14.00% | $V_{10}$ [V]: | 1.65 |
| CC-5-V | 10.00% | $V_{50}$ [V]: | 1.99 |
| PCH-301 | 7.00% | $V_{90}$ [V]: | 2.47 |
| CCP-V-1 | 10.00% | $V_{90}/V_{10}$: | 1.498 |
| CCP-V2-1 | 7.00% | $K_1$ [pN]: | 12.3 |
| CCG-V-F | 8.00% | $K_3$ [pN]: | 14.0 |
| PUQU-2-F | 8.00% | $K_3/K_1$: | 1.13 |
| PUQU-3-F | 10.00% | | |
| PGP-2-4 | 5.00% | | |

Example 90

| | | | |
|---|---|---|---|
| GGP-3-CL | 9.00% | Clearing point [° C.]: | 90.0 |
| GGP-5-CL | 20.00% | Δn [589 nm, 20° C.]: | 0.1989 |
| FET-2CL | 7.00% | Δε [1 kHz, 20° C.]: | 7.4 |
| FET-3CL | 3.00% | | |
| FET-5CL | 6.00% | | |
| PP-1-2V1 | 14.00% | | |
| PGP-2-3 | 3.00% | | |
| PGP-2-4 | 3.00% | | |
| PGU-3-F | 7.00% | | |
| CCG-V-F | 9.00% | | |
| CCGU-3-F | 4.00% | | |
| CC-3-V1 | 7.00% | | |
| CCP-V-1 | 8.00% | | |

Example 91

| | | | |
|---|---|---|---|
| CCP-1F.F.F | 6.00% | Clearing point [° C.]: | 72.0 |
| CCP-3F.F.F | 10.00% | Δn [589 nm, 20° C.]: | 0.1119 |
| CCP-20CF$_3$ | 4.00% | Δε [1 kHz, 20° C.]: | 7.9 |
| CCP-30CF$_3$ | 4.00% | $γ_1$ [mPa·s, 20° C.]: | 76 |
| CCP-40CF$_3$ | 4.00% | $K_1$ [pN]: | 12.4 |
| CCP-50CF$_3$ | 4.00% | $K_3$ [pN]: | 12.8 |
| PUQU-2-F | 10.00% | $K_3/K_1$: | 1.03 |
| PUQU-3-F | 10.00% | | |
| CCP-V-1 | 13.00% | | |
| CC-3-V1 | 14.00% | | |
| PCH-301 | 8.00% | | |
| PGP-2-3 | 6.50% | | |
| PP-1-2V1 | 6.50% | | |

Example 92

| | | | |
|---|---|---|---|
| CCGU-3-F | 3.00% | Clearing point [° C.]: | 75.5 |
| CC-3-V1 | 18.00% | Δn [589 nm, 20° C.]: | 0.1133 |
| CC-4-V | 8.00% | Δε [1 kHz, 20° C.]: | 5.0 |
| PCH-301 | 15.00% | $γ_1$ [mPa·s, 20° C.]: | 73 |
| CCP-V-1 | 12.00% | $V_{10}$ [V]: | 1.85 |
| CCP-V2-1 | 12.00% | $V_{50}$ [V]: | 2.22 |
| PUQU-2-F | 10.00% | $V_{90}$ [V]: | 2.78 |
| PUQU-3-F | 10.00% | $V_{90}/V_{10}$: | 1.504 |

-continued

| | | | |
|---|---|---|---|
| PGP-2-3 | 6.00% | $K_1$ [pN]: | 13.5 |
| PGP-2-4 | 6.00% | $K_3$ [pN]: | 15.5 |
| | | $K_3/K_1$: | 1.15 |

Example 93

| | | | |
|---|---|---|---|
| PGU-2-F | 5.00% | Clearing point [° C.]: | 73.5 |
| PGU-3-F | 4.00% | $\Delta n$ [589 nm, 20° C.]: | 0.1167 |
| CCQU-3-F | 7.00% | $\Delta\epsilon$ [1 kHz, 20° C.]: | 8.7 |
| PUQU-2-F | 9.00% | $\gamma_1$ [mPa·s, 20° C.]: | 76 |
| PUQU-3-F | 9.00% | $V_{10}$ [V]: | 1.34 |
| CC-3-V1 | 10.00% | $V_{50}$ [V]: | 1.63 |
| CC-5-V | 10.00% | $V_{90}$ [V]: | 2.02 |
| CCP-V-1 | 12.00% | $V_{90}/V_{10}$: | 1.507 |
| PCH-301 | 9.00% | $K_1$ [pN]: | 10.9 |
| PGP-2-3 | 3.00% | $K_3$ [pN]: | 12.5 |
| PGP-2-4 | 5.00% | $K_3/K_1$: | 1.15 |
| CCGU-3-F | 5.00% | | |
| CCG-V-F | 12.00% | | |

Example 94

| | | | |
|---|---|---|---|
| PGU-2-F | 5.00% | Clearing point [° C.]: | 74.0 |
| PGU-3-F | 4.00% | $\Delta n$ [589 nm, 20° C.]: | 0.1154 |
| CCQU-3-F | 7.00% | $\Delta\epsilon$ [1 kHz, 20° C.]: | 8.9 |
| PUQU-2-F | 8.00% | $\gamma 1$ [mPa·s, 20° C.]: | 76 |
| PUQU-3-F | 9.00% | $V_{10}$ [V]: | 1.34 |
| CC-3-V1 | 11.00% | $V_{50}$ [V]: | 1.63 |
| CC-5-V | 10.00% | $V_{90}$ [V]: | 2.02 |
| CCP-V-1 | 11.00% | $V_{90}/V_{10}$: | 1.507 |
| PCH-301 | 10.00% | $K_1$ [pN]: | 11.5 |
| PGP-2-3 | 3.00% | $K_3$ [pN]: | 11.9 |
| PGP-2-4 | 5.00% | $K_3/K_1$: | 1.03 |
| CCGU-3-F | 5.00% | | |
| CCG-V-F | 7.00% | | |
| CCZU-3-F | 5.00% | | |

Example 95

| | | | |
|---|---|---|---|
| CCP-20CF$_3$ | 4.00% | Clearing point [° C.]: | 75.0 |
| CCP-30CF$_3$ | 4.00% | $\Delta n$ [589 nm, 20° C.]: | 0.1085 |
| PGU-2-F | 2.00% | $\Delta\epsilon$ [1 kHz, 20° C.]: | 4.4 |
| PGU-3-F | 4.00% | $\gamma_1$ [mPa·s, 20° C.]: | 59 |
| PUQU-2-F | 5.00% | $V_{10}$ [V]: | 1.88 |
| PUQU-3-F | 6.00% | $V_{50}$ [V]: | 2.26 |
| CC-3-V1 | 13.00% | $V_{90}$ [V]: | 2.81 |
| CC-4-V | 16.00% | $V_{90}/V_{10}$: | 1.495 |
| CCP-V-1 | 16.00% | $K_1$ [pN]: | 11.7 |
| CCG-V-F | 8.00% | $K_3$ [pN]: | 12.8 |
| PCH-301 | 12.00% | $K_3/K_1$: | 1.10 |
| PGP-2-3 | 5.00% | | |
| PGP-2-2V | 5.00% | | |

Example 96

| | | | |
|---|---|---|---|
| CCP-20CF$_3$ | 4.00% | Clearing point [° C.]: | 80.5 |
| CCP-30CF$_3$ | 4.00% | $\Delta n$ [589 nm, 20° C.]: | 0.1057 |
| PGU-3-F | 5.00% | $\Delta\epsilon$ [1 kHz, 20° C.]: | 6.1 |
| PUQU-2-F | 6.00% | $\gamma_1$ [mPa·s, 20° C.]: | 68 |
| PUQU-3-F | 10.00% | $V_{10}$ [V]: | 1.69 |
| CC-3-V1 | 13.00% | $V_{50}$ [V]: | 2.04 |
| CC-4-V | 18.00% | $V_{90}$ [V]: | 2.55 |
| CCP-V-1 | 12.00% | $V_{90}/V_{10}$: | 1.509 |
| CCP-V2-1 | 5.00% | $K_1$ [pN]: | 12.1 |
| CCG-V-F | 8.00% | $K_3$ [pN]: | 13.6 |
| PCH-301 | 6.00% | $K_3/K_1$: | 1.12 |
| PGP-2-2V | 5.00% | | |
| CCGU-3-F | 4.00% | | |

Example 97

| | | | |
|---|---|---|---|
| CCP-20CF$_3$ | 4.00% | Clearing point [° C.]: | 79.0 |
| CCP-30CF$_3$ | 4.00% | $\Delta n$ [589 nm, 20° C.]: | 0.1049 |
| PGU-3-F | 3.00% | $\Delta\epsilon$ [1 kHz, 20° C.]: | 5.5 |
| PUQU-2-F | 6.00% | $\gamma_1$ [mPa·s, 20° C.]: | 66 |
| PUQU-3-F | 10.00% | $V_{10}$ [V]: | 1.75 |
| CC-3-V1 | 13.00% | $V_{50}$ [V]: | 2.11 |
| CC-4-V | 18.00% | $V_{90}$ [V]: | 2.63 |
| CCP-V-1 | 12.00% | $V_{90}/V_{10}$: | 1.503 |
| CCP-V2-1 | 5.00% | $K_1$ [pN]: | 12.1 |
| CCG-V-F | 8.00% | $K_3$ [pN]: | 13.3 |
| PCH-301 | 7.00% | $K_3/K_1$: | 1.09 |
| PGP-2-3 | 5.00% | | |
| PGP-2-4 | 2.00% | | |
| CCGU-3-F | 3.00% | | |

Example 98

| | | | |
|---|---|---|---|
| CCZU-3-F | 12.00% | Clearing point [° C.]: | 79.0 |
| PGU-3-F | 4.00% | $\Delta n$ [589 nm, 20° C.]: | 0.0999 |
| PUQU-2-F | 6.00% | $\Delta\epsilon$ [1 kHz, 20° C.]: | 5.9 |
| PUQU-3-F | 8.00% | $\gamma_1$ [mPa·s, 20° C.]: | 69 |
| CC-3-V1 | 13.00% | $V_{10}$ [V]: | 1.66 |
| CC-4-V | 16.00% | $V_{50}$ [V]: | 2.00 |
| CCP-V-1 | 12.00% | $V_{90}$ [V]: | 2.48 |
| CCP-V2-1 | 8.00% | $V_{90}/V_{10}$: | 1.494 |
| CCG-V-F | 8.00% | $K_1$ [pN]: | 12.0 |
| PCH-301 | 8.00% | $K_3$ [pN]: | 13.6 |
| PGP-2-3 | 5.00% | $K_3/K_1$: | 1.13 |

Example 99

| | | | |
|---|---|---|---|
| CCP-20CF$_3$ | 4.00% | Clearing point [° C.]: | 79.0 |
| CCP-30CF$_3$ | 4.00% | $\Delta n$ [589 nm, 20° C.]: | 0.0980 |
| PUQU-2-F | 7.00% | $\Delta\epsilon$ [1 kHz, 20° C.]: | 5.3 |
| PUQU-3-F | 10.00% | $\gamma_1$ [mPa·s, 20° C.]: | 66 |
| CC-3-V1 | 13.00% | $V_{10}$ [V]: | 1.79 |
| CC-4-V | 18.00% | $V_{50}$ [V]: | 2.15 |
| CCP-V-1 | 12.00% | $V_{90}$ [V]: | 2.68 |
| CCP-V2-1 | 5.00% | $V_{90}/V_{10}$: | 1.497 |
| CCG-V-F | 10.00% | $K_1$ [pN]: | 11.8 |
| PCH-301 | 8.00% | $K_3$ [pN]: | 13.8 |

-continued

| | | | |
|---|---|---|---|
| PGP-2-3 | 5.00% | $K_3/K_1$: | 1.17 |
| CCGU-3-F | 4.00% | | |

Example 100

| | | | |
|---|---|---|---|
| CCP-20CF$_3$ | 4.50% | Clearing point [° C.]: | 79.5 |
| CCP-30CF$_3$ | 4.50% | Δn [589 nm, 20° C.]: | 0.1033 |
| CCZU-3-F | 5.00% | Δε [1 kHz, 20° C.]: | 5.2 |
| PUQU-2-F | 6.00% | $γ_1$ [mPa·s, 20° C.]: | 66 |
| PUQU-3-F | 10.00% | $V_{10}$ [V]: | 1.76 |
| CC-3-V1 | 13.00% | $V_{50}$ [V]: | 2.12 |
| CC-4-V | 15.00% | $V_{90}$ [V]: | 2.62 |
| CCP-V-1 | 12.00% | $V_{90}/V_{10}$: | 1.489 |
| CCP-V2-1 | 5.00% | $K_1$ [pN]: | 12.3 |
| CCG-V-F | 8.00% | $K_3$ [pN]: | 13.4 |
| PCH-301 | 8.00% | $K_3/K_1$: | 1.08 |
| PGP-2-3 | 5.00% | | |
| PGP-2-4 | 4.00% | | |

Example 101

| | | | |
|---|---|---|---|
| CC-3-V1 | 10.00% | Clearing point [° C.]: | 77.5 |
| CC-4-V | 14.00% | Δn [589 nm, 20° C.]: | 0.0934 |
| PGP-2-3 | 4.00% | Δε [1 kHz, 20° C.]: | 8.7 |
| PGP-2-4 | 4.00% | $γ_1$ [mPa·s, 20° C.]: | 83 |
| CCG-V-F | 10.00% | $V_{10}$ [V]: | 1.38 |
| PUQU-2-F | 8.00% | $V_{50}$ [V]: | 1.68 |
| PUQU-3-F | 7.00% | $V_{90}$ [V]: | 2.09 |
| CCQU-2-F | 7.00% | $V_9/V_{10}$: | 1.516 |
| CCQU-3-F | 12.00% | | |
| CCQU-5-F | 10.00% | | |
| CCP-3F.F.F | 3.00% | | |
| CCP-20CF$_3$ | 5.00% | | |
| CCP-30CF$_3$ | 6.00% | | |

Example 102

| | | | |
|---|---|---|---|
| CCP-2F.F.F | 8.00% | Clearing point [° C.]: | 81.0 |
| CCP-3F.F.F | 6.00% | Δn [589 nm, 20° C.]: | 0.0808 |
| CCQU-2-F | 11.00% | Δε [1 kHz, 20° C.]: | 16.5 |
| CCQU-3-F | 12.00% | $γ_1$ [mPa·s, 20° C.]: | 164 |
| CCQU-5-F | 10.00% | $V_{10}$ [V]: | 0.95 |
| ACQU-2-F | 8.00% | $V_{50}$ [V]: | 1.20 |
| ACQU-3-F | 10.00% | $V_{90}$ [V]: | 1.50 |
| ACQU-4-F | 10.00% | $V_{90}/V_{10}$: | 1.587 |
| AUUQGU-3-F | 9.00% | | |
| CC-4-V | 12.00% | | |
| PGP-2-4 | 4.00% | | |

Example 103

| | | | |
|---|---|---|---|
| PCH-301 | 6.00% | Clearing point [° C.]: | 76.0 |
| CC-4-V | 14.00% | Δn [589 nm, 20° C.]: | 0.0927 |
| CCP-V-1 | 10.00% | Δε [1 kHz, 20° C.]: | 8.7 |
| CCG-V-F | 13.00% | $γ_1$ [mPa·s, 20° C.]: | 90 |

-continued

| | | | |
|---|---|---|---|
| PUQU-2-F | 8.00% | $V_{10}$ [V]: | 1.32 |
| PUQU-3-F | 7.00% | $V_{50}$ [V]: | 1.62 |
| CCQU-3-F | 8.00% | $V_{90}$ [V]: | 2.02 |
| CCQU-5-F | 7.00% | $V_{90}/V_{10}$: | 1.527 |
| ACQU-2-F | 6.00% | | |
| ACQU-3-F | 6.00% | | |
| CCP-30CF$_3$ | 6.00% | | |
| CCP-40CF$_3$ | 4.00% | | |
| PGP-2-4 | 3.00% | | |
| PGP-2-3 | 2.00% | | |

Example 104

| | | | |
|---|---|---|---|
| CC-4-V | 15.00% | Clearing point [° C.]: | 86.0 |
| CC-3-V1 | 2.00% | Δn [589 nm, 20° C.]: | 0.0900 |
| CCQU-2-F | 13.00% | Δε [1 kHz, 20° C.]: | 11.2 |
| CCQU-3-F | 13.00% | $γ_1$ [mPa·s, 20° C.]: | 109 |
| CCQU-5-F | 12.00% | $V_{10}$ [V]: | 1.28 |
| CCP-20CF$_3$ | 8.00% | $V_{50}$ [V]: | 1.58 |
| CCP-30CF$_3$ | 8.00% | $V_{90}$ [V]: | 1.98 |
| CCP-50CF$_3$ | 5.00% | $V_{90}/V_{10}$: | 1.549 |
| PUQU-2-F | 7.00% | | |
| PUQU-3-F | 9.00% | | |
| PGP-2-3 | 3.00% | | |
| CCGU-3-F | 5.00% | | |

Example 105

| | | | |
|---|---|---|---|
| CC-3-V1 | 11.00% | Clearing point [° C.]: | 80.0 |
| CC-4-V | 14.00% | Δn [589 nm, 20° C.]: | 0.0938 |
| PGP-2-3 | 4.00% | Δε [1 kHz, 20° C.]: | 8.7 |
| PGP-2-4 | 4.00% | $γ_1$ [mPa·s, 20° C.]: | 86 |
| CCG-V-F | 9.00% | $V_{10}$ [V]: | 1.41 |
| PUQU-2-F | 8.00% | $V_{50}$ [V]: | 1.72 |
| PUQU-3-F | 7.00% | $V_{90}$ [V]: | 2.14 |
| CCQU-2-F | 7.00% | $V_{90}/V_{10}$: | 1.514 |
| CCQU-3-F | 13.00% | | |
| CCQU-5-F | 12.00% | | |
| CCP-30CF$_3$ | 5.00% | | |
| CCP-40CF$_3$ | 6.00% | | |

Example 106

| | | | |
|---|---|---|---|
| ECCP-3F.F | 7.00% | Clearing point [° C.]: | 78.5 |
| CCP-20CF$_3$ | 4.50% | Δn [589 nm, 20° C.]: | 0.1008 |
| CCP-30CF$_3$ | 4.50% | Δε [1 kHz, 20° C.]: | 4.5 |
| PUQU-2-F | 6.00% | $γ_1$ [mPa·s, 20° C.]: | 70 |
| PUQU-3-F | 10.00% | $V_{10}$ [V]: | 2.00 |
| CC-4-V | 10.00% | $V_{50}$ [V]: | 2.40 |
| CC-3-V1 | 14.00% | $V_{90}$ [V]: | 3.01 |
| CCP-V-1 | 15.00% | $V_{90}/V_{10}$: | 1.503 |
| CCP-V2-1 | 8.00% | $K_1$ [pN]: | 12.6 |
| PCH-301 | 15.00% | $K_3$ [pN]: | 14.7 |
| PGP-2-3 | 6.00% | $K_3/K_1$: | 1.16 |

Example 107

| | | | |
|---|---|---|---|
| CCZU-3-F | 13.00% | Clearing point [° C.]: | 81.5 |
| PGU-2-F | 2.00% | $\Delta n$ [589 nm, 20° C.]: | 0.1039 |
| PGU-3-F | 4.00% | $\Delta\epsilon$ [1 kHz, 20° C.]: | 6.7 |
| PUQU-2-F | 6.00% | $\gamma_1$ [mPa · s, 20° C.]: | 73 |
| PUQU-3-F | 10.00% | $V_{10}$ [V]: | 1.62 |
| CC-3-V1 | 13.00% | $V_{50}$ [V]: | 1.97 |
| CC-4-V | 15.00% | $V_{90}$ [V]: | 2.45 |
| CCP-V-1 | 12.00% | $V_{90}/V_{10}$: | 1.512 |
| CCP-V2-1 | 8.00% | $K_1$ [pN]: | 12.6 |
| CCG-V-F | 7.00% | $K_3$ [pN]: | 13.7 |
| PCH-301 | 5.00% | $K_3/K_1$: | 1.09 |
| PGP-2-3 | 5.00% | | |

Example 108

| | | | |
|---|---|---|---|
| CC-4-V | 18.00% | Clearing point [° C.]: | 79.0 |
| CCP-V-1 | 10.00% | $\Delta n$ [589 nm, 20° C.]: | 0.0931 |
| CCG-V-F | 14.00% | $\Delta\epsilon$ [1 kHz, 20° C.]: | 8.9 |
| PUQU-2-F | 8.00% | $\gamma_1$ [mPa · s, 20° C.]: | 88 |
| PUQU-3-F | 7.00% | $V_{10}$ [V]: | 1.33 |
| CCQU-2-F | 3.00% | $V_{50}$ [V]: | 1.63 |
| CCQU-3-F | 5.00% | $V_{90}$ [V]: | 2.03 |
| CCQU-5-F | 6.00% | $V_{90}/V_{10}$: | 1.532 |
| ACQU-2-F | 7.00% | | |
| ACQU-3-F | 6.00% | | |
| CCP-30CF$_3$ | 6.00% | | |
| CCP-40CF$_3$ | 4.00% | | |
| PGP-2-4 | 3.00% | | |
| PGP-2-3 | 3.00% | | |

Example 109

| | | | |
|---|---|---|---|
| CCP-20CF$_3$ | 4.00% | Clearing point [° C.]: | 77.0 |
| CCP-30CF$_3$ | 4.00% | $\Delta n$ [589 nm, 20° C.]: | 0.1131 |
| PGU-2-F | 2.00% | $\Delta\epsilon$ [1 kHz, 20° C.]: | 4.7 |
| PGU-3-F | 4.00% | $K_1$ [pN]: | 12.3 |
| PUQU-2-F | 6.00% | $K_3$ [pN]: | 13.3 |
| PUQU-3-F | 8.00% | $K_3/K_1$: | 1.08 |
| CC-3-V1 | 14.00% | | |
| CC-4-V | 10.00% | | |
| PCH-301 | 15.00% | | |
| CCP-V-1 | 14.00% | | |
| CCP-V2-1 | 9.00% | | |
| PGP-2-3 | 5.00% | | |
| PGP-2-4 | 5.00% | | |

Example 110

| | | | |
|---|---|---|---|
| PGU-2-F | 3.00% | Clearing point [° C.]: | 79.5 |
| CC-5-V | 15.00% | $\Delta n$ [589 nm, 20° C.]: | 0.1206 |
| CC-3-V1 | 11.00% | $\Delta\epsilon$ [1 kHz, 20° C.]: | 6.6 |
| PCH-301 | 11.00% | $\gamma_1$ [mPa · s, 20° C.]: | 80 |
| CCP-V-1 | 11.00% | $V_{10}$ [V]: | 1.60 |
| CCP-V2-1 | 9.00% | $V_{50}$ [V]: | 1.95 |
| GGP-3-CL | 5.00% | $V_{90}$ [V]: | 2.43 |
| PUQU-2-F | 9.00% | $V_{90}/V_{10}$: | 1.519 |
| PUQU-3-F | 9.00% | $K_1$ [pN]: | 12.6 |
| PGP-2-3 | 3.00% | $K_3$ [pN]: | 13.7 |
| PGP-2-4 | 6.00% | $K_3/K_1$: | 1.09 |
| CCGU-3-F | 6.00% | | |
| CCQU-2-F | 2.00% | | |

Example 111

| | | | |
|---|---|---|---|
| CCZU-3-F | 14.00% | Clearing point [° C.]: | 80.0 |
| PGU-2-F | 2.00% | $\Delta n$ [589 nm, 20° C.]: | 0.1050 |
| PGU-3-F | 5.00% | $\Delta\epsilon$ [1 kHz, 20° C.]: | 7.6 |
| PUQU-2-F | 6.00% | $\gamma_1$ [mPa · s, 20° C.]: | 74 |
| PUQU-3-F | 10.00% | $V_{10}$ [V]: | 1.51 |
| CC-3-V1 | 13.00% | $V_{50}$ [V]: | 1.82 |
| CC-4-V | 15.00% | $V_{90}$ [V]: | 2.26 |
| CCP-V-1 | 10.00% | $V_{90}/V_{10}$: | 1.502 |
| CCP-V2-1 | 8.00% | $K_1$ [pN]: | 12.1 |
| CCG-V-F | 8.00% | $K_3$ [pN]: | 13.2 |
| PCH-301 | 4.00% | $K_3/K_1$: | 1.09 |
| PGP-2-3 | 5.00% | | |

Example 112

| | | | |
|---|---|---|---|
| PGU-3-F | 2.00% | Clearing point [° C.]: | 80.5 |
| CCP-2F.F.F | 6.00% | $\Delta n$ [589 nm, 20° C.]: | 0.0974 |
| CCP-3F.F.F | 12.00% | $\Delta\epsilon$ [1 kHz, 20° C.]: | 7.0 |
| CCP-20CF$_3$ | 4.00% | $\gamma_1$ [mPa · s, 20° C.]: | 73 |
| CCP-30CF$_3$ | 4.00% | $V_{10}$ [V]: | 1.61 |
| CC-3-V1 | 16.00% | $V_{50}$ [V]: | 1.95 |
| CC-4-V | 14.00% | $V_{90}$ [V]: | 2.43 |
| PCH-301 | 2.00% | $V_{90}/V_{10}$: | 1.511 |
| CCP-V-1 | 8.00% | $K_1$ [pN]: | 12.5 |
| CCP-V2-1 | 10.00% | $K_3$ [pN]: | 13.8 |
| PUQU-2-F | 7.00% | $K_3/K_1$: | 1.10 |
| PUQU-3-F | 10.00% | | |
| PGP-2-4 | 5.00% | | |

Example 113

| | | | |
|---|---|---|---|
| CCP-20CF$_3$ | 4.00% | Clearing point [° C.]: | 79.5 |
| CCP-30CF$_3$ | 4.00% | $\Delta n$ [589 nm, 20° C.]: | 0.1130 |
| PGU-3-F | 3.00% | $\Delta\epsilon$ [1 kHz, 20° C.]: | 5.3 |
| PUQU-2-F | 6.00% | $\gamma_1$ [mPa · s, 20° C.]: | 72 |
| PUQU-3-F | 10.00% | $V_{10}$ [V]: | 1.82 |
| CC-3-V1 | 15.00% | $V_{50}$ [V]: | 2.18 |
| CC-4-V | 9.00% | $V_{90}$ [V]: | 2.69 |
| PCH-301 | 15.00% | $V_{90}/V_{10}$: | 1.482 |
| CCP-V-1 | 11.00% | $K_1$ [pN]: | 12.5 |
| CCP-V2-1 | 9.00% | $K_3$ [pN]: | 13.7 |
| CCGU-3-F | 4.00% | $K_3/K_1$: | 1.09 |
| PGP-2-3 | 5.00% | | |
| PGP-2-4 | 5.00% | | |

Example 114

| | | | |
|---|---|---|---|
| CCQU-2-F | 4.00% | Clearing point [° C.]: | 78.5 |
| CCQU-3-F | 9.00% | $\Delta n$ [589 nm, 20° C.]: | 0.0970 |

Example 115

| | | | |
|---|---|---|---|
| CCP-20CF$_3$ | 4.00% | $\Delta\epsilon$ [1 kHz, 20° C.]: | 6.6 |
| CCP-30CF$_3$ | 4.00% | $\gamma_1$ [mPa·s, 20° C.]: | 70 |
| CC-3-V1 | 12.00% | $V_{10}$ [V]: | 1.59 |
| CC-4-V | 12.00% | $V_{50}$ [V]: | 1.94 |
| PCH-301 | 7.00% | $V_{90}$ [V]: | 2.42 |
| CCP-V-1 | 11.00% | $V_{90}/V_{10}$: | 1.527 |
| CCP-V2-1 | 6.00% | $K_1$ [pN]: | 11.9 |
| CCG-V-F | 8.00% | $K_3$ [pN]: | 13.5 |
| PUQU-2-F | 8.00% | $K_3/K_1$: | 1.13 |
| PUQU-3-F | 10.00% | | |
| PGP-2-3 | 5.00% | | |

Example 115

| | | | |
|---|---|---|---|
| CCQU-2-F | 6.00% | Clearing point [° C.]: | 80.0 |
| CCQU-3-F | 10.00% | $\Delta n$ [589 nm, 20° C.]: | 0.0981 |
| CCP-20CF$_3$ | 4.00% | $\Delta\epsilon$ [1 kHz, 20° C.]: | 7.1 |
| CCP-30CF$_3$ | 4.00% | $\gamma_1$ [mPa·s, 20° C.]: | 75 |
| CC-3-V1 | 12.00% | $V_{10}$ [V]: | 1.58 |
| CC-4-V | 9.00% | $V_{50}$ [V]: | 1.91 |
| PCH-301 | 7.00% | $V_{90}$ [V]: | 2.36 |
| CCP-V-1 | 11.00% | $V_{90}/V_{10}$: | 1.495 |
| CCP-V2-1 | 6.00% | $K_1$ [pN]: | 11.9 |
| CCG-V-F | 8.00% | $K_3$ [pN]: | 13.7 |
| PUQU-2-F | 8.00% | $K_3/K_1$: | 1.16 |
| PUQU-3-F | 10.00% | | |
| PGP-2-3 | 5.00% | | |

Example 116

| | | | |
|---|---|---|---|
| CCP-1F.F.F | 8.00% | Clearing point [° C.]: | 73.5 |
| CCP-3F.F.F | 10.00% | $\Delta n$ [589 nm, 20° C.]: | 0.1038 |
| CCP-20CF$_3$ | 9.00% | $\Delta\epsilon$ [1 kHz, 20° C.]: | 7.9 |
| CCP-30CF$_3$ | 5.00% | $\gamma_1$ [mPa·s, 20° C.]: | 76 |
| PUQU-2-F | 10.00% | $V_{10}$ [V]: | 1.49 |
| PUQU-3-F | 10.00% | $V_{50}$ [V]: | 1.80 |
| PCH-301 | 5.00% | $V_{90}$ [V]: | 2.23 |
| CCP-V-1 | 10.00% | $V_{90}/V_{10}$: | 1.502 |
| CCP-V2-1 | 6.00% | $K_1$ [pN]: | 12.2 |
| CC-3-V1 | 12.00% | $K_3$ [pN]: | 13.0 |
| CC-5-V | 6.00% | $K_3/K_1$: | 1.07 |
| PGP-2-3 | 4.50% | | |
| PP-1-2V1 | 4.50% | | |

Example 117

| | | | |
|---|---|---|---|
| CCP-1F.F.F | 9.00% | Clearing point [° C.]: | 74.5 |
| CCP-3F.F.F | 9.00% | $\Delta n$ [589 nm, 20° C.]: | 0.1040 |
| CCP-20CF$_3$ | 9.00% | $\Delta\epsilon$ [1 kHz, 20° C.]: | 7.9 |
| CCP-30CF$_3$ | 4.00% | $\gamma_1$ [mPa·s, 20° C.]: | 73 |
| PUQU-2-F | 10.00% | $V_{10}$ [V]: | 1.50 |
| PUQU-3-F | 10.00% | $V_{50}$ [V]: | 2.33 |
| CCP-V-1 | 10.00% | $V_{90}$ [V]: | 2.26 |
| CCP-V2-1 | 5.00% | $V_{90}/V_{10}$: | 1.506 |
| CC-3-V1 | 13.00% | $K_1$ [pN]: | 12.8 |
| CC-5-V | 11.00% | $K_3$ [pN]: | 13.1 |
| PGP-2-3 | 5.00% | $K_3/K_1$: | 1.02 |
| PP-1-2V1 | 5.00% | | |

Example 118

| | | | |
|---|---|---|---|
| CCP-1F.F.F | 8.00% | Clearing point [° C.]: | 74.0 |
| CCP-3F.F.F | 10.00% | $\Delta n$ [589 nm, 20° C.]: | 0.1055 |
| CCP-20CF$_3$ | 9.00% | $\Delta\epsilon$ [1 kHz, 20° C.]: | 7.9 |
| CCP-30CF$_3$ | 8.00% | $\gamma_1$ [mPa·s, 20° C.]: | 72 |
| PUQU-2-F | 10.00% | $V_{10}$ [V]: | 1.52 |
| PUQU-3-F | 9.00% | $V_{50}$ [V]: | 1.84 |
| CCP-V-1 | 5.00% | $V_{90}$ [V]: | 2.27 |
| CCP-V2-1 | 5.00% | $V_{90}/V_{10}$: | 1.490 |
| CC-3-V1 | 13.00% | $K_1$ [pN]: | 13.2 |
| CC-5-V | 11.00% | $K_3$ [pN]: | 12.9 |
| PGP-2-3 | 6.00% | $K_3/K_1$: | 0.98 |
| PP-1-2V1 | 6.00% | | |

Example 119

| | | | |
|---|---|---|---|
| CCP-1F.F.F | 8.00% | Clearing point [° C.]: | 73.5 |
| CCP-3F.F.F | 10.00% | $\Delta n$ [589 nm, 20° C.]: | 0.1056 |
| CCP-20CF$_3$ | 10.00% | $\Delta\epsilon$ [1 kHz, 20° C.]: | 7.8 |
| CCP-30CF$_3$ | 10.00% | $\gamma_1$ [mPa·s, 20° C.]: | 72 |
| PUQU-2-F | 10.00% | $V_{10}$ [V]: | 1.50 |
| PUQU-3-F | 8.00% | $V_{50}$ [V]: | 1.83 |
| CCP-V-1 | 4.00% | $V_{90}$ [V]: | 2.25 |
| CCP-V2-1 | 3.00% | $V_{90}/V_{10}$: | 1.497 |
| CC-3-V1 | 12.00% | $K_1$ [pN]: | 13.4 |
| CC-5-V | 12.00% | $K_3$ [pN]: | 12.7 |
| PGP-2-3 | 6.50% | $K_3/K_1$: | 0.95 |
| PP-1-2V1 | 6.50% | | |

The invention claimed is:

1. A liquid-crystalline medium comprising a mixture of polar compounds of positive or negative dielectric anisotropy, including one or more compounds of formula I

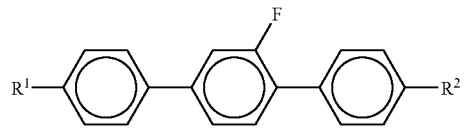

I in which

R$^1$ and R$^2$ are each, independently of one another, identically or differently, H, an alkyl radical having from 1 to 12 carbon atoms which is unsubstituted, monosubstituted by CN or CF$_3$ or at least monosubstituted by halogen, where, in addition, one or more CH$_2$ groups in these radicals may each, independently of one another, be replaced by —O—, —S—, —◇—, —CH=CH—, —C≡C—, —CO—, —CO—O—, —O—CO— or —O—CO—O— in such a way that atoms are not linked directly to one another, and further comprising one or more compounds of the formulae XI to XVII:

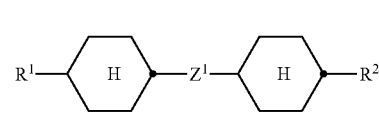

XI

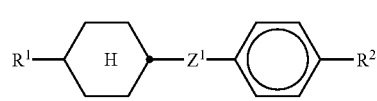

XII

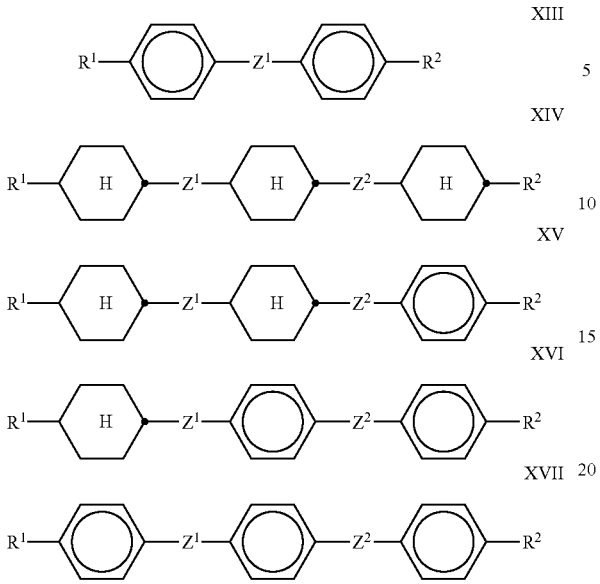

in which the individual radicals have the following meanings:
R$^1$ and R$^2$: independently of one another, identically or differently, n-alkyl, n-alkoxy or alkenyl, each having up to 9 carbon atoms; and
Z$^1$ and Z$^2$: independently of one another, identically or differently, a single bond, —CF$_2$O—, —OCF$_2$—, —CH$_2$O—, —OCH$_2$—, —CH=CH—, —C$_2$H$_4$—, —C$_2$F$_4$—, —CH$_2$CF$_2$—, —CF$_2$CH$_2$— or —C$_4$H$_8$—.

2. A medium according to claim 1, wherein, in the compound of the formula I, R$^1$ and/or R$^2$ are, independently of one another, identically or differently, H, a straight-chain alkyl radical having from 1 to 9 carbon atoms or a straight-chain alkenyl radical having from 2 to 9 carbon atoms.

3. A medium according to claim 1, comprising one or more compounds of sub-formulae Ia to Id:

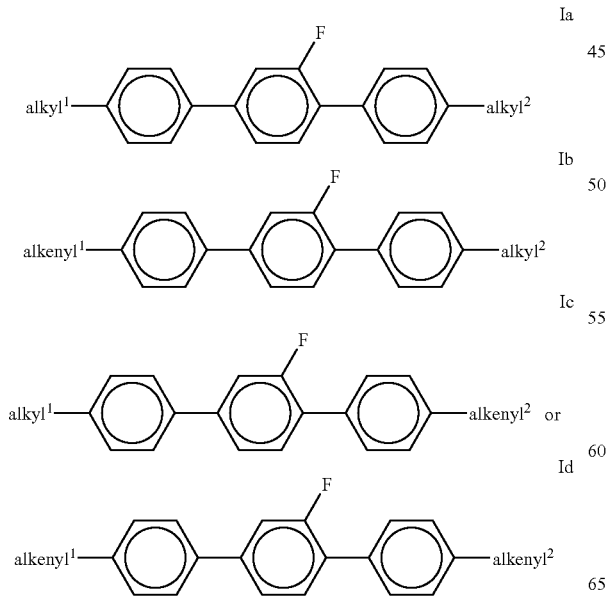

where the term "alkyl$^1$" and "alkyl$^2$" in each case, independently of one another, identically or differently, denotes a hydrogen atom or an alkyl radical having from 1 to 9 carbon atoms, and the term "alkenyl$^1$" and "alkenyl$^2$" in each case, independently of one another, identically or differently, denotes an alkenyl radical having from 2 to 9 carbon atoms.

4. A medium according to claim 1, comprising one or more compounds of sub-formulae I1 to I25:

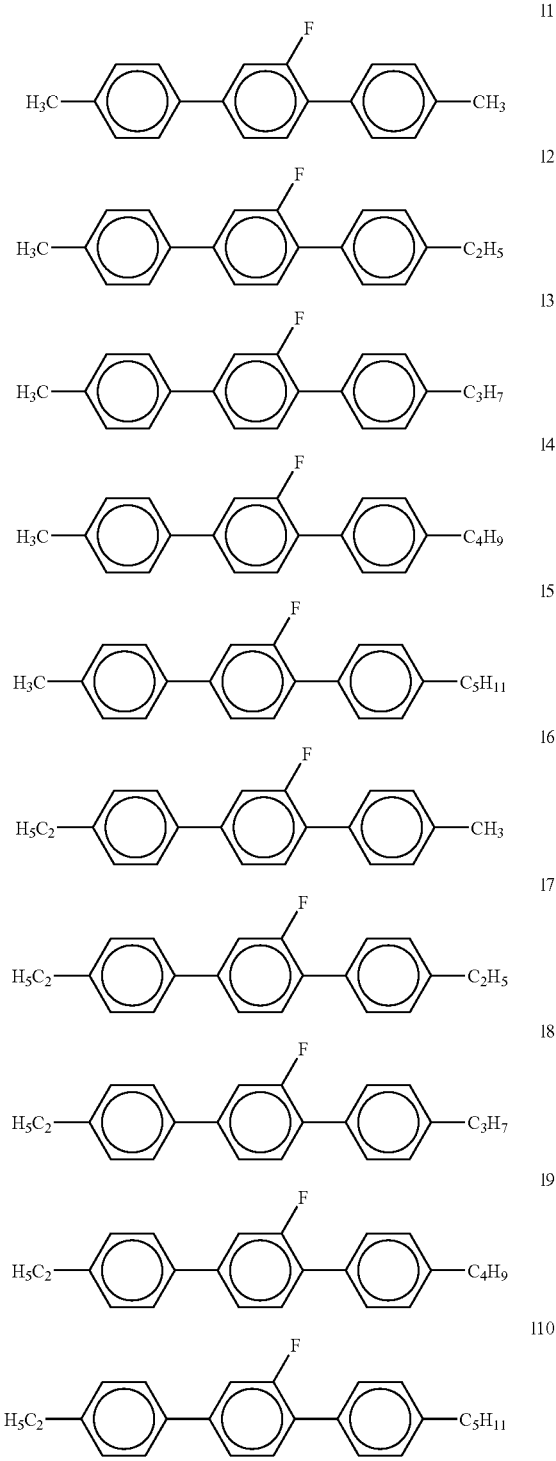

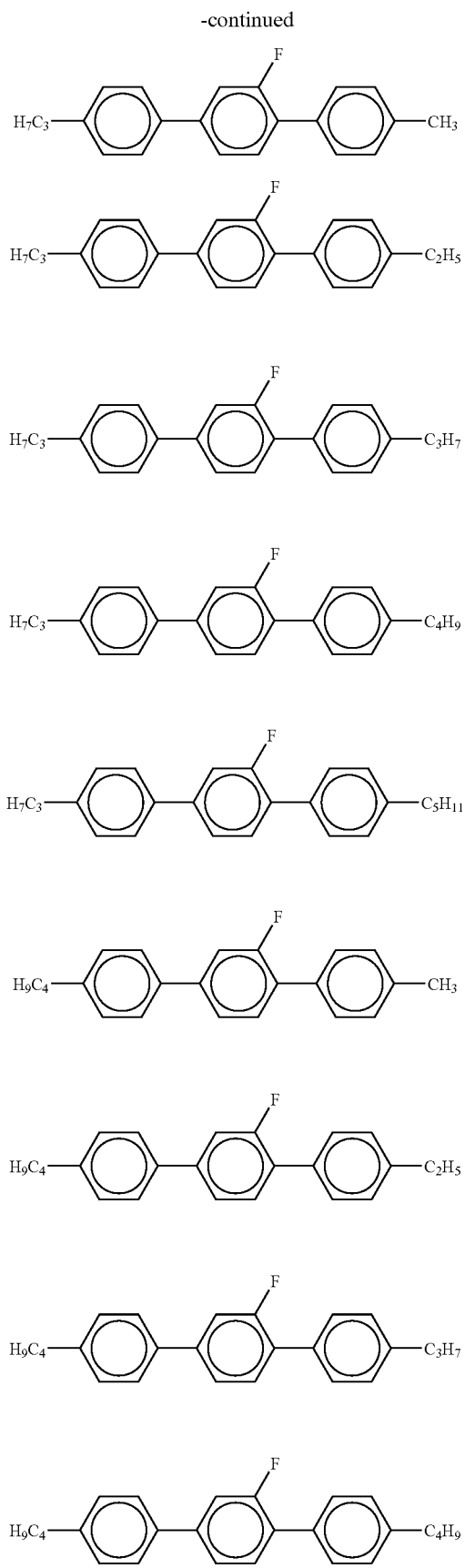
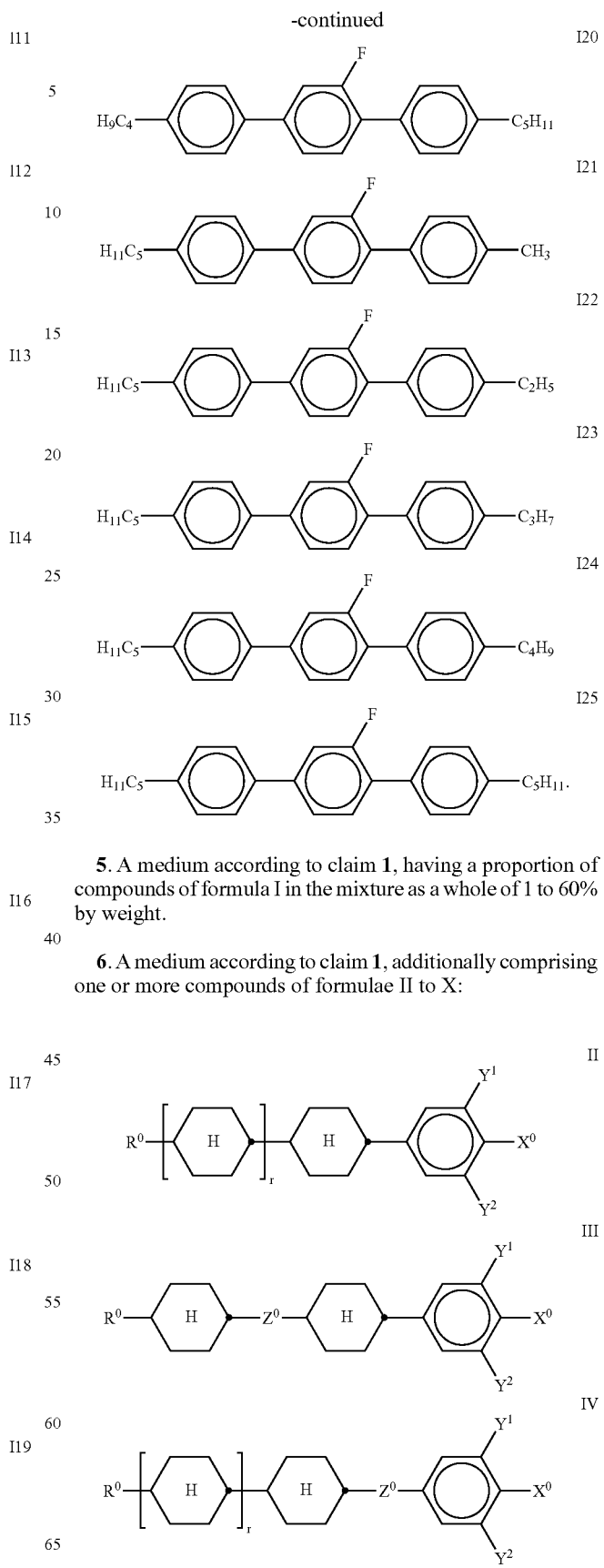
5. A medium according to claim 1, having a proportion of compounds of formula I in the mixture as a whole of 1 to 60% by weight.
6. A medium according to claim 1, additionally comprising one or more compounds of formulae II to X:
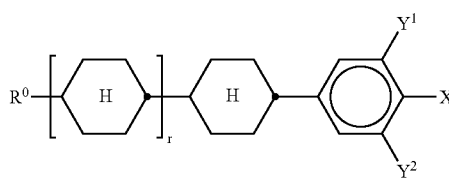
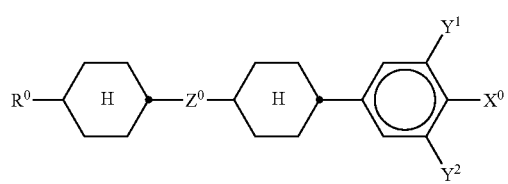
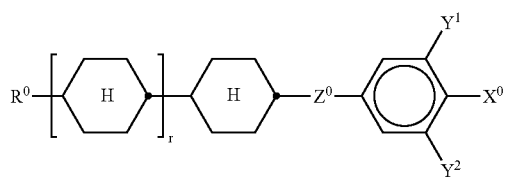

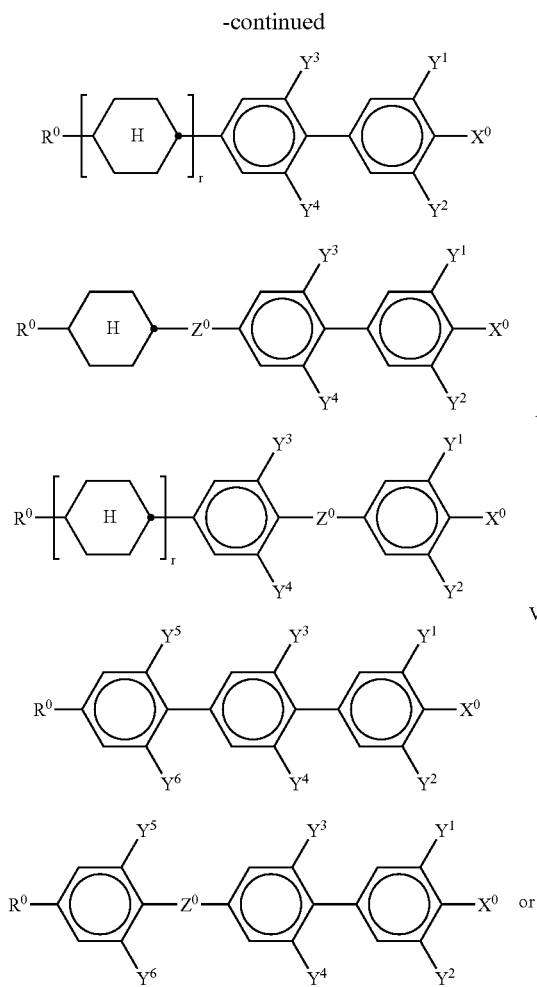

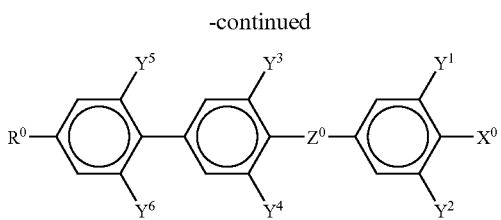

in which the individual radicals have the following meanings:
$R^0$: n-alkyl, oxaalkyl, fluoroalkyl or alkenyl, each having up to 9 carbon atoms;
$X^0$: F, Cl, halogenated alkyl or halogenated alkoxy having from 1 to 6 carbon atoms, or halogenated alkenyl having from 2 to 6 carbon atoms;
$Z^0$: —$CF_2O$—, —$OCF_2$—, —$CH_2O$—, —$OCH_2$—, —CO—O—, —O—CO—, —CH=CH—, —$C_2H_4$—, —$C_2F_4$—, —$CH_2CF_2$—, —$CF_2CH_2$— or —$C_4H_8$—;
$Y^1, Y^2, Y^3, Y^4, Y^5$ and $Y^6$:
each, independently of one another, H or F;
r: 0 or 1.

7. A medium according to claim 6, having a proportion of compounds of formulae II to X in the mixture as a whole of 20 to 70% by weight.

8. A medium according to claim 1, having a proportion of compounds of formulae XI to XVII in the mixture as a whole of 5 to 70% by weight.

9. An Electro-optical display device containing a liquid-crystalline medium according to claim 1.

10. A medium according to claim 3, wherein alkyl$^1$ and alkyl$^2$ are each independently H or a straight-chain alkyl radical with 1-5 C-atoms.

11. A medium according to claim 3, wherein alkenyl$^1$ and alkenyl$^2$ are each independently alkenyl radicals with 2-9 C-atoms.

\* \* \* \* \*

UNITED STATES PATENT AND TRADEMARK OFFICE
CERTIFICATE OF CORRECTION

PATENT NO. : 7,390,538 B2
APPLICATION NO. : 10/564276
DATED : June 24, 2008
INVENTOR(S) : Manabe et al.

It is certified that error appears in the above-identified patent and that said Letters Patent is hereby corrected as shown below:

Column 82, line 54 reads "-O-CO-O- in such a way that atoms are not linked", should read -- -O-CO-O- in such a way that O atoms are not linked --.

Signed and Sealed this

Tenth Day of November, 2009

David J. Kappos
*Director of the United States Patent and Trademark Office*